United States Patent
Luby

(10) Patent No.: US 9,734,007 B2
(45) Date of Patent: Aug. 15, 2017

(54) SYSTEMS AND METHODS FOR RELIABLY STORING DATA USING LIQUID DISTRIBUTED STORAGE

(71) Applicant: QUALCOMM Incorporated, San Diego, CA (US)

(72) Inventor: Michael George Luby, Berkeley, CA (US)

(73) Assignee: QUALCOMM Incorporated, San Diego, CA (US)

(*) Notice: Subject to any disclaimer, the term of this patent is extended or adjusted under 35 U.S.C. 154(b) by 36 days.

(21) Appl. No.: 14/567,303

(22) Filed: Dec. 11, 2014

(65) Prior Publication Data

US 2016/0011936 A1    Jan. 14, 2016

Related U.S. Application Data

(60) Provisional application No. 62/022,499, filed on Jul. 9, 2014.

(51) Int. Cl.
| | |
|---|---|
| G06F 11/00 | (2006.01) |
| G06F 11/10 | (2006.01) |
| G06F 3/06 | (2006.01) |

(52) U.S. Cl.
CPC .......... *G06F 11/1008* (2013.01); *G06F 3/067* (2013.01); *G06F 3/0617* (2013.01); *G06F 3/0653* (2013.01); *G06F 11/1088* (2013.01)

(58) Field of Classification Search
CPC .................................................. G06F 11/1008
USPC ...................... 714/6.21, 6.22, 6.23, 754, 755
See application file for complete search history.

(56) References Cited

U.S. PATENT DOCUMENTS

| | | |
|---|---|---|
| 6,516,425 B1 | 2/2003 | Belhadj et al. |
| 6,647,514 B1 | 11/2003 | Umberger et al. |
| 7,523,343 B2 | 4/2009 | Leis et al. |
| 7,882,425 B2 | 2/2011 | Lee et al. |
| 7,979,635 B2 | 7/2011 | Bates et al. |

(Continued)

FOREIGN PATENT DOCUMENTS

| | | |
|---|---|---|
| EP | 2365439 A1 | 9/2011 |
| WO | WO-2012147087 A1 | 11/2012 |

OTHER PUBLICATIONS

International Search Report and Written Opinion—PCT/US2015/039031—ISA/EPO—Sep. 28, 2015.

(Continued)

*Primary Examiner* — Dieu-Minh Le
(74) *Attorney, Agent, or Firm* — Norton Rose Fulbright LLP

(57) ABSTRACT

Embodiments provide methodologies for reliably storing data within a storage system using liquid distributed storage control. Such liquid distributed storage control operates to compress repair bandwidth utilized within a storage system for data repair processing to the point of operating in a liquid regime. Liquid distributed storage control logic of embodiments may employ a lazy repair policy, repair bandwidth control, a large erasure code, and/or a repair queue. Embodiments of liquid distributed storage control logic may additionally or alternatively implement a data organization adapted to allow the repair policy to avoid handling large objects, instead streaming data into the storage nodes at a very fine granularity.

56 Claims, 42 Drawing Sheets

(56) References Cited

U.S. PATENT DOCUMENTS

| | | | |
|---|---|---|---|
| 8,140,914 B2* | 3/2012 | Murphy | G06F 11/008 714/47.1 |
| 8,750,059 B2 | 6/2014 | O'Connell | |
| 8,751,861 B2 | 6/2014 | Nair et al. | |
| 9,075,773 B1* | 7/2015 | Rakitzis | G06F 11/2094 |
| 9,280,416 B1 | 3/2016 | Xin et al. | |
| 9,305,666 B2* | 4/2016 | Rakitzis | G06F 11/2094 |
| 2005/0102552 A1 | 5/2005 | Horn | |
| 2006/0041718 A1* | 2/2006 | Ulrich | G06F 17/30067 711/114 |
| 2006/0224916 A1 | 10/2006 | Makita | |
| 2008/0298276 A1 | 12/2008 | Chen et al. | |
| 2009/0254572 A1* | 10/2009 | Redlich | G06Q 10/06 |
| 2011/0225453 A1 | 9/2011 | Spry et al. | |
| 2012/0173932 A1* | 7/2012 | Li | G06F 11/1076 714/42 |
| 2012/0272019 A1 | 10/2012 | Bougaev et al. | |
| 2013/0151581 A1* | 6/2013 | Leggette | H04L 67/10 709/201 |
| 2013/0275815 A1* | 10/2013 | De Keyser | G06F 11/30 714/47.2 |
| 2014/0143594 A1 | 5/2014 | Belhadj et al. | |
| 2014/0201046 A1 | 7/2014 | Farajun et al. | |
| 2014/0215147 A1 | 7/2014 | Pan | |
| 2015/0127974 A1 | 5/2015 | Jiekak et al. | |
| 2015/0242272 A1* | 8/2015 | Resch | G06F 17/30864 714/764 |
| 2015/0269023 A1 | 9/2015 | Taranta, II | |
| 2015/0358037 A1 | 12/2015 | Li et al. | |
| 2016/0011935 A1 | 1/2016 | Luby | |
| 2016/0011936 A1 | 1/2016 | Luby | |
| 2016/0011939 A1 | 1/2016 | Luby | |
| 2016/0179621 A1 | 6/2016 | Schirripa et al. | |

OTHER PUBLICATIONS

Rizzo L. "Effective Erasure Codes for Reliable Computer Communication Protocols," Copmuter Communication Review, Apr. 1, 1997, vol. 27 (2), XP000696916, pp. 24-36.

Silberstein M., et al., "Lazy Means Smart," Proceedings of International Conference on Systems and Storage 2014, Jun. 1, 2014, pp. 1-7, XP055213180, New York, New York, USA DOI: 10.1145/2611354.2611370 ISBN: 978-1-45-032920-0.

Srinivasan A., et al., "Response time analysis of fault tolerant systems using primary site approach with LCFS repair service," TENCON '94. IEEE Region 10's Ninth Annual International Conference. Theme: Frontiers of Computer Technology. Proceedings of 1994 Singapore Aug. 22-26, 1994, New York, NY, USA,IEEE, Aug. 22, 1994, pp. 623-627, XP010126867, DOI: 10.1109/TENCON.1994.369145 ISBN: 978-0-7803-1862-5.

Bhagwan R., et al., "Total Recall: System Support for Automated Availability Management", Proceedings of the 1st Conference on Symposium on Networked Systems Design and Implementation, vol. 1, Mar. 3, 2004 (Mar. 3, 2004), XP055057350, pp. 1-14, Berkeley, CA, USA.

Giroire F., et al., "Peer-to-Peer Storage Systems: A Practical Guideline to be Lazy", Globecom 2010, 2010 IEEE Global Telecommunications Conference, IEEE, Piscataway, NJ, USA, Dec. 6, 2010 (Dec. 6, 2010), pp. 1-6, XP031846273, ISBN: 978-1-4244-5636-9.

Shah N. B., "Minimizing Repair Bandwidth in Distributed Storage Systems", Jun. 2010, Indian Institute of Science, Bangalore, pp. 1-161.

* cited by examiner

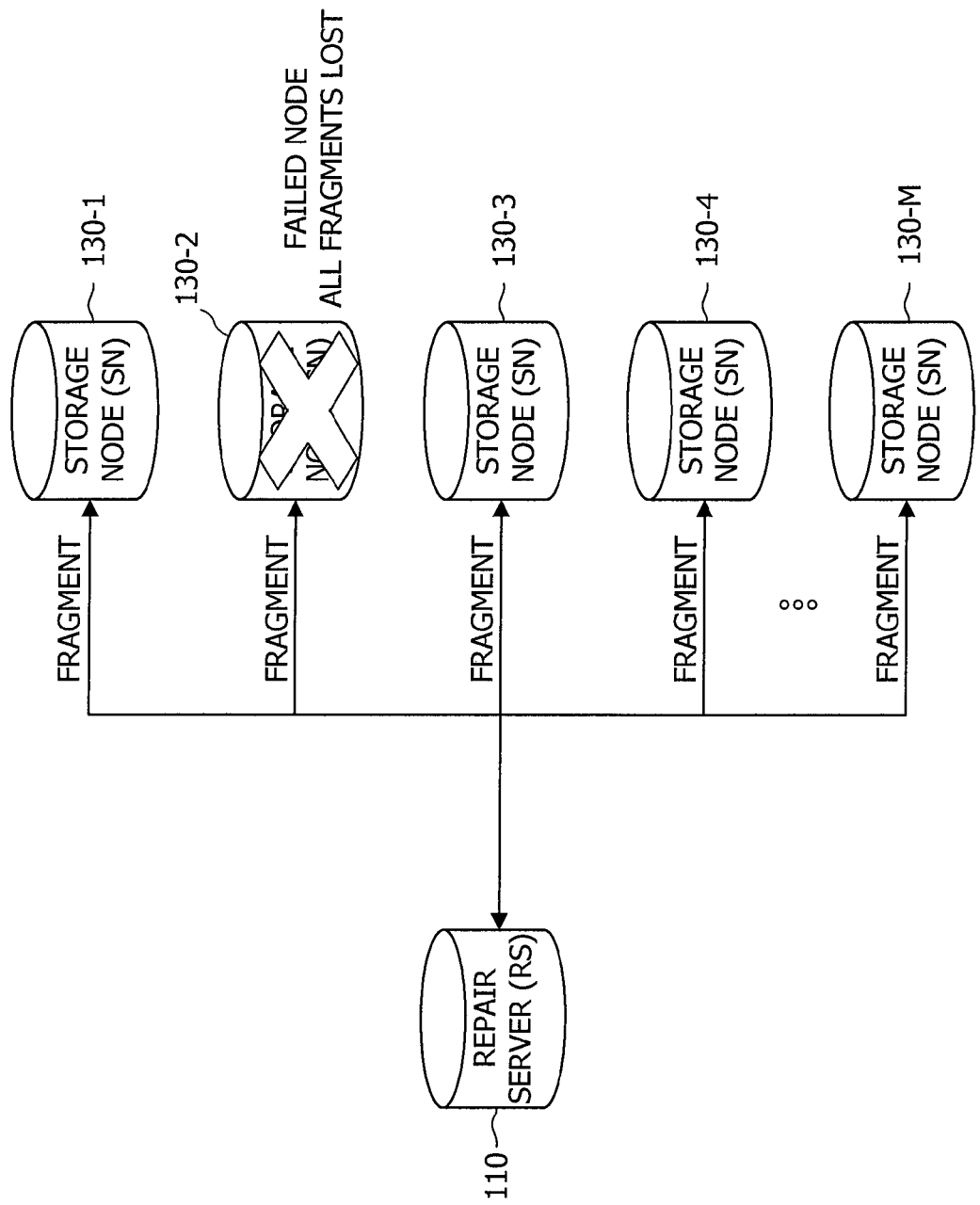

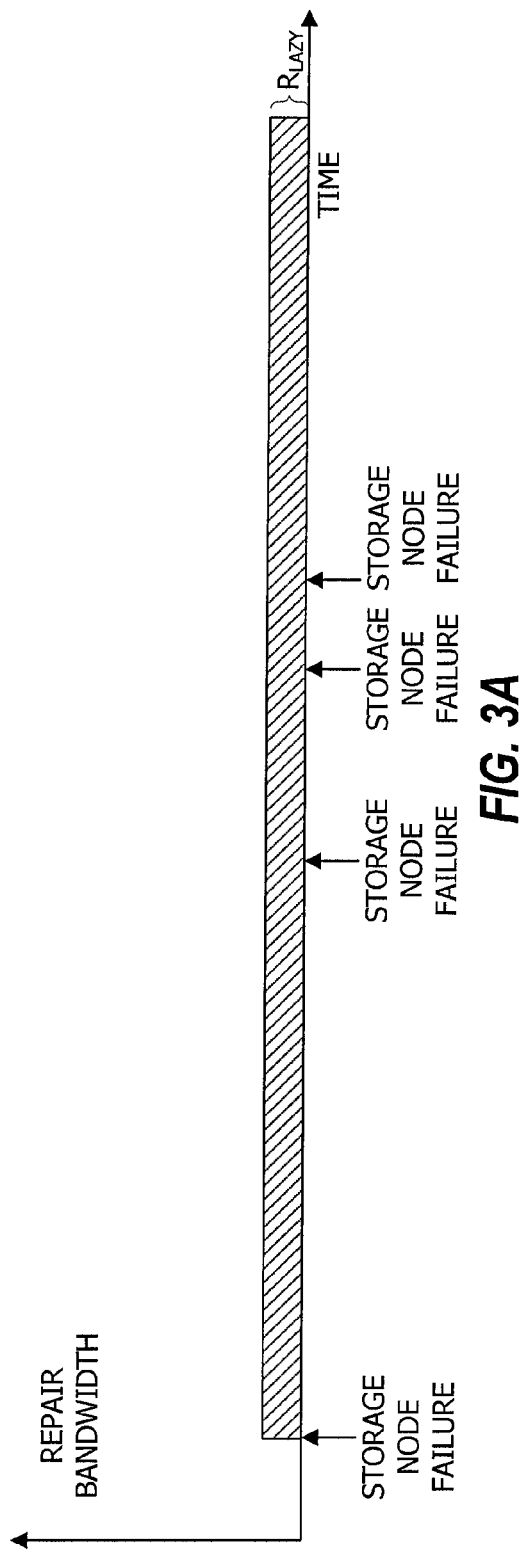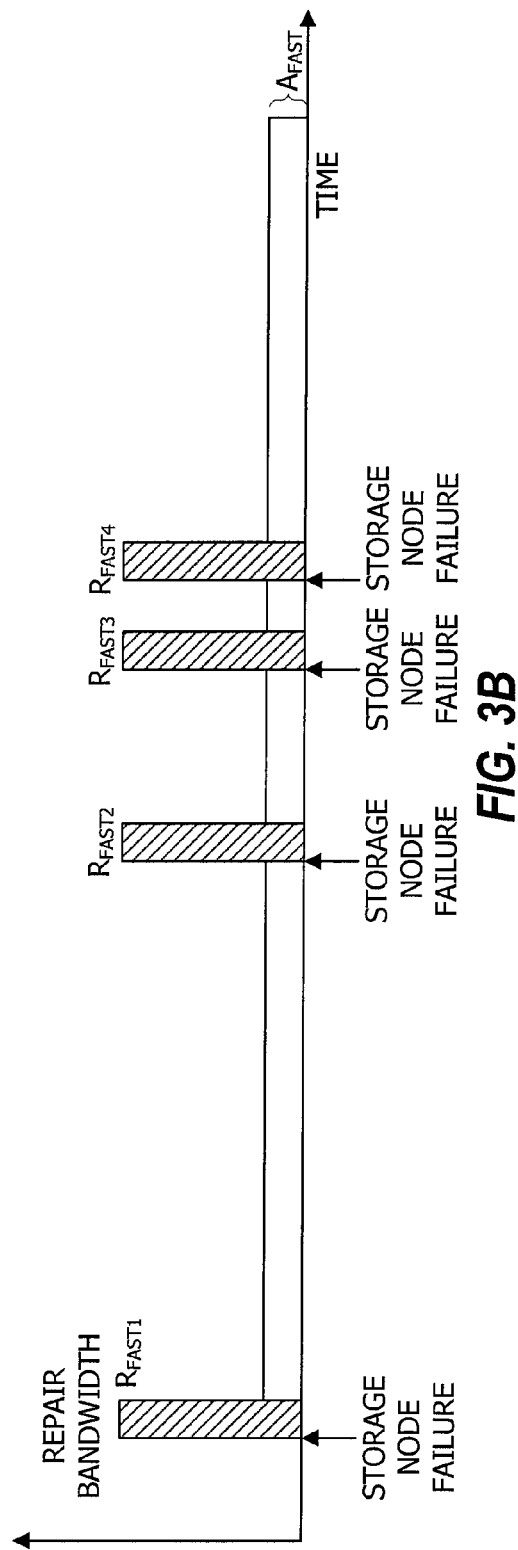

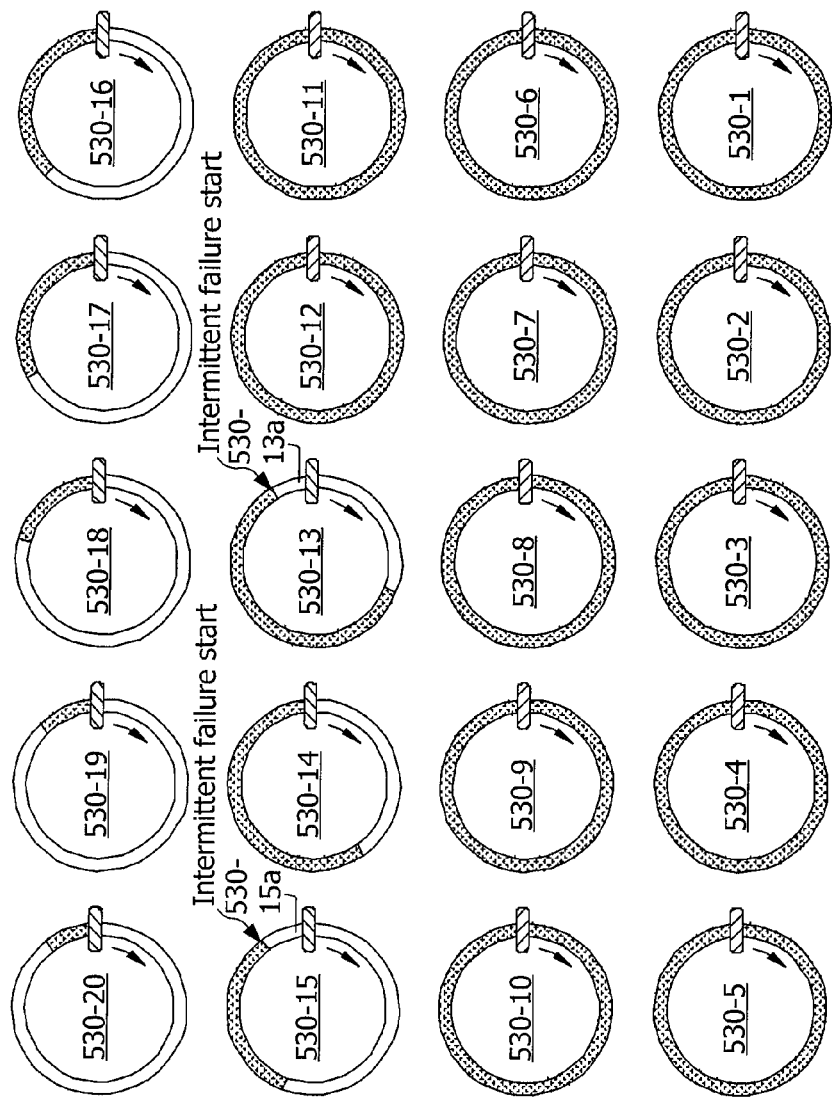
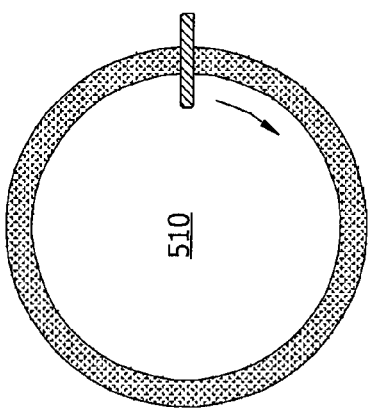
FIG. 5C $M = 400, S = 16\ TB, \lambda = 1/3\ per\ year,$
$T = 30\ minutes, 1.0\ e+7\ year\ simulation$

| Solution type | Source frags k | Repair frags r | Overhead β (%) | R limit (Gbps) | % time repairing | MTTL (100 MB) | MTTL (2 GB) |
|---|---|---|---|---|---|---|---|
| Small+fast | 6 | 3 | 33.3 | 40.00 | 9.7 | 2.2 e+3 | 9.8 e+3 |
| Small+fast | 6 | 3 | 33.3 | 80.00 | 4.8 | 4.8 e+3 | 2.2 e+4 |
| Small+fast | 6 | 3 | 33.3 | 100.00 | 3.9 | 6.0 e+3 | 2.7 e+4 |
| Large+lazy | 267 | 133 | 33.3 | 2.44 | 100.0 | 1.0 e+7 | 1.0 e+7 |
| Large+lazy | 336 | 64 | 16.0 | 7.61 | 100.0 | 1.0 e+7 | 1.0 e+7 |

Legend
M is the number of SNs
S is the storage capacity per SN
λ is the SN permanent failure rate
T is the time to detect a SN permanent failure after it occurs
MTTL (X) is mean time to loss of any objects (in years) when objects are of size X

FIG. 12

$M = 3000$, $S = 10$ TB, $\lambda = 1/4$ per year,
$T = 30$ minutes, $1.0$ e+7 year simulation

| Solution type | Source frags k | Repair frags r | Overhead β (%) | R limit (Gbps) | % time repairing | MTTL (100 MB) | MTTL (2 GB) |
|---|---|---|---|---|---|---|---|
| Small+fast | 10 | 4 | 28.6 | 8.42 | 100.0 | 3.7 e-2 | 7.7 e-2 |
| Small+fast | 10 | 4 | 28.6 | 28.5 | 74.7 | 1.6 e+5 | 1.6 e+6 |
| Large+lazy | 2143 | 857 | 28.6 | 7.96 | 100.0 | 1.0 e+7 | 1.0 e+7 |
| Large+lazy | 2625 | 375 | 12.5 | 20.8 | 100.0 | 1.0 e+7 | 1.0 e+7 |

Legend
M is the number of SNs
S is the storage capacity per SN
λ is the SN permanent failure rate
T is the time to detect a SN permanent failure after it occurs
MTTL (X) is mean time to loss of any objects (in years) when objects are of size X

SYSTEMS AND METHODS FOR RELIABLY STORING DATA USING LIQUID DISTRIBUTED STORAGE

CROSS-REFERENCE TO RELATED APPLICATIONS

The present application claims priority to U.S. Provisional Patent Application No. 62/022,499, entitled "SYSTEMS AND METHODS FOR RELIABLY STORING DATA USING LIQUID DISTRIBUTED STORAGE," filed Jul. 9, 2014 and the present application is related to co-pending U.S. patent application Ser. No. 14/567,203, entitled "SYSTEMS AND METHODS FOR RELIABLY STORING DATA USING LIQUID DISTRIBUTED STORAGE," filed concurrently herewith and U.S. patent application Ser. No. 14/567,249, entitled "SYSTEMS AND METHODS FOR RELIABLY STORING DATA USING LIQUID DISTRIBUTED STORAGE," filed concurrently herewith, the disclosures of which are hereby incorporated herein by reference.

DESCRIPTION OF THE RELATED ART

The creation, management, storage, and retrieval of electronic data has become nearly ubiquitous in the day-to-day world. Such electronic data may comprise various forms of information, such as raw data (e.g., data collected from sensors, monitoring devices, control systems, etc.), processed data (e.g., metrics or other results generated from raw data, data aggregations, filtered data, etc.), produced content (e.g., program code, documents, photographs, video, audio, etc.), and/or the like. Such data may be generated by various automated systems (e.g., network monitors, vehicle on-board computer systems, automated control systems, etc.), by user devices (e.g., smart phones, personal digital assistants, personal computers, digital cameras, tablet devices, etc.), and/or a number of other devices.

Regardless of the particular source or type of data, large quantities of electronic data are generated, stored, and accessed every day. Accordingly sophisticated storage systems, such as network attached storage (NAS), storage area networks (SANs), and cloud based storage (e.g., Internet area network (IAN) storage systems), have been developed to provide storage of large amounts of electronic data. Such storage systems provide a configuration in which a plurality of storage nodes are used to store the electronic data of one or more user/device, and which may be stored and retrieved via one or more access server.

FIG. 1A shows an exemplary implementation of storage system 100A in which access server 110 is in communication with end user (EU) device 120 to provide storage services with respect thereto. Access server 110 may comprise one or more servers operable under control of an instruction set to receive data from devices such as EU device 120, and to control storage of the data and to retrieve data in response to requests from devices such as EU device 120. Accordingly, access server 110 is further in communication with a plurality, M, of storage nodes (shown here as storage nodes 130-1 through 130-M). Storage nodes 130-1 through 130-M may comprise a homogeneous or heterogeneous collection or array (e.g., redundant array of independent disks (RAID) array) of storage media (e.g., hard disk drives, optical disk drives, solid state drives, random access memory (RAM), flash memory, etc.) providing persistent memory in which the electronic data is stored by and accessible through access server 110. Each such storage node may be, for example, a commodity web server. Alternatively, in some deployments at least some storage nodes may be personal devices interconnected over the Internet. EU device 120 may comprise any configuration of device which operates to generate, manage, and/or access electronic data. It should be appreciated that although only a single such device is shown, storage system 100A may operate to serve a plurality of devices, some or all of which may comprise devices in addition to or in the alternative to devices characterized as "end user" devices.

FIG. 1B shows an exemplary implementation of storage system 100B in which access servers 110-1 through 110-14 may communicate with one or more EU device of EU devices 120-1 through 120-3 to provide storage services with respect thereto. It should be appreciated that storage system 100B shows an alternative configuration to that of 100A discussed above wherein, although the access servers, EU devices, and storage nodes may be embodied as described above, the storage nodes of storage system 110B are deployed in a cluster configuration, shown as storage node cluster 130. In operation of storage system 100B, a cluster of access servers have access to the cluster of storage nodes. Thus, the EU devices may connect in a variety of ways to various access servers to obtain data services. In some cases, the access servers may be distributed around the country such that no matter where the EU device is located it may access the data stored in the storage node cluster. Storage nodes of such a configuration may be distributed geographically as well.

Source blocks of electronic data are typically stored in storage systems such as storage systems 100A and 100B as objects. Such source blocks, and thus the corresponding objects stored by the storage systems, may comprise individual files, collections of files, data volumes, data aggregations, etc. and may be quite large (e.g., on the order of megabytes, gigabytes, terabytes, etc.). The objects are often partitioned into smaller blocks, referred to as fragments (e.g., a fragment typically consisting of a single symbol), for storage in the storage system. For example, an object may be partitioned into k equal-sized fragments (i.e., the fragments comprise blocks of contiguous bytes from the source data) for storage in storage systems 100A and 100B. Each of the k fragments may, for example, be stored on a different one of the storage nodes.

In operation, storage systems such as storage systems 100A and 100B are to provide storage of and access to electronic data in a reliable and efficient manner. For example, in a data write operation, access server 110 may operate to accept data from EU device 120, create objects from the data, create fragments from the objects, and write the fragments to some subset of the storage nodes. Correspondingly, in a data read operation, access server 110 may receive a request from EU device 120 for a portion of stored data, read appropriate portions of fragments stored on the subset of storage nodes, recreate the object or appropriate portion thereof, extract the requested portion of data, and provide that extracted data to EU device 120. However, the individual storage nodes are somewhat unreliable in that they can intermittently fail, in which case the data stored on them is temporarily unavailable, or permanently fail, in which case the data stored on them is permanently lost (e.g., as represented by the failure of storage node 130-2 in FIG. 1C).

Erasure codes (e.g., tornado codes, low-density parity-check codes, Reed-Solomon coding, and maximum distance separable (MDS) codes) have been used to protect source data against loss when storage nodes fail. When using an erasure code, such as MDS erasure codes, erasure encoding is applied to each source fragment (i.e., the k fragments into which an object is partitioned) of an object to generate repair data for that fragment, wherein the resulting repair fragments are of equal size with the source fragments. In operation of the storage system, the source fragments and corresponding repair fragments are each stored on a different one of the storage nodes.

The erasure code may provide r repair fragments for each source object, whereby the total number of fragments, n, for a source object may be expressed as n=k+r. Thus, the erasure code may be parameterized as (n; k; r) where k is the number of source symbols in a source block, n is the total number of encoded symbols, and r=n−k is the number of repair symbols. A property of MDS erasure codes is that all k source symbols can be recovered from any k of the n encoded symbols (i.e., the electronic data of the source block may be retrieved by retrieving any combination (source and/or repair fragments) of k fragments. Although providing data reliability, it should be appreciated that where desired data is not available (e.g., a fragment is unavailable due to a failed storage node), to recreate the missing data k fragments must be accessed to recreate the missing data (i.e., k times the amount of data must be accessed to recreate the desired but missing data). This can result in inefficiencies with respect to the use of resources, such as communication bandwidth, computing resources, etc.

In providing reliable storage of the electronic data, storage systems such as storage systems 100A and 100B implementing erasure coding of the data (e.g., access server 110 of FIG. 1C operational to provide repair server functionality) have a repair process or policy running in the background to determine the number of fragments available with respect to the objects (e.g., to detect objects which are missing one or more fragments, such as due to a failed storage node). For objects with some level of missing fragments (e.g., as the number of available fragments approaches k) logic of the storage system repair process will read k remaining fragments for that object and recreate the object and write additional fragments to the storage system (e.g., on other of the storage nodes which remain available). Typically, the objects for which the fewest fragments are available are the ones that are repaired first, before objects that have more fragments available (assuming an equal number of fragments for the objects), according to such repair policies.

It should be appreciated that, although the example of FIG. 1C illustrates a repair server as being implemented by access server 110, repair servers operable to provide repair services herein may be provided in various configurations. For example, one or more repair servers may be provided separately from access servers of a storage system according to embodiments. As another example, repair servers and or access servers may be implemented by storage nodes 130-1 through 130-M.

The aforementioned intermittent node failures are far more typical than permanent node failures (e.g., 90% of the node failures are intermittent), and the repair policy is not needed to recover the data which is temporarily unavailable on these nodes as eventually this data will become available again when the node comes back online. Accordingly, when fragments become unavailable the repair process may detect and delay repairing the data for some period of time, T (e.g., intermittent failure threshold time), to determine whether the failure is intermittent or permanent.

The erasure code solutions which have been implemented with respect to storage systems have been small erasure code solutions due to their suitability for relatively rapid recreation of missing source data. An (n; k; r) erasure code solution is said to be a small erasure code solution if n<<M (i.e., for each source object there are fragments at a small fraction of the storage nodes). Such a small erasure code configuration (e.g., k=10) generally comprises a correspondingly small number of repair fragments (e.g., r=4, thus n=14). Accordingly, for a small erasure code solution it is beneficial to use a reactive repair policy (i.e., when a fragment of an object is lost due to a permanent node failure then the repair policy immediately or as quickly as possible replaces the lost fragment with another fragment in light of the total number of fragments, n, being so near the minimum number of fragments, k, needed to recover the data). Because a large amount of data is stored on each node (typically many terabytes), and all data comprising fragments stored on a node typically needs to be replaced when the node permanently fails, the repair process reads and writes a large amount of data after a node permanently fails. This reading and writing of large amounts of data generally results in the consumption of large amounts of bandwidth in the storage system by the repair policy and, when coupled with a reactive repair policy, can result in disruptive spikes in storage system bandwidth utilization (e.g., delaying or preventing primary data access services by the storage system). That is, the repair policy implemented with respect to a small erasure code configuration may act somewhat erratically whereby it utilizes a large amount of bandwidth for periods of time when attempting to repair data immediately upon determining fragments are unavailable due to a permanently failed node.

Although it may be possible to increase the number of fragments, k, for a particular source object, thereby decreasing the size of the fragments, this has generally been thought not to be a satisfactory solution with respect to the small erasure code implementations. As the number k of source fragments increases for the existing small erasure code solutions, the total amount of data that needs repair grows proportionally to k using a reactive repair policy, which has been considered undesirable.

Further compounding disadvantages associated with the typical use of small erasure codes and their corresponding reactive repair policies, is that these solutions tend to be highly sensitive to the intermittent failure threshold, T, utilized in determining intermittent unavailability and permanent unavailability of fragments. As T is decreased, the repair policy is implemented with respect to a larger number of fragments (e.g., likely including a larger number of fragments which will again become available on their own in a short amount of time), thereby increasing storage system bandwidth consumption by the repair process and leaving less bandwidth available for the primary operation of the storage system. However, as T is increased, the resilience and reliability of the small erasure code is at risk due to the relatively few fragments available in excess of the k fragments required for data recovery (e.g., additional fragments may be lost in time T, thereby preventing recovery of the data).

SUMMARY

A method for accessing source data of a source object stored as multiple fragments distributed across multiple storage nodes of a storage system, wherein one or more fragments of the multiple fragments includes redundant data the source object, is provided according to embodiments of the present disclosure. The method of embodiments comprises reading data of a plurality of fragments of the multiple fragments from a plurality of storage nodes of the multiple storage nodes to access a requested portion of the source data, wherein data of at least one fragment of the multiple fragments is stored by the multiple storage nodes using a data organization that concatenates multiple source blocks from the source object for inclusion of a symbol of each source block in each of a plurality of the multiple fragments of the source object. The method of embodiments further includes erasure decoding the portion of the source data from the data of the plurality of fragments read from the plurality of storage nodes.

An apparatus for accessing source data of a source object stored as multiple fragments distributed across multiple storage nodes of a storage system, wherein one or more fragments of the multiple fragments includes redundant data the source object, is provided according to further embodiments of the present disclosure. The apparatus of embodiments comprises one or more data processors and one or more non-transitory computer-readable storage media containing program code configured to cause the one or more data processors to perform operations. The operations of embodiments include reading data of a plurality of fragments of the multiple fragments from a plurality of storage nodes of the multiple storage nodes to access a requested portion of the source data, wherein data of at least one fragment of the multiple fragments is stored by the multiple storage nodes using a data organization that concatenates multiple source blocks from the source object for inclusion of a symbol of each source block in each of a plurality of the multiple fragments of the source object. The operations of embodiments further include erasure decoding the portion of the source data from the data of the plurality of fragments read from the plurality of storage nodes.

An apparatus for accessing source data of a source object stored as multiple fragments distributed across multiple storage nodes of a storage system, wherein one or more fragments of the multiple fragments includes redundant data the source object, according to still further embodiments of the present disclosure. The apparatus of embodiments comprises means for reading data of a plurality of fragments of the multiple fragments from a plurality of storage nodes of the multiple storage nodes to access a requested portion of the source data, wherein data of at least one fragment of the multiple fragments is stored by the multiple storage nodes using a data organization that concatenates multiple source blocks from the source object for inclusion of a symbol of each source block in each of a plurality of the multiple fragments of the source object. The apparatus of embodiments further includes means for erasure decoding the portion of the source data from the data of the plurality of fragments read from the plurality of storage nodes.

A non-transitory computer-readable medium comprising codes for accessing source data of a source object stored as multiple fragments distributed across multiple storage nodes of a storage system, wherein one or more fragments of the multiple fragments includes redundant data the source object, is provided according to embodiments of the present disclosure. The codes of embodiments cause a computer to read data of a plurality of fragments of the multiple fragments from a plurality of storage nodes of the multiple storage nodes to access a requested portion of the source data, wherein data of at least one fragment of the multiple fragments is stored by the multiple storage nodes using a data organization that concatenates multiple source blocks from the source object for inclusion of a symbol of each source block in each of a plurality of the multiple fragments of the source object. The codes of embodiments further cause a computer to decode the portion of the source data from the data of the plurality of fragments read from the plurality of storage nodes.

BRIEF DESCRIPTION OF THE DRAWINGS

FIGS. 1A-1C show exemplary implementations of storage systems.

FIG. 3A shows operation of an embodiment of lazy repair policy logic in cooperation with repair bandwidth control logic providing lazy repair of source objects when constraining the repair bandwidth to provide a steady repair rate according to aspects of the present disclosure.

FIG. 3B shows repair rate spikes upon detection of a storage node failure in association with repair processing which attempts to repair the data as soon as possible after the storage node failure is detected.

FIG. 4O shows traditional erasure encoding/decoding of source objects.

FIGS. 5A-5E show operation of a lazy repair policy implementing a large erasure code according to aspects of the present disclosure.

FIGS. 12 and 13 show the results of simulations with respect to particular storage system configurations to provide comparisons of operation of reactive repair policies using small erasure codes and lazy repair policies using large erasure codes according to aspects of the present disclosure.

FIGS. 14A-14E show accessing a portion of data by an EU device through multiple connections according to aspects of the present disclosure.

DETAILED DESCRIPTION

Figure 1A:
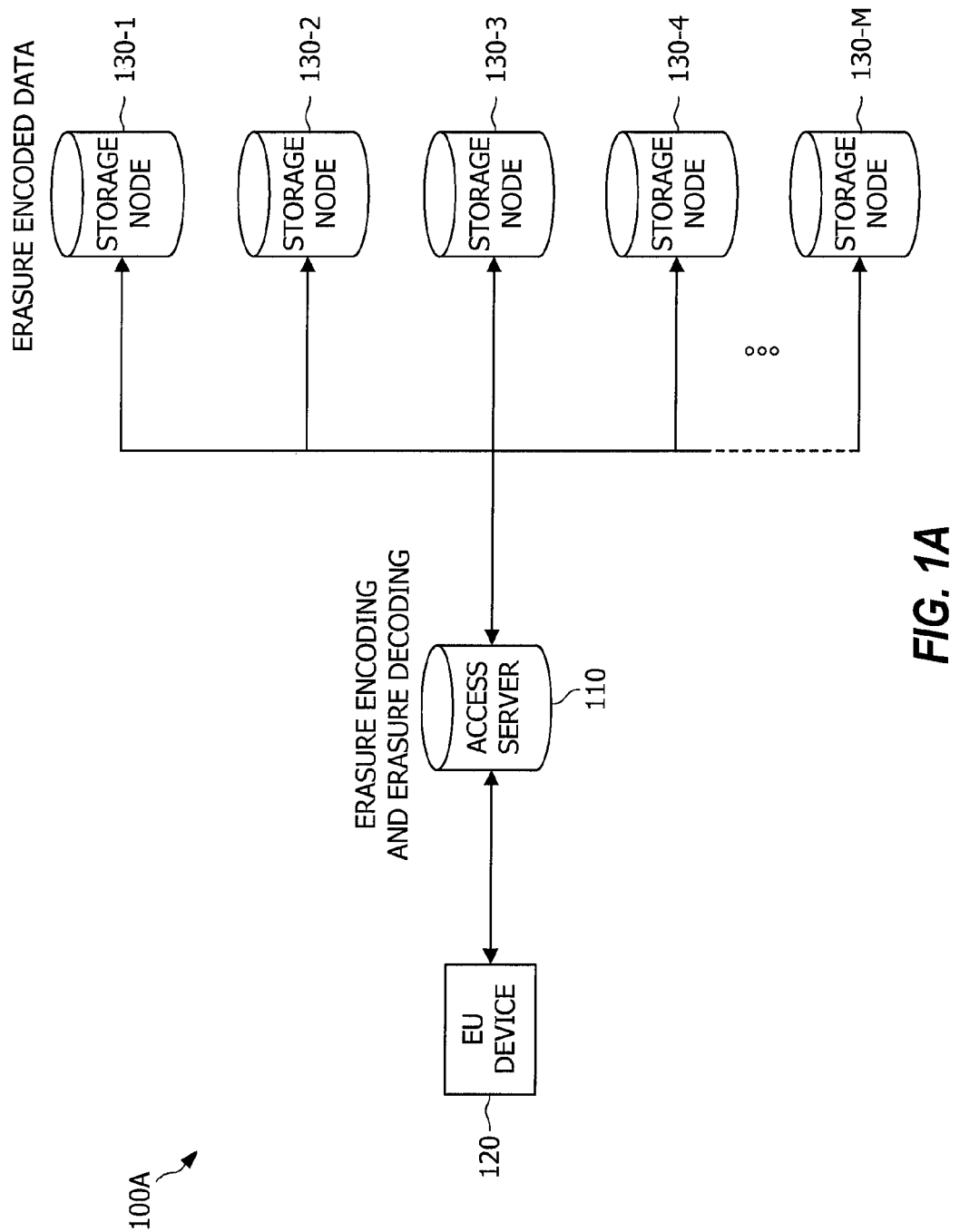
Figure 1B:
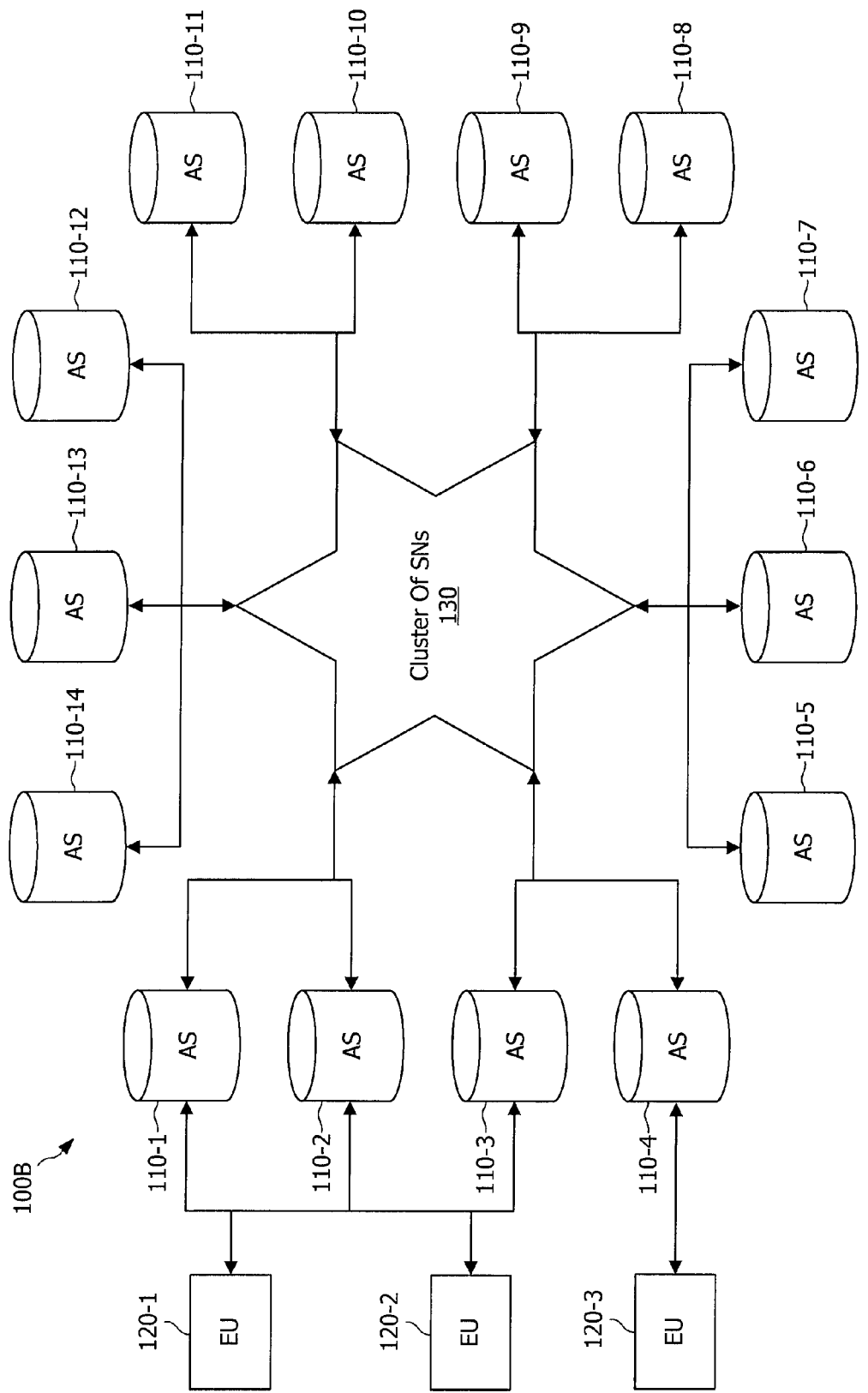

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "data" and "electronic data" may include information and content of various forms, including raw data, processed data, produced content, and/or the like, whether being executable or non-executable in nature. Such data may, for example, include data collected from sensors, monitoring devices, control systems, metrics or other results generated from raw data, data aggregations, filtered data, program code, documents, photographs, video, audio, etc. as may be generated by various automated systems, by user devices, and/or other devices.

As used in this description, the term "fragment" refers to one or more portions of content that may be stored at a storage node. For example, the data of a source object may be partitioned into a plurality of source fragments. The plurality of source fragments may be erasure encoded to generate one or more corresponding repair fragment, whereby the repair fragment comprises redundant data with respect to the source fragments. The unit of data that is erasure encoded/decoded is a source block, wherein k is the number of source symbols per source block, Bsize is the source block size, Ssize is the symbol size (Bsize=k·Ssize), n is the number of encoded symbols generated and stored per source block, and r is the number of repair symbols (r=n−k), and wherein the symbol is the atomic unit of data for erasure encoding/decoding. Although the symbol size (Ssize) may be different for different source blocks, the symbol size generally remains the same for all symbols within a source block. Similarly, although the number of source symbols (k), the number of repair symbols (r), and the number of encoded symbols generated may be different for different source blocks, the values generally remain the same for all source blocks of a particular object. Osize is the size of the source object and Fsize is the size of the fragment. In accordance with embodiments, k is both the number of source symbols per source block and the number of fragments per source object (e.g., Osize=k·Fsize).

As used in this description, the terms "component," "database," "module," "system," "logic" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

As used herein, the terms "user equipment," "user device," and "client device" include devices capable of requesting and receiving content from a web server or other type of server and transmitting information to a web server or other type of server. In some cases, the "user equipment," "user device," or "client device" may be equipped with logic that allows it to read portions or all of fragments from the storage nodes to recover portions or all of source objects. Such devices can be a stationary devices or mobile devices. The terms "user equipment," "user device," and "client device" can be used interchangeably.

As used herein, the term "user" refers to an individual receiving content on a user device or on a client device and transmitting information or receiving information from to a website or other storage infrastructure.

Embodiments according to the concepts of the present disclosure provide solutions to the problem of storing and accessing source data in a reliable and efficient manner within a storage system of unreliable nodes (i.e., nodes that can store data but that can intermittently fail, in which case the data stored on them is temporarily unavailable, or permanently fail, in which case the data stored on them is permanently lost). In particular, embodiments herein provide methodologies, as may be implemented in various configurations of systems and methods, for reliably storing data within a storage system using liquid distributed storage control. Such liquid distributed storage control operates to compress repair bandwidth (i.e., the bandwidth utilized within a storage system for data repair processing) to the point of operating in a liquid regime (i.e., a queue of items needing repair builds up and the items are repaired as a flow).

It should be appreciated that there are various metrics by which to evaluate a storage system solution. Embodiments herein utilize metrics such as reliability, storage efficiency, repair bandwidth efficiency, and access efficiency.

Reliability provides a measure of the amount of time that all source data can be stored without loss of any of the data. Reliability is usually measured as a mean time to source data loss, and typically measured in years. The reliability metric used in accordance with some embodiments herein is the mean time to loss of any source data, abbreviated herein as MTTDL. MTTDL may be estimated, for example, by calculating a mean time to loss of a particular piece of source data and multiplying that metric by the number of pieces of source data in the storage system.

Storage efficiency provides a measure of the fraction of the available storage within the storage system that can be used to store source data. The storage overhead or storage redundancy ($\beta$) is the ratio of the total amount of repair data for all objects divided by the total amount of source and repair data for all objects in the storage system. Thus, the storage overhead is the fraction of the used storage that is not for source data. The storage efficiency, being the fraction of storage usable for source data, may thus be represented in terms of the storage overhead as $1-\beta$.

Repair bandwidth efficiency provides a measure of the amount of network bandwidth used for repairing lost data from failed storage nodes. It should be appreciated that repair bandwidth may be a shared resource with the access bandwidth and/or storage bandwidth (e.g., each taken from the available data communication bandwidth). Accordingly, an upper bound on the repair bandwidth (R) is provided according to embodiments herein.

Access efficiency provides a measure of the amount of data that needs to be read from the storage system to retrieve a given portion of source data (e.g., $f(A)$ is the amount of read data from the storage nodes to access A bytes of source data, wherein when $f(A)$ is greater than A the data access is inefficient). It should be appreciated that the amount of time to access source data is related to the access efficiency. Accordingly, when the amount of data read from the storage nodes to access a particular portion of source data is larger than that portion of source data, not only is more bandwidth than minimally necessary used to access the data but the amount of time it takes to access the source data can be longer than minimally necessary. Accordingly, embodiments herein are adapted to provide implementations wherein $f(A)=A$.

Permanent failure of the nodes is often modeled by a Poisson process parameterized by $\lambda$, which denotes the failure rate of each node according to an exponential distribution. There are also intermittent failures of nodes (e.g., a node that is not available for some small interval of time but which comes back online and is fully available again). As previously mentioned, such intermittent node failures are far more typical than permanent node failures. Accordingly, a repair policy is not needed to recover the data temporarily unavailable on these nodes as eventually this data will become available again when the node comes back online and thus when nodes fail there is some period of time, as may be denoted by an intermittent failure threshold, T, until it is determined whether the failure is intermittent or permanent. Nodes can be added to the storage system to replace nodes that have failed permanently. When replacement nodes are available for permanently failed nodes, the repair policy can repair an object that has lost fragments on failed nodes by reading fragments for the object from other nodes, erasure decode the object from the read fragments, erasure encode additional fragments from the object, and store these additional fragments on replacement nodes.

The repair bandwidth metric utilized according to embodiments of the present disclosure is an amount of bandwidth provisioned to be used by the repair policy to ensure a provided MTTDL, whereby the repair policy may use this amount of repair bandwidth at each point in time, or more generally the repair policy may use this amount of repair bandwidth when averaged over a longer window of time. The repair bandwidth provisioned to the repair process may be respected on an instantaneous basis (i.e., the repair process may use repair bandwidth at a steady rate that is at or below the provisioned repair bandwidth). Alternatively, the repair bandwidth provisioned to the repair process may be considered as an average over a long window of time that is sufficient for the repair process to achieve a provisioned MTTDL, and thus the repair process may decide to use the repair bandwidth in, for example, a scheduled manner independent of the timing of storage node failures. For example, the repair process may be scheduled to run periodically for an hour or two each day, for a few hours each week, or for a few hours each month or couple of months, such that the average repair bandwidth used by the repair process over these windows of times averages to the provisioned repair bandwidth.

The repair policy may use the provisioned repair bandwidth in a way that avoids interference with other processes sharing the same bandwidth resources, such as an access process that is accessing data stored on the storage nodes, or a storage process that is storing data to the storage nodes. For example, the repair policy may detect that another process needs to use a significant part of the shared bandwidth for some period of time, and the repair process may suspend or significantly slow down its usage of repair bandwidth during this period of time and then use more repair bandwidth again after the other processes bandwidth needs have reduced. In this example, the repair policy is essentially running as a background process with respect to bandwidth consumption (e.g., the repair policy backs off on its usage of bandwidth in response to other processes increased bandwidth usage). As another example, the repair policy may have scheduled times when it uses repair bandwidth, and refrain from using repair bandwidth at other times, wherein the scheduled times of repair bandwidth usage are for example times when other processes that share the bandwidth resources are typically quiescent (e.g., the repair process uses repair bandwidth from 1 A.M. to 3 A.M. each morning when there is very little access or storage activity within the storage system). In these cases, the usage of repair bandwidth by the repair server is largely independent of the timing of data loss within the storage system (e.g., the timing of permanent or intermittent storage node failures).

The repair bandwidth constraint metric may be considered a primary storage system solution metric according to embodiments because, when the repair policy is so constrained, there is a known guaranteed maximum impact on applications reading and writing source data to/from the storage system. Another repair traffic metric, although perhaps of secondary importance to the repair bandwidth metric in embodiments, is the total amount of bytes transferred across the network over time by the repair policy over a long period of time.

The access efficiency metric may be considered with respect to a plurality of situations. For example, the access efficiency metric may be considered with respect to the case where there are no node failures (intermittent or permanent) amongst the storage nodes that are used to store the source data, and the case where there are node failures (intermittent or permanent) amongst the storage nodes that are used to store the source data. The amount of data read from storage nodes in order to access a chunk of source data is an important component of access efficiency because this largely determines the speed at which a chunk can be accessed. Ideally, the amount of data read to access a chunk should be equal to the size of the chunk.

Previous solutions for storing and accessing source data within a storage system have primarily focused on using a reactive repair policy with respect to data determined to be unavailable. In operation according to such reactive repair policies, data is scheduled for repair as soon as any data is lost on a permanently failed node, and as much bandwidth as necessary is used to perform the repair in a burst. A Markov chain analysis is typically applied to individual objects in the storage system for the reliability analysis of a reactive repair policy. The analysis assumes that the number of objects that need repair is always nearly zero, which is justified if the repair policy can always work quickly enough.

With a reactive repair policy, the overall amount of repair traffic generated is proportional to at least k+1 times the amount of data lost on permanently failed nodes, where k is the number of source symbols used by the erasure code. This is because each time a fragment of an object is lost on a permanently failed node, at least k fragments for that object are read by the repair policy to generate at least one repair fragment that is stored on replacement nodes.

Large erasure codes have generally not been considered with respect to solutions for reliably and efficiently storing and accessing source data within a storage system of unreliable nodes. The intuition that repair traffic increases as the value of k increases is likely one of the primary reasons that large erasure codes have not been considered viable for such storage system solutions. However, as will be shown herein, this intuition is valid only when using a reactive repair policy. Accordingly, embodiments implemented according to concepts herein utilize a lazy repair policy, rather than a reactive repair policy, in combination with large erasure codes, rather than the small erasure codes typically implemented with respect to storage system solutions. As shown below, large erasure code solutions in combination with a lazy repair policy achieves better trade-offs in storage efficiency, repair bandwidth efficiency, and reliability than is possible for any small erasure code solution. Moreover, the analysis provided herein shows quantitative trade-offs between feasible storage overhead, repair bandwidth, and reliability parameters for large erasure codes.

Although the use of large erasure codes with a traditional data organization generally results in a high cost of accessing source data that is not currently available (e.g., due to an intermittent node failure or due to a permanent node failure that has not yet been repaired), embodiments herein overcome this issue through the use of an alternative data organization, as described in detail below, that allows efficient access to all source data.

Figure 2A:
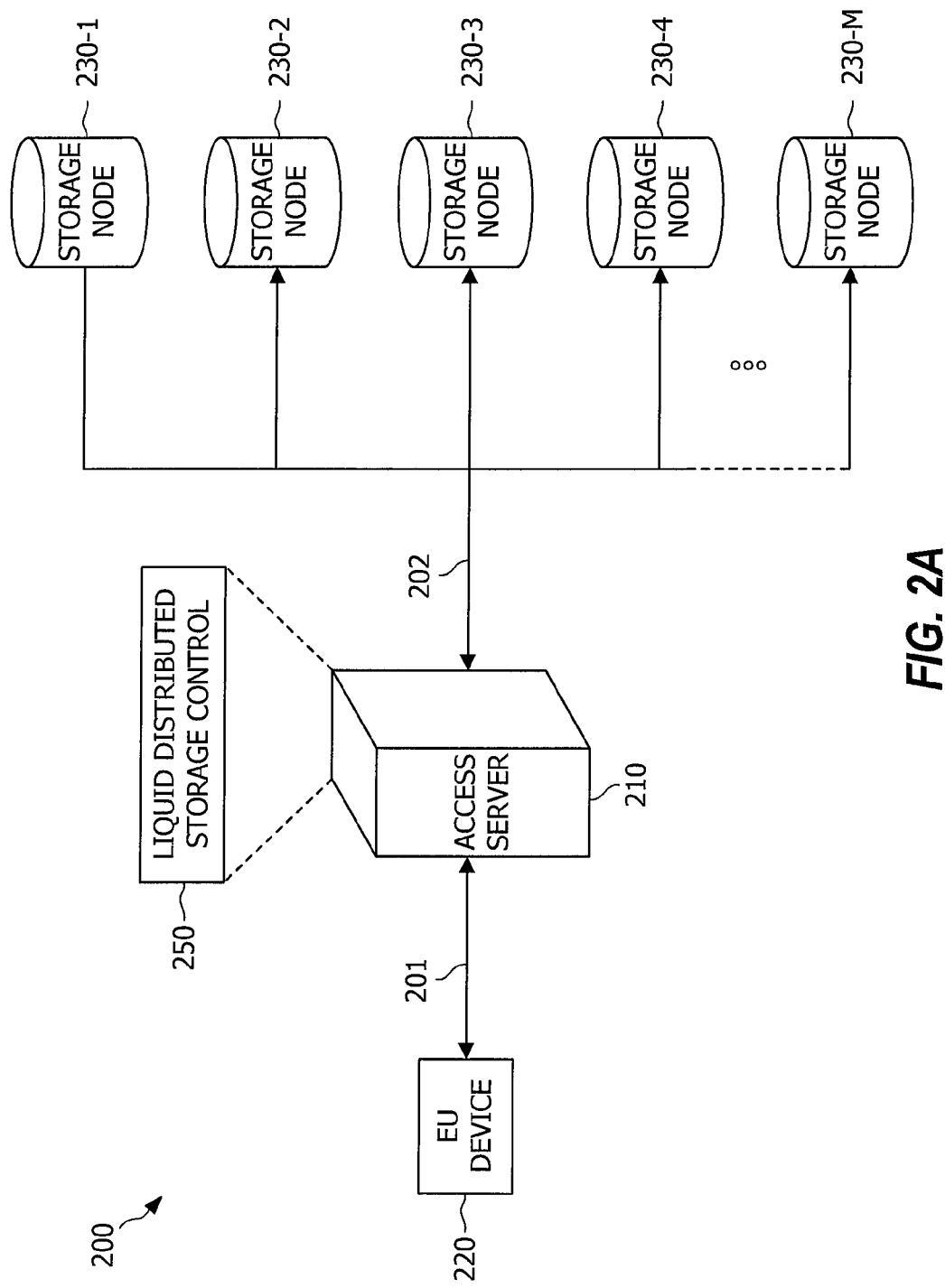
FIGS. 2A and 2B show a storage system adapted to provide liquid distributed storage control according to aspects of the present disclosure.
Figure 2B:
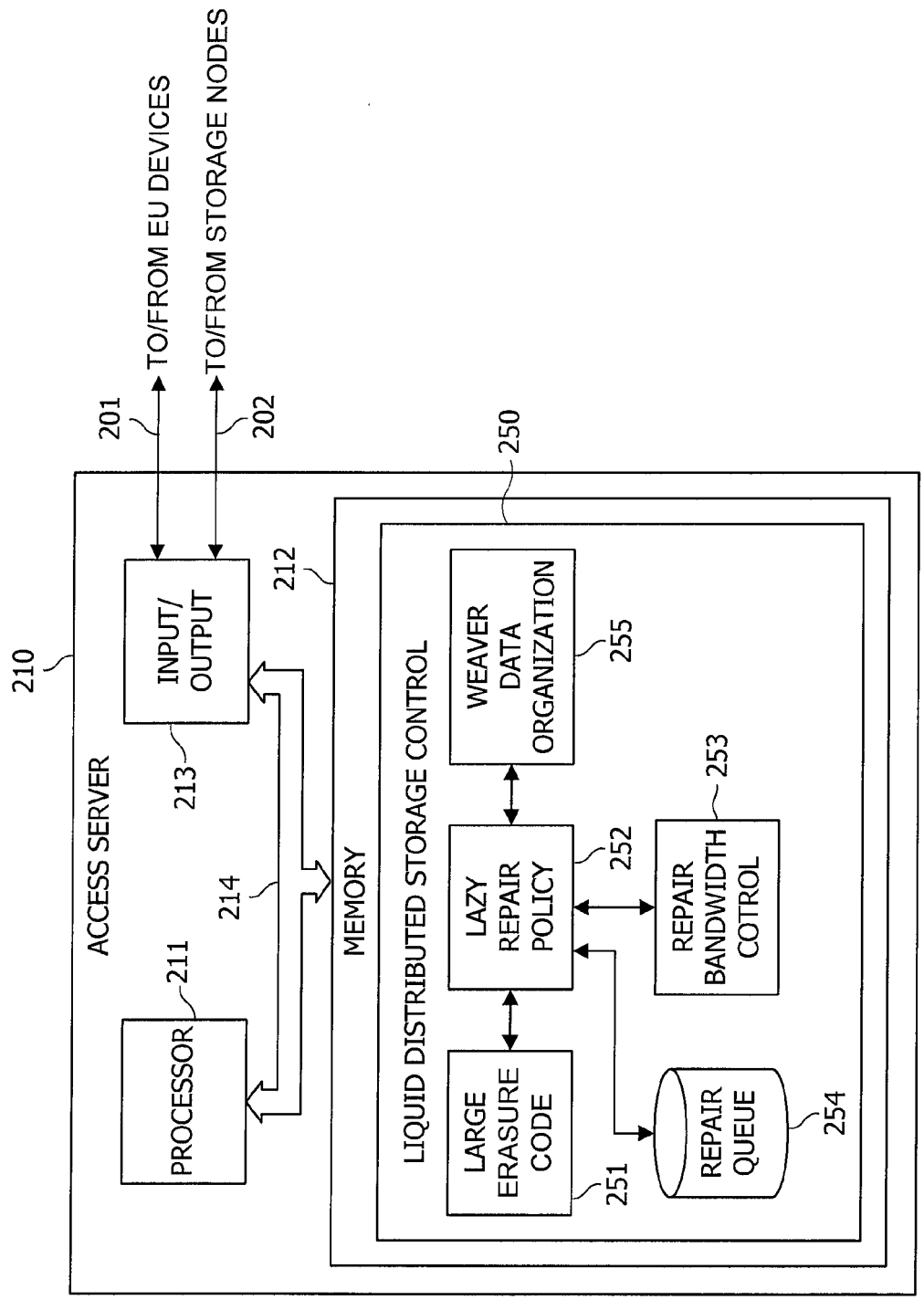

FIGS. 2A and 2B show storage system 200 adapted to provide liquid distributed storage control according the concepts disclosed herein. The exemplary embodiment of FIG. 2A shows access server 210, having liquid distributed storage control logic 250 according to the concepts herein, in communication with EU device 220 to provide storage services with respect thereto. Source data for which storage services are provided by storage systems of embodiments herein may comprise various configurations of data including blocks of data (e.g., source blocks of any size) and/or streams of data (e.g., source streams of any size). The source objects corresponding to such source data as stored by storage systems of embodiments, may comprise individual files, collections of files, data volumes, data aggregations, etc., as well as portions thereof, as may be provided for storage processing (e.g., encoding, writing, reading, decoding, etc.) as blocks of data, streams of data, and combinations thereof. Thus, source objects herein may comprise application layer objects (e.g., with metadata), a plurality of application layer objects, some portion of an application layer object, etc. Such source objects may thus be quite small (e.g., on the order of hundreds or thousands of bytes), quite large (e.g., on the order of megabytes, gigabytes, terabytes, etc.), or any portion of data which may be separated into fragments or portions of fragments as described herein.

Access server 210 may comprise one or more servers operable under control of an instruction set to receive data from devices such as EU device 220, and to control storage of the data and to retrieve data in response to requests from devices such as EU device 220, wherein the HTTP 1.1 protocol using the GET and PUT and POST command and byte range requests is an example of how an EU device can communicate with an access server 210. Accordingly, access server 210 is further in communication with a plurality, M, of storage nodes (shown here as storage nodes 230-1 through 230-M), wherein the HTTP 1.1 protocol using the GET and PUT and POST command and byte range requests is an example of how an access server 210 can communicate with storage nodes 230-1 through 230-M. The number of storage nodes, M, is typically very large, such as on the order of hundreds, thousands, and even tens of thousands in some embodiments. Storage nodes 230-1 through 230-M may comprise a homogeneous or heterogeneous collection or array (e.g., RAID array) of storage media (e.g., hard disk drives, optical disk drives, solid state drives, RAM, flash memory, high end commercial servers, low cost commodity servers, personal computers, tablets, Internet appliances, web servers, SAN servers, NAS servers, IAN storage servers, etc). providing persistent memory in which the electronic data is stored by and accessible through access server 210. EU device 220 may comprise any configuration of device (e.g., personal computer, tablet device, smart phone, personal digital assistant (PDA), camera, Internet appliance, etc.) which operates to generate, manage, and/or access electronic data. It should be appreciated that although only a single such device is shown, storage system 200 may operate to serve a plurality of devices, some or all of which may comprise devices in addition to or in the alternative to devices characterized as "end user" devices.

FIG. 2B shows additional detail with respect to access server 210 of embodiments. Access server 210 of the illustrated embodiment comprises a plurality of functional blocks, shown here as including processor 211, memory 212, and input/output (I/O) element 213. Although not shown in the representation in FIG. 2B for simplicity, access server 210 may comprise additional functional blocks, such as a user interface, a radio frequency (RF) module, a display, etc., some or all of which may be utilized by operation in accordance with the concepts herein. The foregoing functional blocks may be operatively connected over one or more bus, such as bus 214. Bus 214 may comprises the logical and physical connections to allow the connected elements, modules, and components to communicate and interoperate.

Processor 211 of embodiments can be any general purpose or special purpose processor capable of executing instructions to control the operation and functionality of access server 210. Although shown as a single element, processor 211 may comprise multiple processors, or a distributed processing architecture.

I/O element 213 can include and/or be coupled to various input/output components. For example, I/O element 213 may include and/or be coupled to a display, a speaker, a microphone, a keypad, a pointing device, a touch-sensitive screen, user interface control elements, and any other devices or systems that allow a user to provide input commands and receive outputs from access server 210.

Additionally or alternatively, I/O element 213 may include and/or be coupled to a disk controller, a network interface card (NIC), a radio frequency (RF) transceiver, and any other devices or systems that facilitate input and/or output functionality of access server 210. I/O element 213 of the illustrated embodiment provides interfaces (e.g., using one or more of the aforementioned disk controller, NIC, and/or RF transceiver) for connections 201 and 202 providing data communication with respect to EU device 220 and storage nodes 230-1 through 230-M, respectively. It should be appreciated that connections 201 and 202 may comprise various forms of connections suitable for data communication herein, such as provided by wireline links, wireless links, local area network (LAN) links, wide area network (WAN) links, SAN links, Internet links, cellular communication system links, cable transmission system links, fiber optic links, etc., including combinations thereof.

Memory 212 can be any type of volatile or non-volatile memory, and in an embodiment, can include flash memory. Memory 212 can be permanently installed in access server 210, or can be a removable memory element, such as a removable memory card. Although shown as a single element, memory 212 may comprise multiple discrete memories and/or memory types.

Memory 212 may store or otherwise include various computer readable code segments, such as may form applications, operating systems, files, electronic documents, content, etc. Access server 210 is operable to provide reliable storage of data within storage system 200 using liquid distributed storage control. Accordingly, memory 212 of the illustrated embodiments comprises computer readable code segments defining liquid distributed storage control logic 250, which when executed by a processor (e.g., processor 211) provide logic circuits operable as described herein. In particular, liquid distributed storage control logic 250 of access server 210 is shown in FIG. 2B as including a plurality of functional blocks as may be utilized alone or in combination to provide various aspects of liquid distributed storage for reliable storing data within storage system 200. Liquid distributed storage control logic 250 of the illustrated embodiment includes large erasure code logic 251, lazy repair policy 252, repair bandwidth control logic 253, and weaver data organization logic 255. It should be appreciated that embodiments may include a subset of the functional blocks shown and/or functional blocks in addition to those shown.

The code segments stored by memory 212 may provide applications in addition to the aforementioned liquid distributed storage control logic 250. For example, memory 212 may store applications such as a storage server, useful in arbitrating management, storage, and retrieval of electronic data between EU device 210 and storage nodes 230-1 through 230-M according to embodiments herein. Such a storage server can be a web server, a NAS storage server, a SAN storage server, an IAN storage server, and/or the like.

In addition to the aforementioned code segments forming applications, operating systems, files, electronic documents, content, etc., memory 212 may include or otherwise provide various registers, buffers, caches, queues, and storage cells used by functional blocks of access server 210. For example, memory 212 may comprise one or more system map that is maintained to keep track of which fragments are stored on which nodes for each source object. Additionally or alternatively, memory 212 may comprise various registers storing operational parameters, such a erasure code parameters, utilized according to embodiments. Likewise, memory 212 may comprise one or more repair queue, such as repair queue 254, providing a hierarchy of source object instances for repair processing.

In operation according to embodiments, the source blocks of electronic data are stored in storage system 200 as objects. The source objects utilized herein may, for example, be approximately equal-sized. Source blocks, and thus the corresponding objects stored by the storage system, may comprise individual files, collections of files, data volumes, data aggregations, etc. and may be quite large (e.g., on the order of megabytes, gigabytes, terabytes, etc.). Access server 210 may operate to partition arriving source data into source objects and to maintain mapping of the source data to the source objects (e.g., Map:App-Obj comprising an application or source object map providing mapping of source data to objects). Access server 210 may further operate to erasure encode the source objects, divide the source objects into fragments, store each fragment of a source object at a different storage node, and maintain a source object to fragment map (e.g., Map:Obj-Frag comprising an object fragment map providing mapping of objects to fragments). Accordingly, the objects are partitioned by logic of access server 210 into fragments for storage in the storage system. For example, an object may be partitioned into k fragments for storage in storage system 200. Each of the k fragments may be of equal size according to embodiments. In operation according to embodiments herein, and as will be better understood from the discussion which follows, the aforementioned fragments may comprise a plurality of symbols.

In implementing such partitioned storage of source data according to embodiments there can be a unique encoded symbol ID (ESI) associated with each of the M storage nodes, and all fragments stored on the storage node are generated using the ESI associated with that node. Thus a mapping may be maintained for each storage node indicating the associated ESI and a mapping may be maintained for each source object indicating which fragments are stored on which storage nodes (e.g., a Map:Obj-Frag map indicating the encoded symbol ID (ESI) and the storage node ID for each fragment of each source object). The foregoing mapping information may be updated for source objects indicating which fragments are available when a storage node permanently fails. Access server 210 may operate to determine which source object particular source data (e.g., source data requested by EU device 220) is contained within (e.g., using a Map:App-Obj map) and to read the data from the storage nodes storing the appropriate fragments by determining which of the fragments contain relevant source or repair data (e.g., using a Map:Obj-Frag map).

In providing resilient and reliable storage of the data, access server 210 of embodiments utilizes one or more erasure codes with respect to the source objects, wherein repair fragments are generated to provide redundant data useful in recovering data of the source object. For example, embodiments of liquid distributed storage control logic implement maximum distance separable (MDS) erasure codes parameterized as (n; k; r), where k is the number of source symbols in a source block, n is the total number of encoded symbols, and r=n−k is the number of repair symbols. A property of MDS erasure codes is that all k source symbols can be recovered from any k of the n encoded symbols. In operation, each fragment (i.e., the source fragments and repair fragments) of a source object is stored at a different storage node than the other fragments of the source object. The storage overhead is the ratio of the total amount of repair data for all objects divided by the total amount of source and repair data for all objects in the storage system. Thus, the storage overhead is the fraction of the used storage that is not for source data.

In some cases, source data is not directly stored in the storage system, only repair data. In this case, there are n repair fragments stored in the storage system for each object, where generally any k (for some erasure codes slightly more than k is sometimes utilized) of the n fragments can be used to recover the original object, and thus there is still a redundant storage of r=n−k repair fragments in the storage system beyond the k needed to recover the object. An alternative type of storage overhead is the ratio of the total amount of repair data divided by the total amount of source data, i.e., the storage overhead is r/k for this type. Generally herein r/n is used as the storage overhead, and one skilled in the art can see that there is a conversion from one type of storage overhead to the other type of storage overhead.

As discussed above, an (n; k; r) erasure code solution, wherein (n; k; r) are small constants, is said to be a small erasure code solution if n<<M. In utilizing such a small erasure code, a source object is typically partitioned into k source fragments which are erasure encoded to generate n encoded fragments, wherein r of the n fragments are repair fragments. Of the M storage nodes in the storage system, n storage nodes may then be chosen (e.g., storage nodes chosen randomly, storage nodes having independent failures chosen, etc.) and the n fragments stored to the n chose storage nodes, one fragment per storage node. The repair strategy traditionally implemented with respect to such small erasure codes is a reactive repair policy.

In operation according to a reactive repair policy, the repair of missing fragments is implemented at a high bandwidth when a storage node fails. That is, the repair policy causes repair server functionality of an access server to attempt to repair fragments lost on a storage node as soon as possible in order to repair a failed storage node before another storage node fails and in order to avoid source objects having more than one missing fragment (as is generally necessary in order to meet reliability targets in light of the small number of repair fragments, or redundant data, available using a small erasure code). Such reactive repair policies use a large amount of burst repair traffic at times that are dictated by when nodes fail and not at scheduled times. Thus, the burst repair traffic might occur at times when other processes that share the bandwidth are active, such as access processes retrieving data from the storage system or storage processes storing data to the storage system. Thus, if one of these other processes happens to be actively using bandwidth in a period of time that overlaps with the burst repair traffic triggered by a storage node failure, the performance of these other processes can be negatively impacted (e.g., degraded, by the burst repair traffic).

Although small erasure codes, such as those described above (i.e., n<<M), may be utilized in some embodiments of a liquid distributed storage solution, the illustrated embodiment of access server 210 implements a large erasure code solution (e.g., using large erasure code logic 251) to provide additional benefits as will be appreciated from the discussion which follows. In utilizing such a large erasure code according to embodiments, a source object may be partitioned into k source fragments which are erasure encoded to generate n encoded fragments, wherein r of the n fragments are repair fragments. The n fragments may then be stored to the M storage nodes, one fragment per storage node. Accordingly, it should be appreciated that an (n; k; r) erasure code solution is a large erasure code solution if n=M (i.e., for each source object there are fragments stored at all the storage nodes), if n is a significant fraction of M (e.g., n≥½·M), or if n is large although perhaps chosen independently of M (e.g., n≥50, or n≥30). An exemplary large erasure code such as may be utilized according to embodiments herein include RAPTORQ as specified in IETF RFC 6330, available from Qualcomm Incorporated. Further examples of large erasure codes as may be utilized herein include RAPTOR as specified in IETF RFC 5053, LDPC codes specified in IETF RFC 5170, tornado codes, and Luby transform (LT) codes.

Liquid distributed storage control logic 250 of embodiments implements a repair policy in order to provide recovery of lost fragments and thereby facilitate resilient and reliable storage of the source data. For example, a repair policy of liquid distributed storage control 250 may run in the background (e.g., as a background task to a storage server application) to monitor storage nodes to determine which storage nodes have failed and provide operation to replace fragments stored on the failed storage node. In operation according to embodiments, an object to fragment mapping (e.g., the aforementioned Map:Obj-Frag map) may be utilized to keep track of where fragments are located such that when a storage node is determined to have permanently failed the loss of the fragments stored thereby are identified (e.g., the fragments which are no longer available due to failure of the storage node are determined). These fragments, or some portion thereof, may be tracked in a repair queue for repair operations in accordance with the repair policy.

Although it may be beneficial to use a reactive repair policy (i.e., when a fragment of an object is lost due to a permanent node failure, the repair policy replaces the lost fragment with another fragment as quickly as possible) for a small erasure code solution, embodiments utilize a lazy repair policy (i.e., objects are allowed to accumulate whereby they are repaired at a steady repair rate, R), such as through operation of lazy repair policy logic 252. In implementing a lazy repair policy according to embodiments, the repair rate, R, is designed to ensure a large mean time to loss of any source data (MTTDL). Additionally or alternatively, repair bandwidth usage may be scheduled to occur independent of the timing of node failures. For example, repair bandwidth may be scheduled to be used for a couple of hours each night when other bandwidth activity, such as access or storage of data, is quiescent. Thus, the repair process may use most or all of the available bandwidth for a short period of time on a regular basis, to avoid interrupting or disrupting other bandwidth intensive activities such as access or storage of data. As another example, the repair process may be scheduled to occur only occasionally when the storage system is powered up, and at other times the storage system is powered down to save on energy consumption and costs. The scheduling of the repair process to use repair bandwidth may also be on an irregular basis (i.e., scheduled when other processes such as reading or writing data to storage are relatively inactive). In every case, the repair bandwidth usage can be crafted to avoid interrupting other processes that send or receive data over some or parts of the same networking paths as used by the repair process, and the repair bandwidth usage can be so crafted independently of the timing of data loss events such as storage node failures.

It should be appreciated that embodiments may implement a repair policy other than a lazy repair policy, such as a reactive repair policy. With a reactive repair policy, however, the overall amount of repair traffic generated is proportional to at least k+1 times the amount of data lost on permanently failed storage nodes. This is because each time a fragment of a source object is lost on a permanently failed storage node, at least k fragments for that object are read by the repair policy to generate at least one repair fragment that is stored on replacement storage nodes. The intuition that repair traffic increases as the value of k increases is likely one of the primary reasons that large erasure codes have not been considered viable for a storage system. However, this intuition is valid only when using a reactive repair policy and is not valid when using a lazy repair policy in accordance with embodiments herein.

In operation, logic of the repair policy may, based on the aforementioned system maps, determine for each source object which fragments are available and which are missing. Repair processing is performed according to embodiments with respect to those fragments which are determined to be permanently lost, such as due to permanent failure of the storage node upon which the fragment is stored. Permanent failure of the storage nodes is often modeled by a Poisson process parameterized by $\lambda$, which denotes the failure rate of each node according to an exponential distribution.

The repair policy of embodiments maintains a repair queue of object instances (e.g., repair queue 254), wherein a source object instance is added to the repair queue for a source object when it is possible to generate and store additional fragments for that source object (e.g., when storage nodes that store fragments for that source object have failed, when new or replacement storage nodes have been added to the storage system, etc.). Embodiments implementing a large erasure code solution using a lazy repair policy may operate to add a source object instance to the repair queue when a pre-specified minimum number minQ>1 of fragments for that source object are lost due to node storage failures, such as to limit the overall amount of repair traffic. However, analysis suggests that setting minQ=1 maximizes the reliability and minimizes the repair network bandwidth used by the repair policy of both small erasure code solutions and large erasure code solutions. Furthermore, analysis suggests that lazy repair policies implemented according to embodiments described herein rarely process source objects until many fragments are missing for the object for large erasure code solutions. Thus, setting minQ>1 may, in practice, provide no different operation than setting minQ=1. All descriptions herein therefore assume minQ=1.

Whenever there is at least one source object instance in the repair queue the repair policy of embodiments works to repair the source objects corresponding to source object instances in the repair queue. For example, logic implementing the repair policy may linearly cycle through the object instances in the repair queue, read in at least k fragments to recover a source object in need of repair, and generate and store additional fragments for the source object on one or more replacement storage nodes.

Although all data stored on a storage node is lost when the storage node fails permanently, storage nodes can intermittently fail, in which case the data stored on them is only temporarily unavailable. It would be counterproductive for a repair policy to repair data due to an intermittent storage node failure, as the network bandwidth cost for the repairs would potentially be quite high and ultimately unnecessary. Accordingly, repair policies implemented according to embodiments operate to implement logic for avoiding repairing intermittently failed storage nodes.

Accordingly, logic of the repair policy may utilize an intermittent failure threshold time, T, to delay adding an instance of a source object to the repair queue for avoiding repairing intermittently missing data. For example, an intermittent failure threshold time, T, may establish a time between when a storage node fails and when the repair policy can start repair of data lost on that storage node. In accordance with embodiments the intermittent failure threshold time may be set to 30 minutes (i.e., T=30 minutes). This value in some systems provides a reasonable amount of time to distinguish between a temporary and permanent failure, since typically more than 90% of the time when a storage node fails it is only an intermittent failure and it comes back online within a few minutes. Examples of reasons for intermittent storage node failures include software or firmware upgrades, maintenance, intermittent issues, etc. In these cases, even though permanent storage node failures may be detected within 30 minutes, it may be considerably longer until storage nodes are replaced and the repair policy can start storing fragments on replacement storage nodes. For example, it may be more cost effective to replace permanently failed storage nodes on a less urgent basis (e.g., after a permanent failure has been detected it may be days or even weeks before it is cost effective or practical to replace the storage node).

It should be appreciated that, for small erasure code solutions, there may be spare capacity on storage nodes that remain functioning that may be used to store additional fragments for source objects to replace fragments on permanently failed storage nodes. Thus, source objects that have lost fragments on a permanently failed storage node can start to be repaired as soon as the storage node failure is determined to be permanent. This approach does, however, require spare storage node capacity and does have some mapping complexity and load balancing challenges. For example, replacement storage nodes are typically added as storage nodes permanently fail, and using these replacement storage nodes in a balanced way can be challenging. In contrast, for large erasure code solutions implemented according to embodiments herein, since there is a fragment on each storage node for each source object, when a storage node permanently fails the fragments lost on that storage node are eventually replaced by fragments put onto the replacement storage nodes.

In operation according to embodiments, source object instances within the repair queue are prioritized by logic of the repair policy. For example, as to source objects using the same level of partitioning (i.e., the same value of k), the source object instances corresponding to source objects with the least amount of available fragments may be provided the highest priority, and source object instances added earlier to the repair queue than other source object instances may be provided higher priority if the corresponding source objects have an equal number of available fragments. Additionally or alternatively, particular source objects may be provided prioritized repair operation in the repair queue, such as to provide a higher level of reliability (e.g., where the particular source objects are deemed more important than other source objects, where a client associated with the particular source objects is to receive a higher quality of service (QoS), etc.). For example, the default can be that normal objects with same number of available fragments have the same priority, but higher priority objects with a given number f of available fragments can have the same priority within the repair policy as normal priority objects with f fragments available, where f'<f. Priorities can be indicated, for example, by providing a list of integers associated with each object (e.g., 0, 1, 2, 3, 4, etc. may provide the priority list for normal priority objects, whereas 100, 110, 111, 115, etc. may provide the priority list for higher priority objects, wherein these lists may be provided either explicitly or implicitly computed based on a formula provided for each such type of priority), whereby the interpretation is that when a first object has k+j available fragments where the value j is in its associated list at position i then the first object has the same priority in the repair policy as a second object that has k+j' available fragments where the value j' is in its associated list at position i. Such prioritization levels can be fairly fine grain since there are so many fragments for large erasure code solutions.

It should be appreciated that the prioritization according to embodiments herein accommodates various relative situations with respect to the source objects. For example, the foregoing prioritization scheme accommodates situations where some source objects have more repair fragments associated therewith than do other source objects as well as situations where certain source objects are preferred over other source objects by the repair process, even though the source objects may have the same number of available fragments at that point in time. As another example of different types of priorities for different objects, objects may be classified for example into either being of type 1 or type 2, wherein the total amount of provisioned repair bandwidth R is partitioned into $R_1$ and $R_2$ (e.g., $R=R_1+R_2$) and objects that are of type 1 are processed in a repair queue using average repair bandwidth at most $R_1$ and objects that are of type 2 are processed in a repair queue using average repair bandwidth at most $R_2$. Thus, if $D_1$ is the total size of objects of type 1 and $D_2$ is the total size of objects of type 2, then the two types of objects would have approximately equal priority if $R_1=D_1/(D_1+D_2)\cdot R$, and thus objects of type 1 will have higher priority (better MTTDL) than objects of type 2 if $R_1>D_1/(D_1+D_2)\cdot R$. The number of priorities can be naturally extended from two priorities to any number of priorities according to embodiments herein.

In providing liquid distributed storage control, embodiments herein constrain the repair bandwidth used by the repair policy to be a small fraction of an overall global amount of bandwidth available or used by the storage system. For example, the repair bandwidth is constrained to an extent that the queue of objects needing repair builds up and the objects are repaired as a flow (i.e., to an extent the repair policy is operating in a liquid regime and liquid analysis is applicable). Accordingly, as will be more fully understood from the discussion which follows, the illustrated embodiment of liquid distributed storage control 250 includes repair bandwidth control logic 253, such as may operate in cooperation with repair policy logic such as lazy repair policy logic 252 to constrain the repair bandwidth utilized in repair processing.

A repair bandwidth metric utilized in providing the aforementioned repair bandwidth constraint according to embodiments is an amount of bandwidth provisioned to be used by the repair policy, whereby the repair policy is constrained by this provisioned bandwidth at each point in time. It should be appreciated that, although the descriptions below assume this instantaneous definition of repair bandwidth, results provided according to the concepts herein hold for the case when considering average repair bandwidth over a relevant period of time instead of instantaneous repair bandwidth. More generally, the repair bandwidth used by the repair process may be varied according to a periodic schedule, in reaction to activity by other processes, or according to various other criteria as long as the average repair bandwidth usage over relevant windows of time is sufficient to achieve the provisioned MTTDL. The average amount of provisioned repair bandwidth that is sufficient to achieve a provisioned MTTDL may depend on the amount of source data stored in the storage system, the storage overhead, the rate at which data is lost from the storage system, and other similar parameters, and thus the average amount of provisioned repair bandwidth may be adjusted slowly over time in response to changes to these parameters.

In operation according to embodiments, the amount of bandwidth provisioned to be used by the repair policy may be automatically adjusted from time to time. For example, the amount of bandwidth, and thus the repair rate, R, realized may be periodically adjusted based on projected or actual data loss rate from the storage nodes and/or the data redundancy provided by the repair policy solution implemented. In accordance with embodiments, logic of repair bandwidth control logic 253 may operate to make calculations to determine, based on the total amount of source data stored in the storage system, a projected or actual data loss rate, a repair rate which assures that the repair policy being implemented can process the queued source object instances to repair the lost data before there is sufficient fragment loss resulting in permanent loss of data.

The graph of FIG. 3A illustrates operation of an embodiment of lazy repair policy logic 252 in cooperation with repair bandwidth control logic 253 providing lazy repair of source objects when constraining the repair bandwidth to provide a steady repair rate, $R_{LAZY}$, resulting in an acceptable known guaranteed maximum impact on applications reading and writing source data to and from storage system 200. That is, although storage nodes may fail at various instances in time (e.g., as designated along the time axis in FIG. 3A), lazy repair policy logic 252 operates to implement repair of the source objects using an amount of repair bandwidth as set by repair bandwidth control 253. More generally, the amount of repair bandwidth used can be allocated by the repair policy in a way that is largely independent of the timing of storage node failures.

The foregoing steady repair rate is in contrast to the bursty repair rate of a reactive repair policy, as typically implemented with respect to a small erasure code, where the timing of the burst of repair bandwidth usage depends on the timing of the node failure, and may be at a time that interferes with operation of other processes such as access or storage, or may occur at times of planned quiescent periods when for example the storage system power usage is to be minimized. In analyzing the repair traffic associated with operation of a reactive repair policy the failure rate of individual storage nodes may be represented as $\lambda$ and thus the overall failure rate of the storage nodes may be represented as $\lambda \cdot M$. The total size of source objects stored in the storage system may be represented by $D_{SRC}$, and the total amount of data that might be stored in the storage system for these storage objects, with n fragments per source object, may be represented by $D_{ALL}=D_{SRC}\cdot n/k$. In determining the average repair traffic ($A_{FAST}$) for a reactive repair policy, $\lambda \cdot M$ is the average rate at which a storage node fails, $D_{ALL}/M$ is the average amount of data lost on a failed storage node, and the needed repair bandwidth to restore data lost on a storage node is k+1 times the amount of data on a failed storage node, thus providing $A_{FAST}=\lambda \cdot D_{ALL}(k+1)$, as represented in the graph of FIG. 3B. However, also as illustrated in FIG. 3B, the repair rate spikes upon detection of a storage node failure (i.e., the actual repair rates shown following the storage node failures as designated along the time axis in FIG. 3B) in association with repair processing which attempts to repair the data as soon as possible after the storage node failure is detected. It should be appreciated that, although the bursts of repair bandwidth utilization illustrated in FIG. 3B are illustrated as having a same magnitude for simplifying the figure, the magnitude of such bursts may vary significantly in correspondence to the number of source objects having fragments lost in association with a source node failure (i.e., $R_{FAST1}$, $R_{FAST2}$, $R_{FAST3}$, and $R_{FAST4}$ of the example may have different magnitudes). In order to ensure reliability in a storage system implement a small erasure code and reactive repair policy, the repair bandwidth, $R_{FAST}$, must be greater (possibly significantly greater) than the average repair traffic (e.g., $R_{FAST} > A_{FAST}$). That is, the storage system should implement repairs at a much higher rate than the average loss rate to ensure data remains recoverable (e.g., at least k fragments are available with respect to each source object) when there are multiple failures of storage nodes (e.g., over a short period of time).

From the forgoing description of operation of a reactive repair policy with respect to a small erasure code, it can be seen that the average repair traffic would be increased where a large erasure code were utilized in place of a small erasure code. However, utilization of a lazy repair policy in accordance with embodiments herein avoid such undesirable or unacceptable repair traffic. In operation of a lazy repair policy, a modest amount of repair bandwidth (e.g., that may be constrained at a predetermined level, such as based upon one or more repair parameters) may be utilized in repairing the fragments of source objects. For example, the repair bandwidth may be calculated and perhaps slowly adjusted (and thus the lazy repair rate, $R_{LAZY}$, constrained), such as based on projected or actual redundancy data loss. In operation of such a lazy repair process, source objects are typically repaired only after a number, possibly large number (e.g., source object fragments numbering $\epsilon \cdot r$ or more, wherein $\epsilon = \frac{1}{2}$ for example), of fragments for that source object are lost.

Implementation of a lazy repair policy according to embodiments operates to constrain the repair bandwidth and provides a steady repair rate, $R_{LAZY}$, approaching the product of the redundancy of the erasure code and the rate of loss of data by the storage system. That is $R_{LAZY} \approx \beta \cdot \mu$, wherein $\beta$ is the redundancy of the erasure code and the storage overhead of the storage system (i.e., $\beta = r/n$) and $\mu$ is the storage system data loss rate. The time to repair all source objects by such a lazy repair process is at most the total amount of possible data in the storage system, $D_{ALL}$, divided by the repair rate, $R_{LAZY}$, ($D_{ALL}/R_{LAZY}$). The repair rate, $R_{LAZY}$, is thus selected so as to enable the repair process to process the source objects before more than a number of source nodes equaling the number of repair symbols, r, are lost. That is, no object will be lost if the number of storage node failures over any period of duration t is at most $r = \beta \cdot M$. If $\lambda \cdot M \cdot t = r$ then the expected number of storage node failures in time t is r. Solving this equation, $R_{LAZY} = \lambda \cdot M \cdot D_{ALL}/r = \lambda^* D_{ALL}/\beta$. Thus, embodiments herein may set $R_{LAZY} = \delta \cdot \lambda \cdot D_{ALL}/\beta$, wherein $\delta$ may be selected depending on a desired level of reliability (e.g., $\delta > 1$, wherein the MTTDL is high when $\delta$ is slightly greater than one because r is large when a large erasure code is used). Such an implementation provides efficient repair operation facilitating reliable and resilient data storage as the repair bandwidth utilized is a near optimal function of the data loss rate and data redundancy.

Figure 3C:
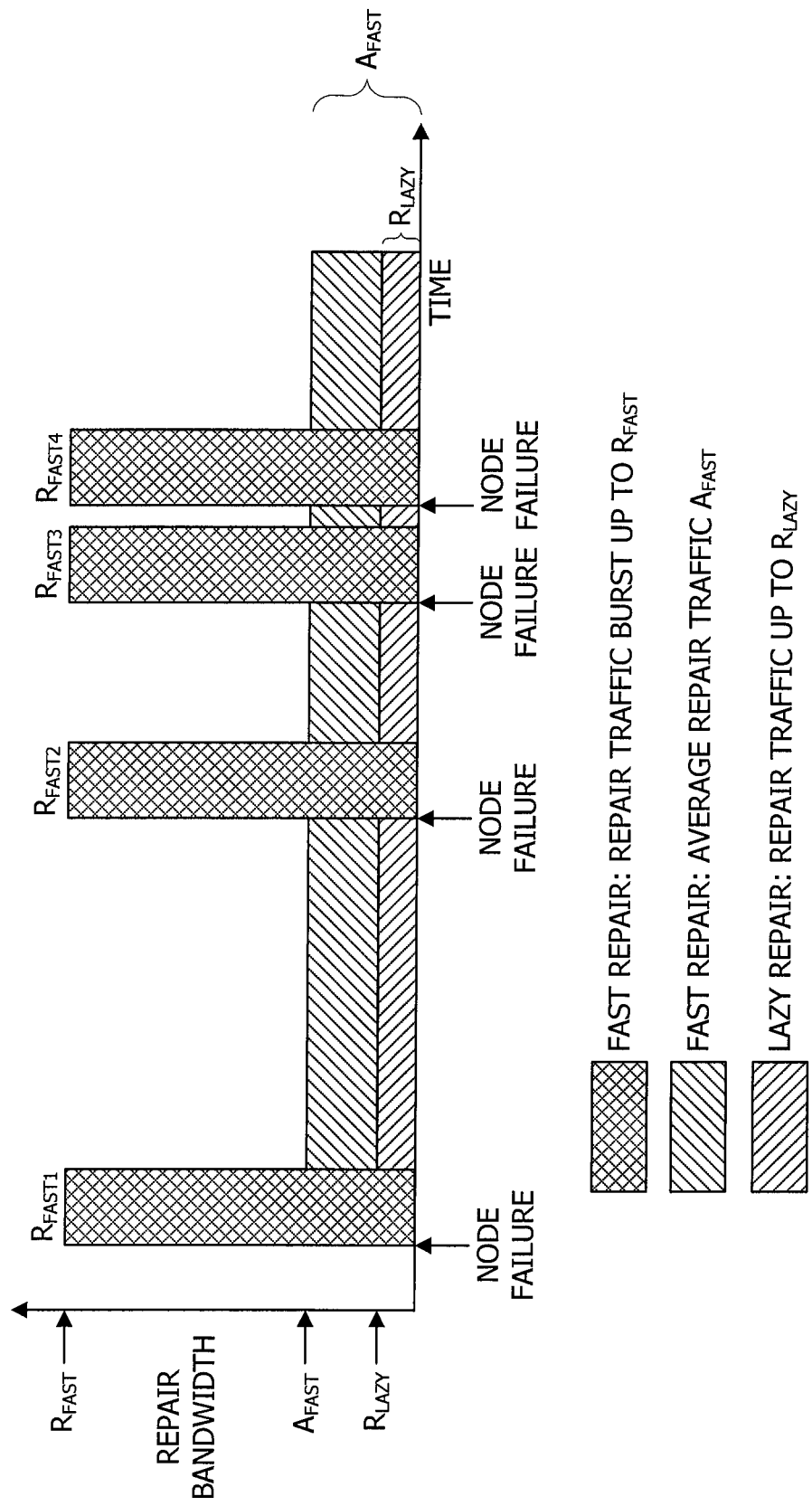
FIG. 3C shows a comparison of operation of a reactive repair policy with operation of a lazy repair policy according to aspects of the present disclosure.

The graph of FIG. 3C shows a comparison of operation of a reactive repair policy using a small erasure code (as shown in FIG. 3B) with an embodiment of a lazy repair policy using a large erasure code (as shown in FIG. 3A). As can be seen in the illustrated example, the repair bandwidth utilized by the lazy repair policy ($R_{LAZY}$) is not only significantly less than the peak repair bandwidth of the reactive repair policy ($R_{FAST}$), and often even less than the average repair bandwidth of the reactive repair policy ($A_{FAST}$), but is constrained so as to avoid the busty repair traffic resulting from operation of the reactive repair policy. Such lazy repair policy bandwidth utilization works well with the storage system's access and storage policies which each will attempt to use an amount of the total available bandwidth for storage of and access to the data by the client applications. The value of $R_{LAZY}$ may be an average repair bandwidth over a relatively long period of time, and the actual usage of repair bandwidth over shorter intervals of time may be adjusted or regulated based on a number of factors, such as avoiding interference with periods of high bandwidth activity by other processes (e.g., access or storage processes, or avoiding repair bandwidth usage during periods of time when the storage system is powered down to save power).

When utilizing traditional data organization schemes (i.e., dividing the source object into blocks of contiguous data) there is a high cost of accessing source data that is not currently available (e.g., due to an intermittent storage node failure or due to a permanent storage node failure that has not yet been repaired). For example, the access properties of a typical storage system, such as that provided by an AZURE cloud platform available from Microsoft Corporation, provide for reading f(L) bytes from the storage nodes to access L bytes of source data, wherein the value of f(L) depends on the state of the storage system. If the source data is within source fragments on available storage nodes, the system may directly read the source data from the storage nodes, and thus f(L)=L and the access is read efficient (although the read may be from one storage node which, if that storage node is operating slowly for any reason, may dramatically degrade the read performance). However, if the source data is within one or more source fragment on failed storage nodes, direct reading of the data fails and the reads are slowed down or even stalled (e.g., waiting on the read to resolve). The source data may be recovered from k other fragments on available storage nodes, whereby f(L)=k·L and thus the access is read inefficient by a factor of k (note that if L<NBsize then higher read complexity is experienced with respect to all storage nodes). It should be appreciated that the forgoing read inefficiency, wherein k times the amount of data being accessed is read for recovering data in the case of a failed storage node is particularly problematic with respect to the use of a large erasure code, wherein k is quite large. Accordingly, embodiments of liquid distributed storage control logic 250 implement an alternative data organization (referred to herein as the weaver data organization), such as may be implemented by weaver data organization logic 255, that allows efficient access to all source data even when using a large erasure code.

The weaver data organization implemented according to embodiments provides for concatenation of short source blocks from the source object for inclusion of a symbol of each source block in each of a plurality of the generated source fragments. In operation of the weaver data organization technique of embodiments, the source object may be thought of as a stream, as opposed to an object of a particular size, whereby the data of the stream is splayed into fragments (e.g., as if a rope into strands). For example, a source object may be splayed into a plurality of strands, wherein data for each of those strands is written to a different node as a fragment. In operation according to embodiments implementing a weaver data organization, an object can be erasure coded as it is arriving. In accordance with embodiments, the source block is a very small fraction of the object, whereby the symbol size, Ssize, is set to a small value independent of object size, Osize, each k·Ssize bytes is another source block, and the source block is partitioned into k source symbols. In operation, r repair symbols may be erasure encoded (n=k+r) for each source block. Symbol i from each source block may then be added to fragment i according to embodiments of a weaver data organization, thereby providing an interleaved pattern of source data of objects stored in each source fragment wherein each fragment may be stored in a different storage node. This streaming type concatenation of the source object allows the repair policy to avoid handling large objects, instead streaming data into the storage nodes at a very fine granularity (e.g., Bsize is a small fraction of NBsize). Similarly, if a portion of the source data is lost, the concatenated source block data structure of the weaver data organization facilitates reading only small portions from other fragments which in the aggregate equal the size of the missing data (i.e., the amount of data read to recover the missing data is the original size of that missing data, as opposed to k times the size of the missing data as in a traditional data organization scheme).

In an example of the use of the foregoing weaver data structure, stripe j may be encoded, wherein the source object is being broken up into stripes which each comprises a source block. In this example, source block j includes bytes j·k·Ssize . . . (j+1)·k·Ssize−1 of the source object. The encoded symbol may be represented as Enc(i,j), wherein i is the source symbol number (e.g., the ESI or encoding symbol ID) and j is the source block number. Thus, fragment i contains Enc(i,j) in bytes j·Ssize . . . (j+1)·Ssize−1. The foregoing exemplary stripe j may be decoded given Enc(i,j) from fragment i for at least k values of i (e.g., bytes j·k·Ssize . . . (j+1)·k·Size−1 of the source object can be recovered).

Figure 4A:
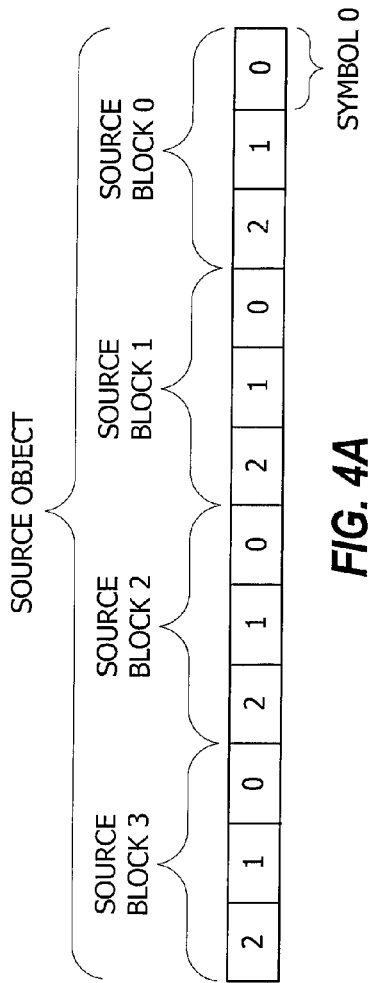
FIGS. 4A and 4B show a representation of a source object partitioned into source fragments, wherein each source fragment comprises a concatenation of symbols from source blocks in the source object according to aspects of the present disclosure.
Figure 4B:
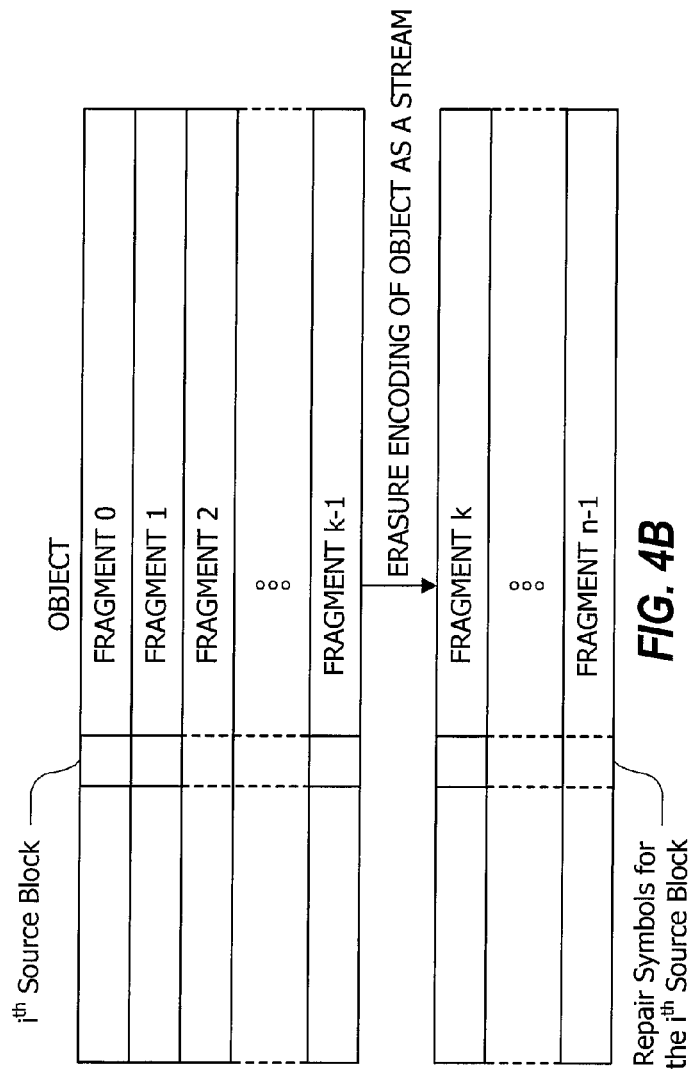

FIGS. 4A, 4B, 4D-4N show a high level representation of operation implementing a weaver data structure according to embodiments herein. The diagram of FIG. 4A shows a representation of a source object partitioned into source blocks and source fragments, wherein source fragment i comprises a concatenation of symbol i from the source blocks in the source object according to an embodiment of the weaver data organization. Referring to FIG. 4B, the $i^{th}$ symbol from source Fragment 0 (which has ESI=0), the $i^{th}$ symbol from source Fragment 1 (which has ESI=1), the $i^{th}$ symbol from source Fragment 2 (which has ESI=2), . . . and the $i^{th}$ symbol from source Fragment k−1 (which has ESI=k−1) are used to generate the $i^{th}$ symbols for Fragments k, k+1, . . . , n−1 (with corresponding ESIs=k, k+1, . . . , n−1). This is repeated, using a next symbol of the source Fragments 0, 1, . . . , k−1 to generate a next symbol for each of the repair fragments (e.g., Fragments k, k+1, . . . , n−1). As can be appreciated from the foregoing, the $i^{th}$ symbol from each source block is put into Fragment i.

In the embodiment of the weaver data structure illustrated in FIG. 4A, the source object size is much greater than the source block size, where Bsize is the size of the source block in bytes and Osize is the size of the object in bytes, and thus Bsize<<Osize and the node block size (i.e., the size of a typical fast read) is much greater than the number of bytes in a symbol, where Ssize is the size of a symbol in bytes and NBsize is the size of a node block in bytes (the node block being the efficient read unit of data from the storage nodes, e.g., 500 bytes to hundreds of kilobytes depending upon the particular storage technology), and thus Ssize<<NBsize.

Figure 4C:
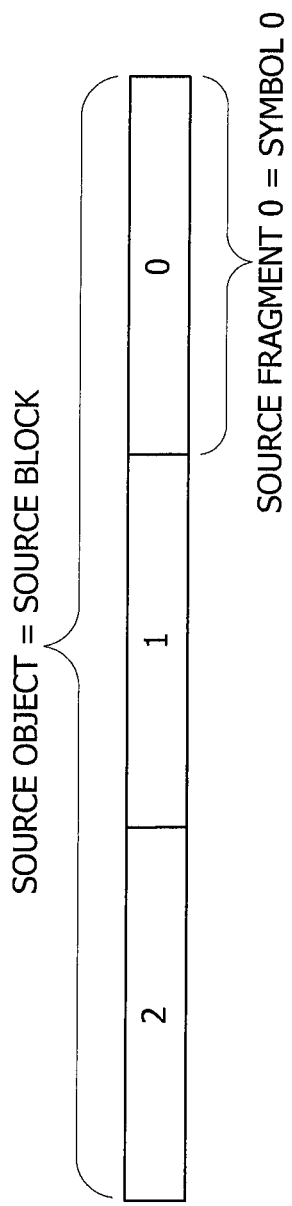
FIG. 4C shows a traditional data structure providing fragments comprised of blocks of contiguous bytes from the source data.

In contrast to the concatenated configuration provided by the weaver data structure, the traditional data structure provides fragments comprised of blocks of contiguous bytes from the source data (e.g., source fragment 0=symbol 0 from the source block), as illustrated in the diagram of FIG. 4C. It should be appreciated that in the data structure illustrated in FIG. 4C, the source object size and source block size are equal (Bsize=Osize) while the number of bytes in a symbol is much greater than the node block size (Ssize>>NBsize).

Figure 4D:
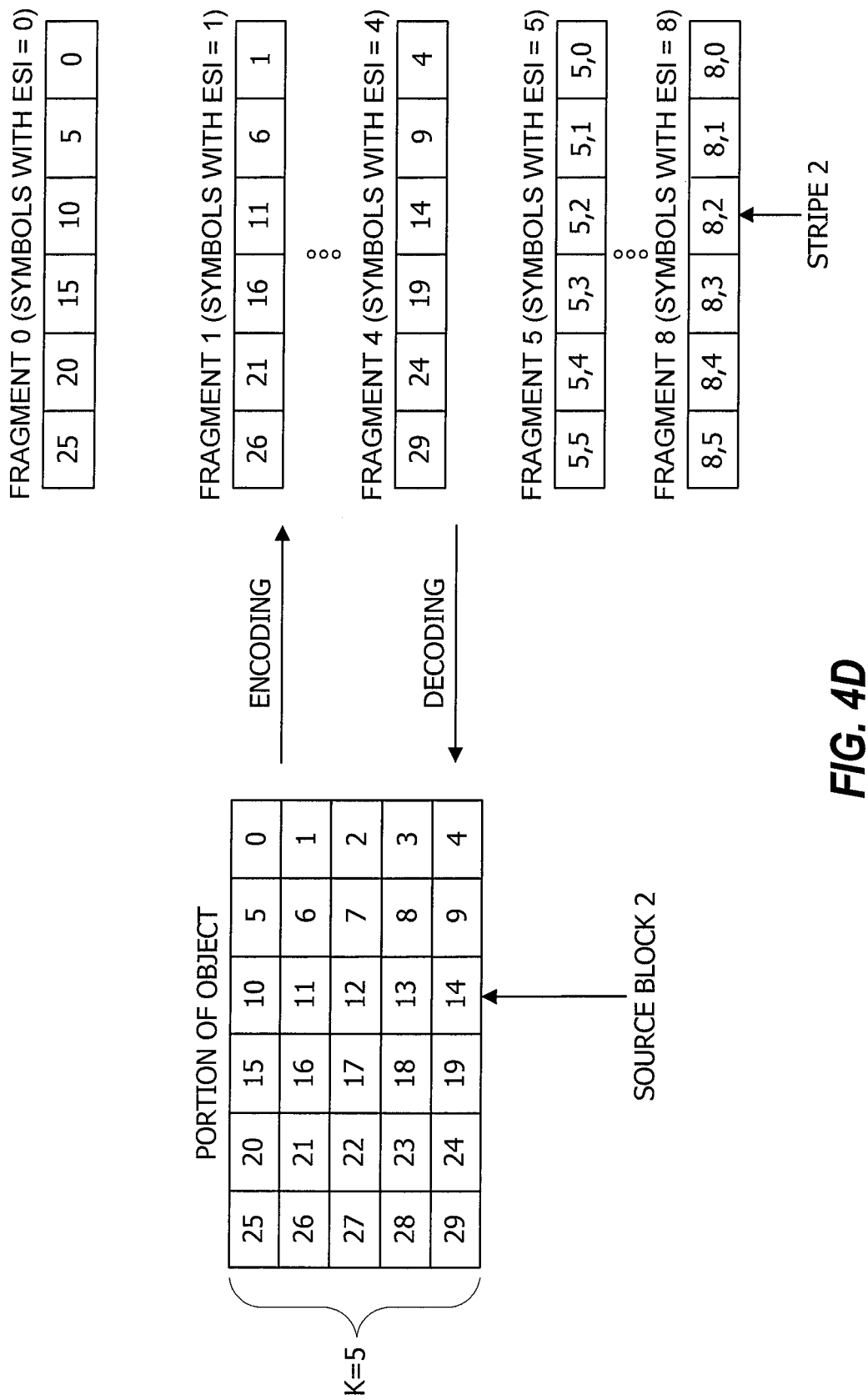
FIG. 4D shows encoding and decoding of data using a data organization according to aspects of the present disclosure.

Encoding and decoding of data using the weaver data organization is illustrated in FIG. 4D, wherein the number of source symbols per source block, k, is represented as being 5 and each box contains Ssize bytes of data (i.e., each box contains one symbol of data). As can be seen in the example of FIG. 4D, each column in the source object represented on the left of the figure comprises a source block (i.e., a source block comprising k source symbols). In FIG. 4D, the order of the data in the source object is represented by the number label in each box (i.e., the data in the box labeled 0 comprises the first Ssize bytes of the source object, followed by each of the Ssize bytes of data in the boxes labeled 1, 2, 3, . . . , 29). Moving across the rows of the source object represented on the left of the figure, the symbols of different source fragments are utilized to generate each repair symbol of each corresponding repair fragment (e.g., using RaptorQ encoding) shown on the right of the figure, when the object is first stored in the storage system. For each source block, additional repair symbols are also generated according to embodiments, as represented by Fragment 5 through Fragment 8 of the illustrated embodiment (of which Fragment 5 and Fragment 8 are shown). In the illustrated example, source symbols are indexed from 0 to k−1 and repair symbols are indexed from k to n−1. Fragment 0 of FIG. 4D corresponds to the symbols from each of the source bocks in the correct order with encoding of symbol ID as 0 (i.e., the first row of source symbols in the source object shown on the left of the figure). For the illustrated repair fragments, the first index value shown in the boxes representing the symbols is the encoding symbol ID (e.g., 5 for Fragment 5) and the second index value is the source block number (e.g., 0, 1, 2, 3, . . . ).

Figure 4E:
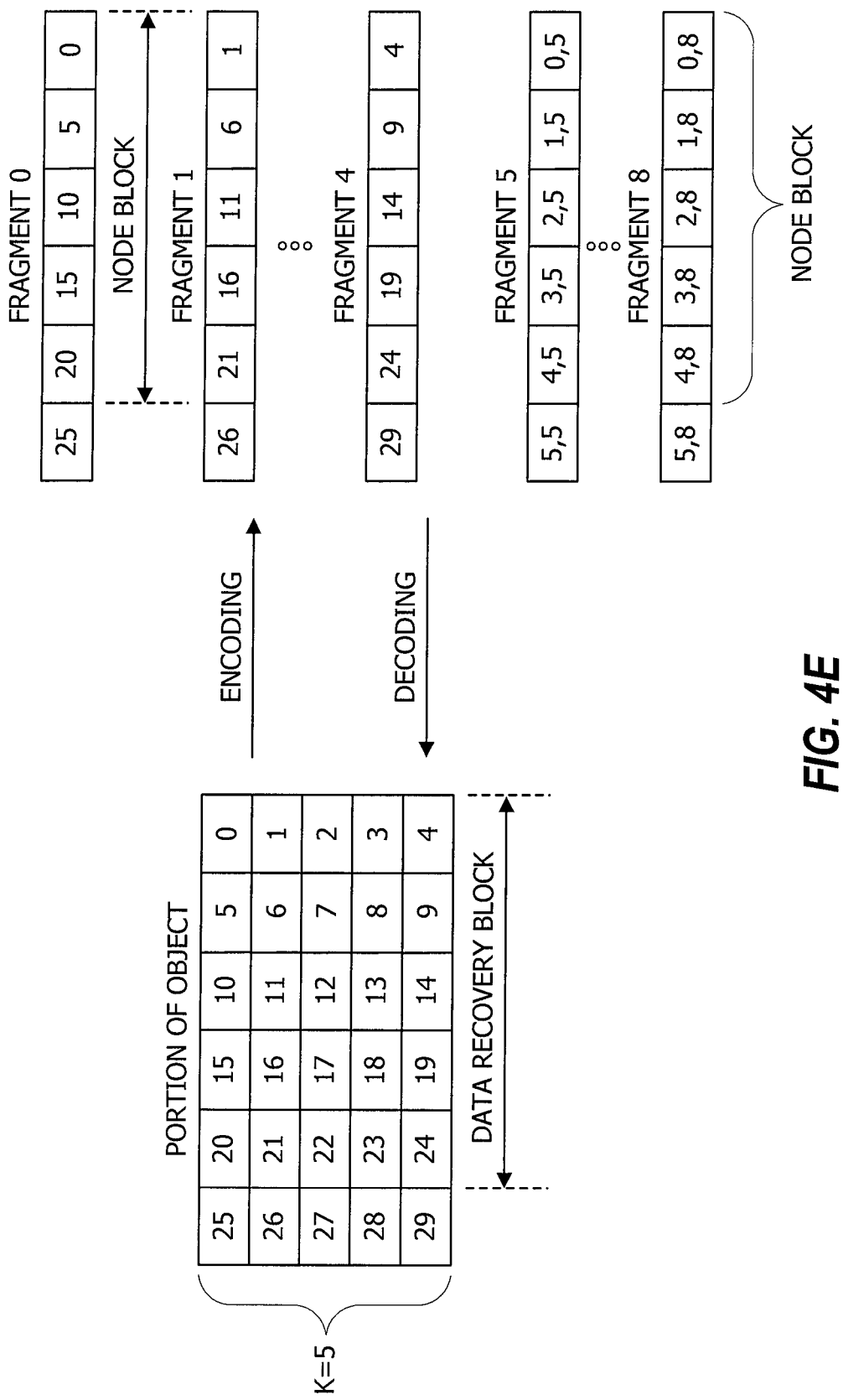
FIG. 4E shows accessing and mapping data using a data organization according to aspects of the present disclosure.

In the embodiment illustrated in FIG. 4E, the node block size, NBsize, is the amount of data that can be efficiently read from the storage nodes in a single read operation, the number of source symbols in a source block, k, is represented as being 5, and each box representing a symbol contains Ssize bytes of data. As can be seen in the example embodiment, the node block size, NBsize, may be appreciably larger than the symbol size, in contrast to typical data structures in which the node block size is much smaller than the source symbol size. Accordingly, in this example, 5 symbols of a fragment may be read from the storage nodes at a time, whereby k·NBsize is the data recovery block size.

As an example implementation of a weaver data structure, Ssize=64 bytes is a suitable size for symbols in some embodiments, as then each symbol may be operated on efficiently in some CPU architectures, as 64 bytes may be the size of a cache line, or may be the amount of data that may fit conveniently in a CPU register. In this case, if for example the number of source symbols k=1024, then Bsize=k·Ssize=64 Kilobytes. The value of Bsize is also convenient for some CPU architectures, as it is often the case that 64 Kilobytes of data can easily fit into the fastest cache available to the CPU, which expedites fast access to all symbols of the source block during the encoding and decoding process, leading to very fast erasure encoding and decoding speeds. For example, for an implementation of the RaptorQ erasure code described in IETF RFC 6330, encoding and decoding speeds in the range of several Gigabits per second are achieved using a single CPU on a standard server architecture. For a FLASH based storage node architecture, the value of NBsize might be 8 Kilobytes, and thus Ssize<<NBsize, and the data recovery block size in this example is k·NBsize=8 Megabytes. In this same example, the size of source objects, Osize, may be 1 Gigabyte, and thus Bsize is a very small fraction of Osize (i.e., Bsize/Osize=0.000061).

The access properties of a storage system, such as a storage system configured in accordance with the above example referencing an implementation of an AZURE cloud platform available from Microsoft Corporation, but which implements a weaver data structure in accordance with the concepts herein provides for reading L bytes of data from the storage nodes to access L bytes of source data, independent of the state of the storage nodes. In particular, to recover data from any k fragments on available storage nodes, L/k bytes may be read from at least k fragments and L bytes of source data decoded (e.g., using RaptorQ decoding), whereby $f(L)=k\cdot L/k=L$. Moreover, the read succeeds even if some fragments are unavailable (e.g., due to failed storage nodes) or where some data is slow to arrive, such as by reading data from more than k fragments according to embodiments (e.g., embodiments may operate to read the L desired bytes from more than k fragments to facilitate successful, efficient reads even when storage nodes have failed or data is otherwise delayed when returned). Accordingly, implementation of a weaver data structure facilities operation in which read speed is independent of storage node availability and provides more availability. Additionally, data may be encoded/decoded incrementally (e.g., one source block at a time). Such operation may reduce encode/decode latency (e.g., encode/decode latency sometimes associated with large erasure codes, such as RaptorQ) and facilitates optimized CPU/cache encoding/decoding workflow. Such incremental encoding/decoding facilitates near immediate data availability.

Figure 4F:
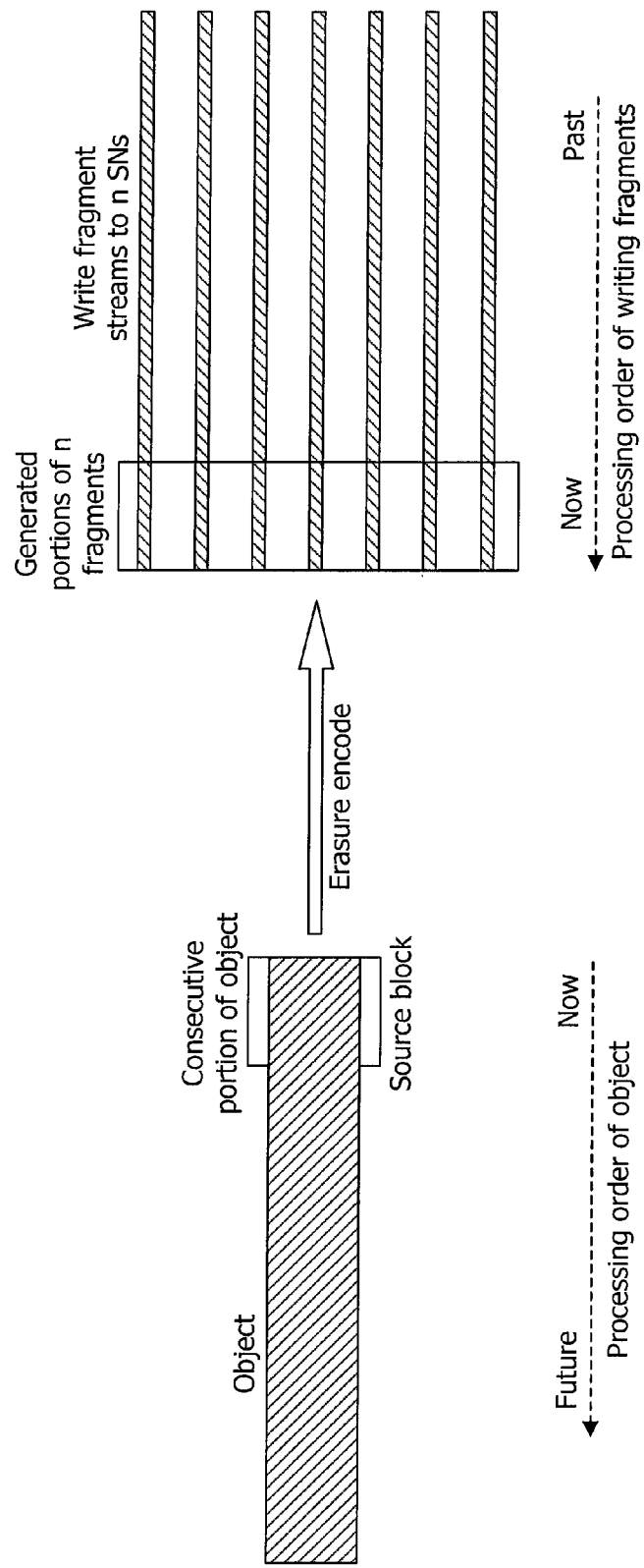
FIGS. 4F and 4G show operation utilizing a weaver data structure to provide stream encoding according to aspects of the present disclosure.
Figure 4G:
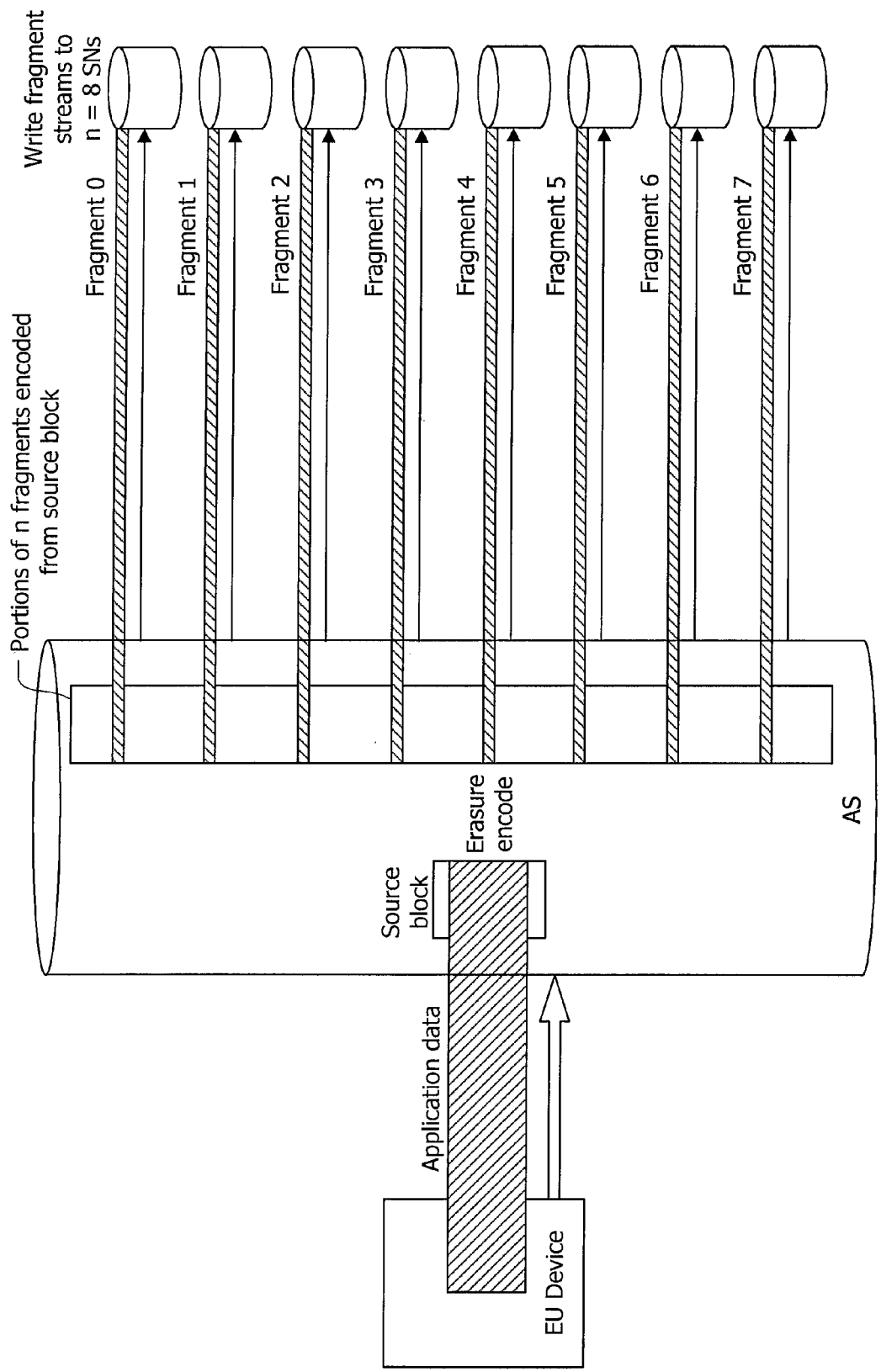

FIG. 4F shows operation utilizing a weaver data structure according to embodiments to provide stream encoding as described above. In the illustration of FIG. 4F, as the data of the source object moves from left to right the source blocks are erasure encoded and written to the storage nodes. Because the source block is a relatively small portion of the source object, this portion may be encoded and streamed to the different fragments which may then be written to the storage nodes immediately (or perhaps cached locally to collect a portion of each fragment which may be written to the storage node efficiently). This stream encoding is shown in the context of an exemplary storage system in the illustration of FIG. 4G, wherein the data is arriving from the EU device, whereby each source block is erasure encoded into the different portions of the fragments which are written to the storage nodes. It should be appreciated that, although a single connection is shown between the access server and each of the storage nodes in FIG. 4G, embodiments herein may utilize multiple connections between an access server and storage node for uploading data of fragments to the storage node.

Figure 4H:
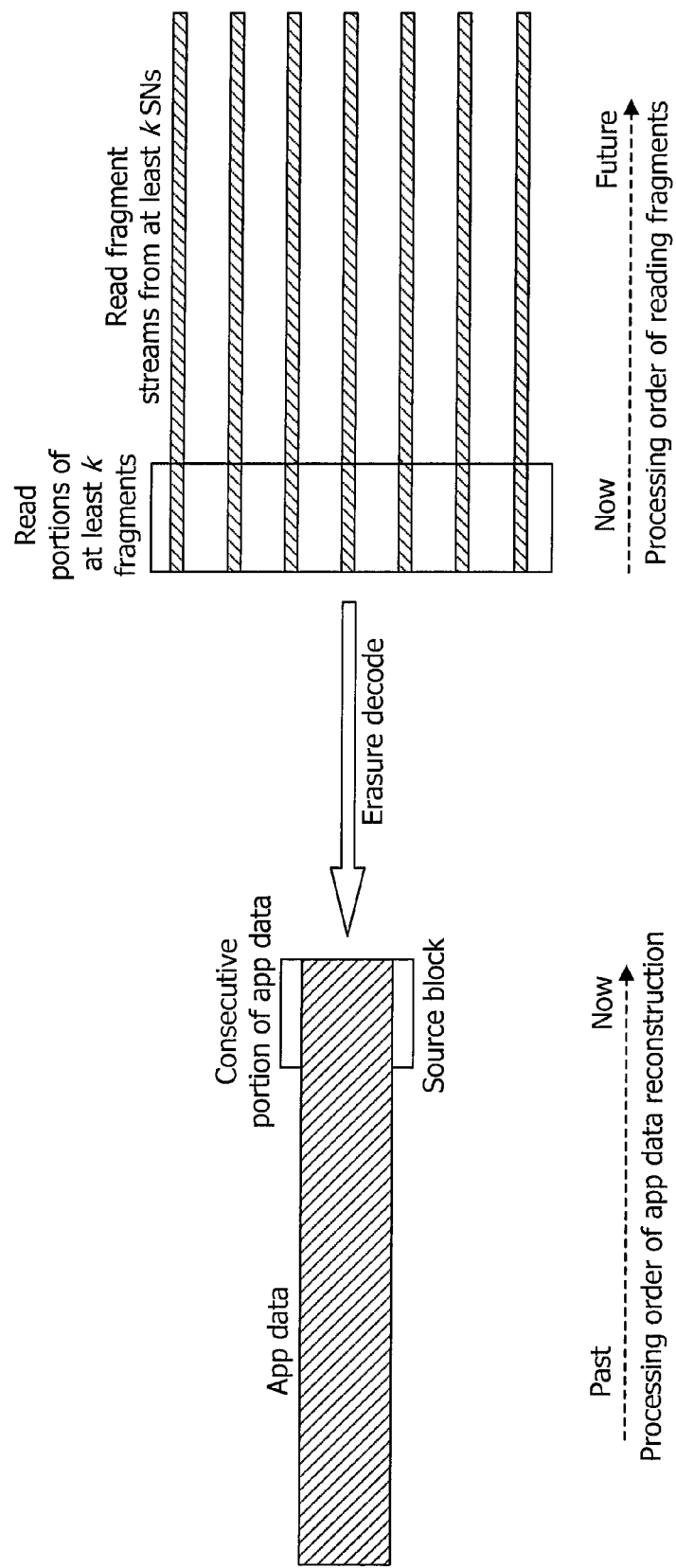
FIGS. 4H and 4I show decoding operation to provide stream source data utilizing a weaver data structure according to aspects of the present disclosure.
Figure 4I:
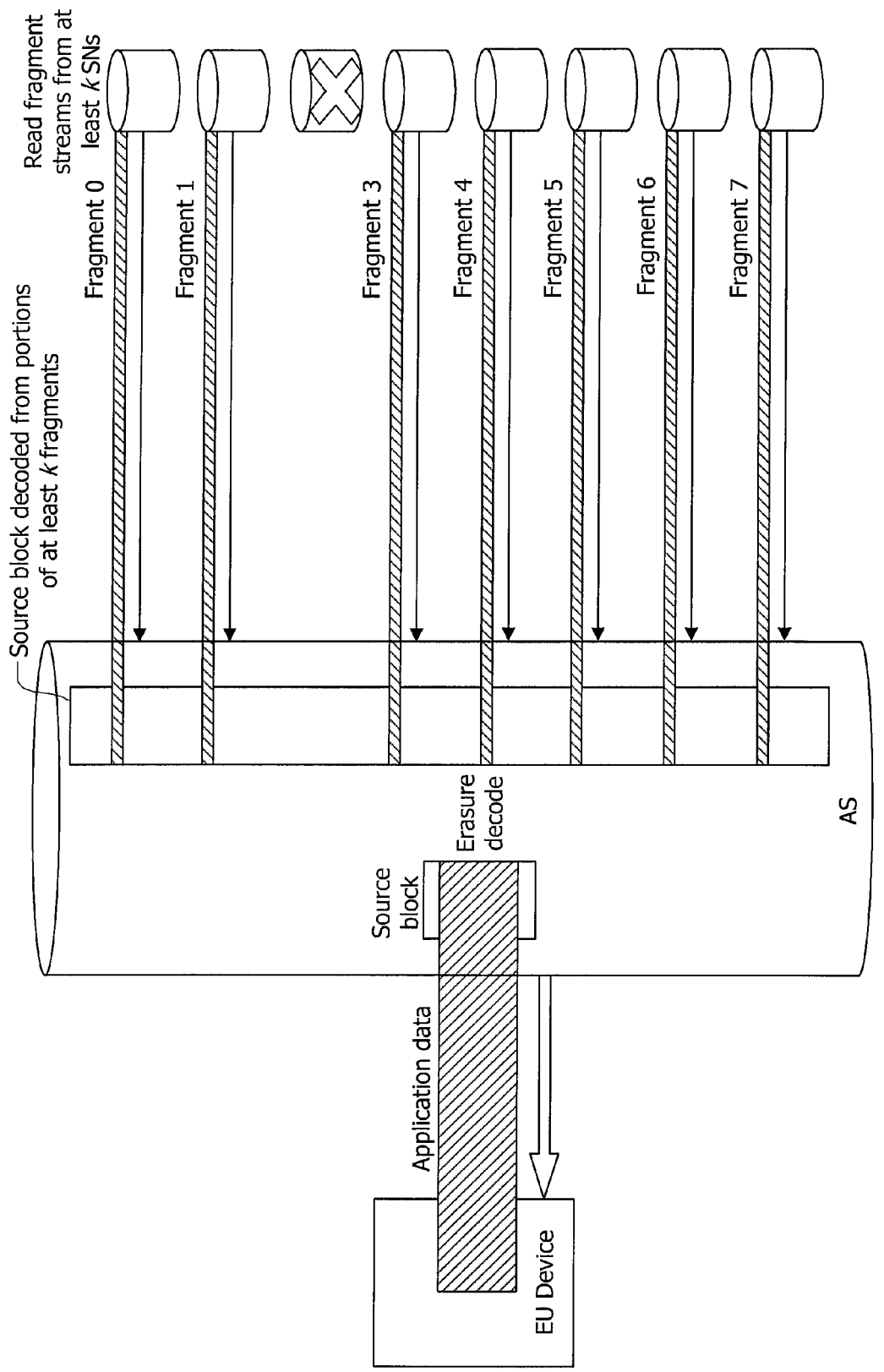

FIGS. 4H and 4I show decoding operation (corresponding to the illustrations of FIGS. 4F and 4G, respectively) utilizing a weaver data structure according to embodiments herein. In the illustrated decoding operation, data is being accessed from the storage system and being provided to the EU device, thus the data in the illustration is moving from the right to the left. The right of the illustration shows the portions of the fragments being read from which the desired source data is erasure decoded to generate source blocks. The source blocks may then be provided to the EU device (e.g., as a source object or some portion thereof). As can be appreciated from the illustration of FIG. 4I, the source blocks are decoded from the data being read to provide a stream of source data nearly immediately upon arrival of the data at the decoder logic (e.g., as soon as at least a portion of k fragments has arrived the source data may be decoded and streamed to the EU device). It should be appreciated that, although a single connection is shown between the access server and the storage nodes in FIG. 4I, embodiments herein may utilize multiple connections between an access server and a storage node for downloading data of fragments from the storage node.

Figure 4J:
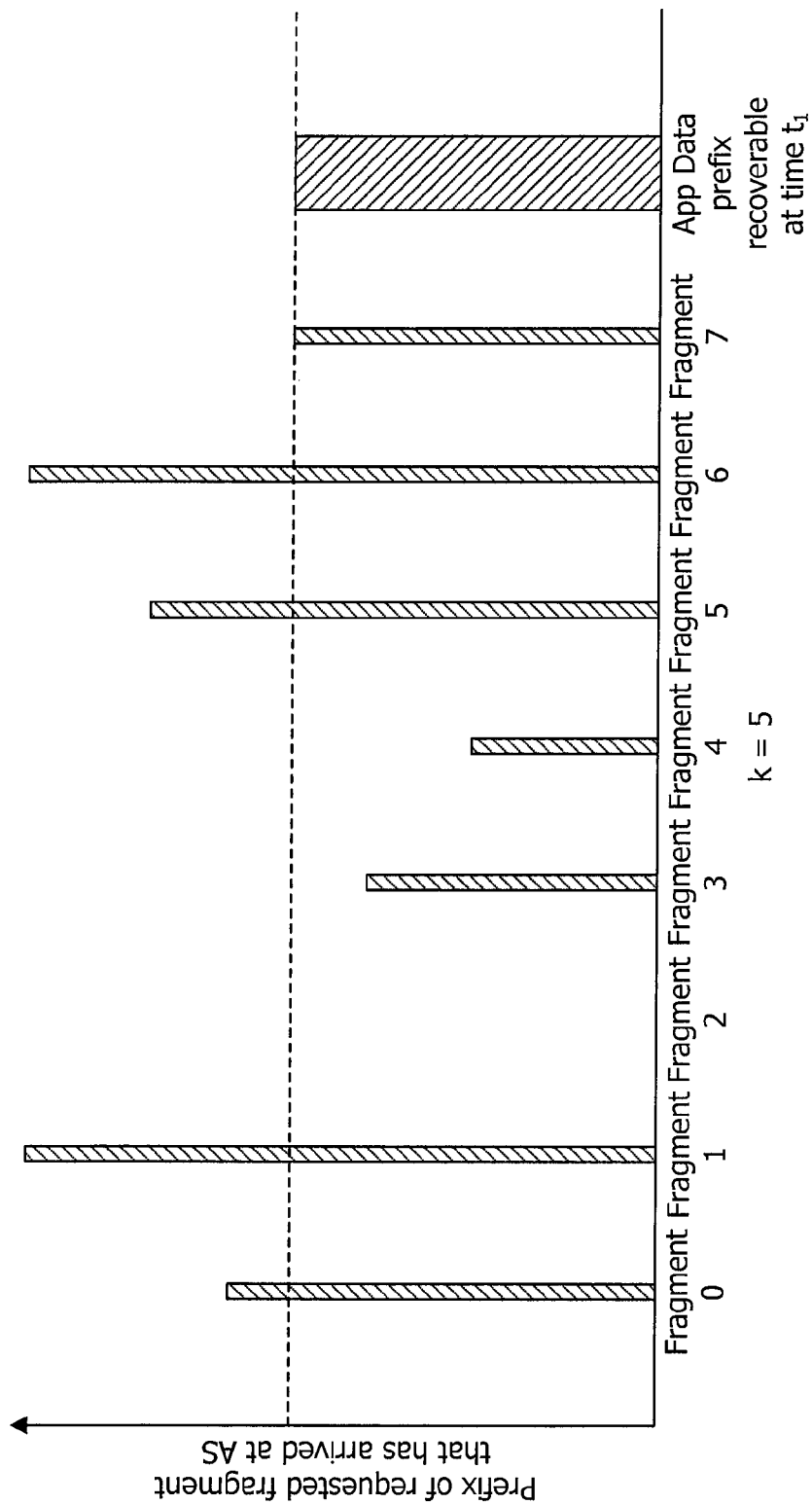
FIGS. 4J and 4K show access server recovery of source data utilizing a weaver data structure according to aspects of the present disclosure.
Figure 4K:
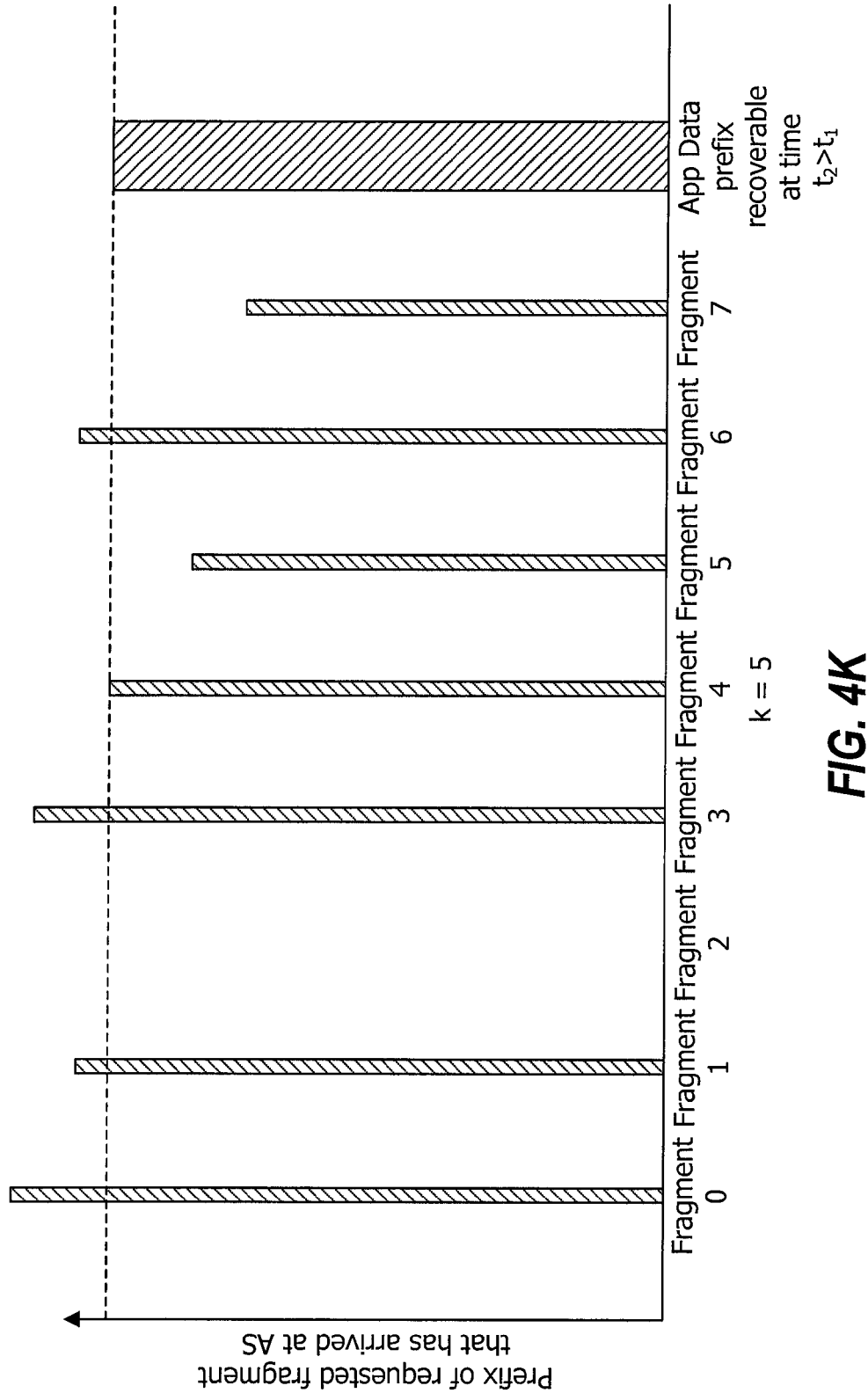

FIG. 4J, showing access server recovery of source data, illustrates the aforementioned availability of source data as soon as at least a portion of k fragments has arrived. In the embodiment illustrated in FIG. 4J, the number of source symbols in a source block, k, is 5. Accordingly, only 5 fragments need to be read in order to recover source data. In the embodiment illustrated in FIG. 4J, the access server attempts to read the desired data from 8 fragments (i.e., Fragments 0-7). The bars shown for each of the fragments being read in FIG. 4J represent a prefix of how much data has arrived from the fragment to the access server. In the illustrated example, the prefix has been received up to at least the dotted line of data from the storage nodes for Fragment 0, Fragment 1, Fragment 5, Fragment 6, and Fragment 7. Accordingly, as soon as the data received for Fragment 7 reaches the level of the dotted line (it being appreciated that the data of Fragment 7 is the last of the 5 to reach this threshold level), the source data may be decoded. FIG. 4K show the access server recovery of source data at a slightly later point in time than represented in FIG. 4J. In the example illustrated in FIG. 4J, the receipt of data for some of the fragments has sped up and/or for some other of the fragments has slowed down. Nevertheless, at the point represented by the dotted line data from 5 fragments has been received (now Fragment 0, Fragment 1, Fragment 3, Fragment 4, and Fragment 6). The data from these 5 fragments may thus be used to recover the source data. As can be appreciated from the foregoing, the availability of the data is not stopped or stalled, and thus successful, efficient reading of the desired data is provided by reading more than k fragments, even when storage nodes have failed (e.g., the storage node storing Fragment 2) or data is otherwise delayed (e.g., the data of Fragments 3 and 4 in FIG. 4J or Fragments 5 and 7 in FIG. 4K). As the data for the different fragments arrives, data for the first k fragments may be used to decode the desired source data, thereby providing good speed in terms of data recovery, even where storage nodes have failed and/or data from one or more storage nodes is delayed.

Figure 4L:
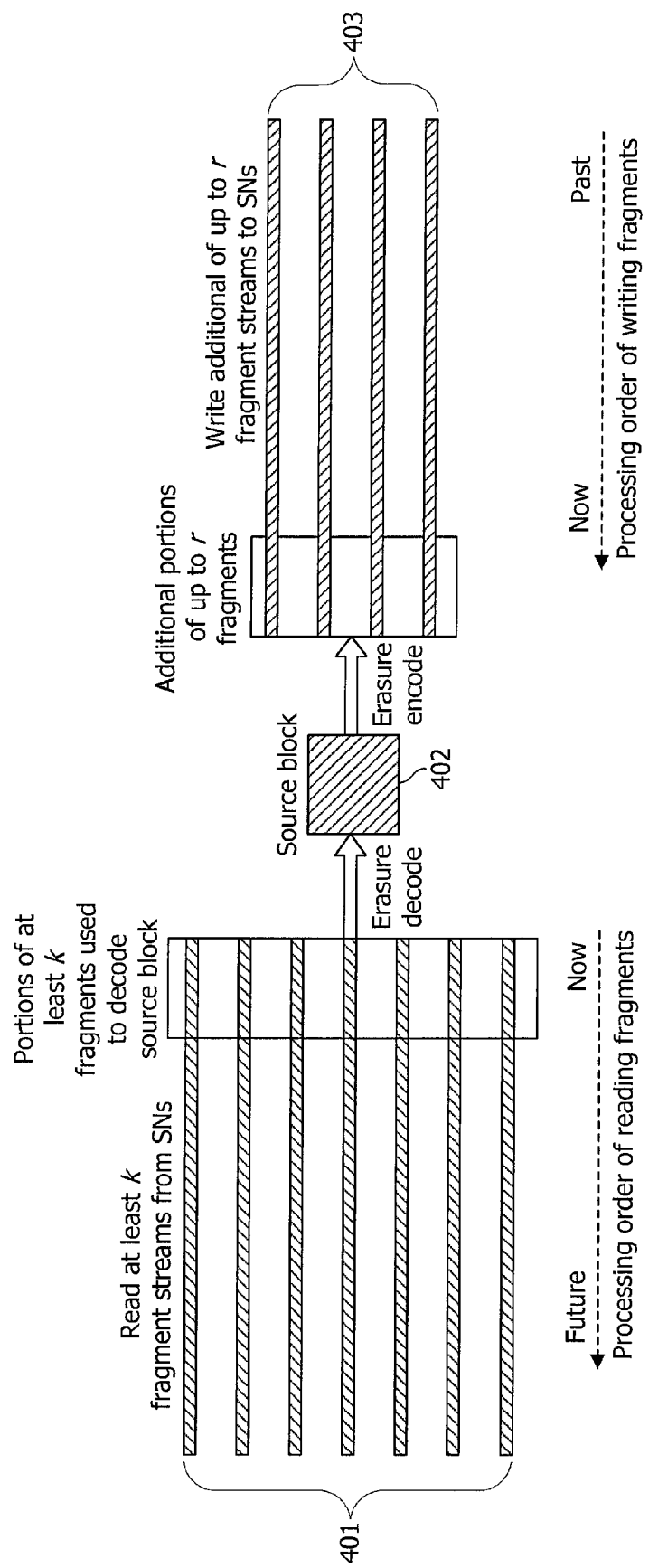
FIGS. 4L-4N show stream generation of repair data facilitated by a weaver data organization technique according to aspects of the present disclosure.
Figure 4M:
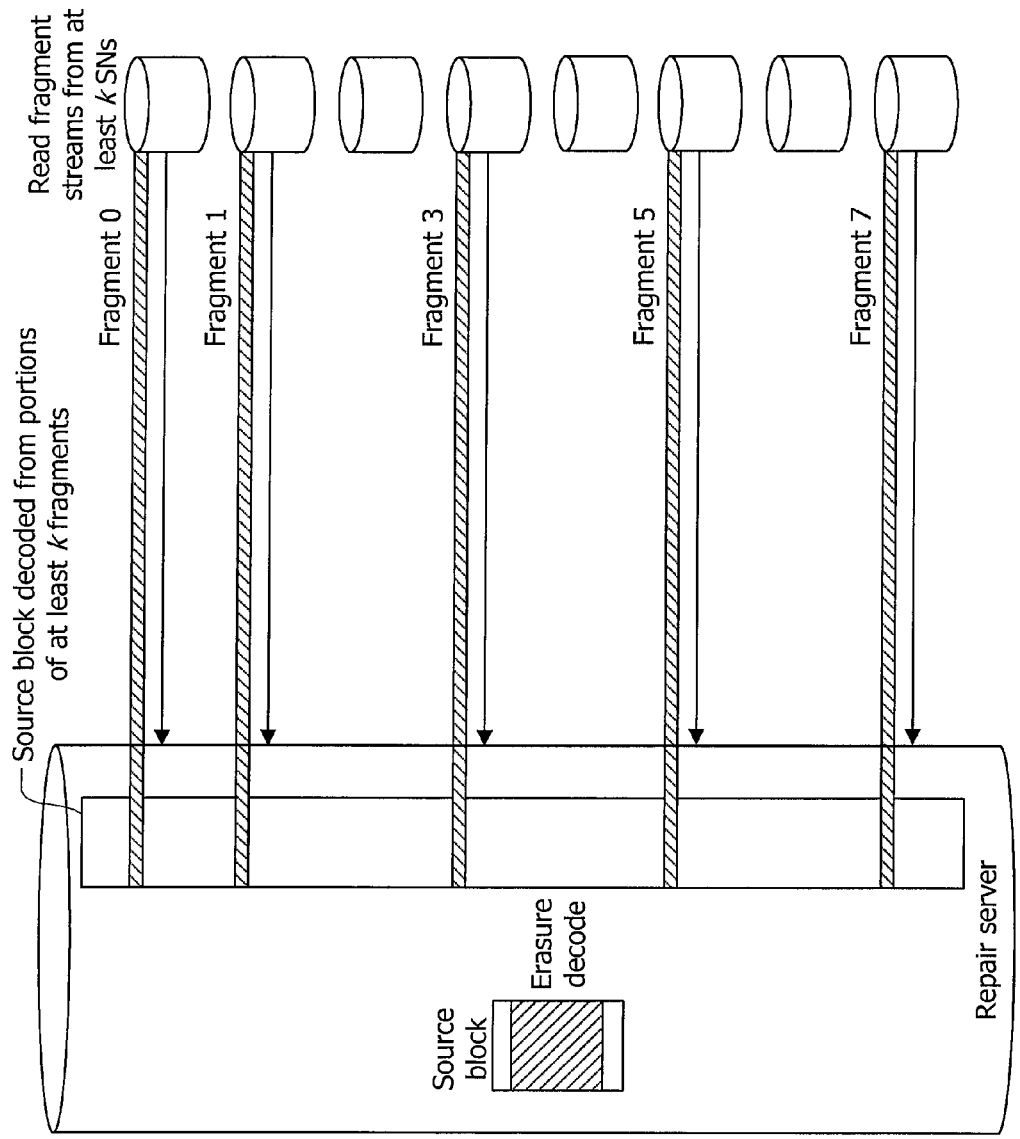
Figure 4N:
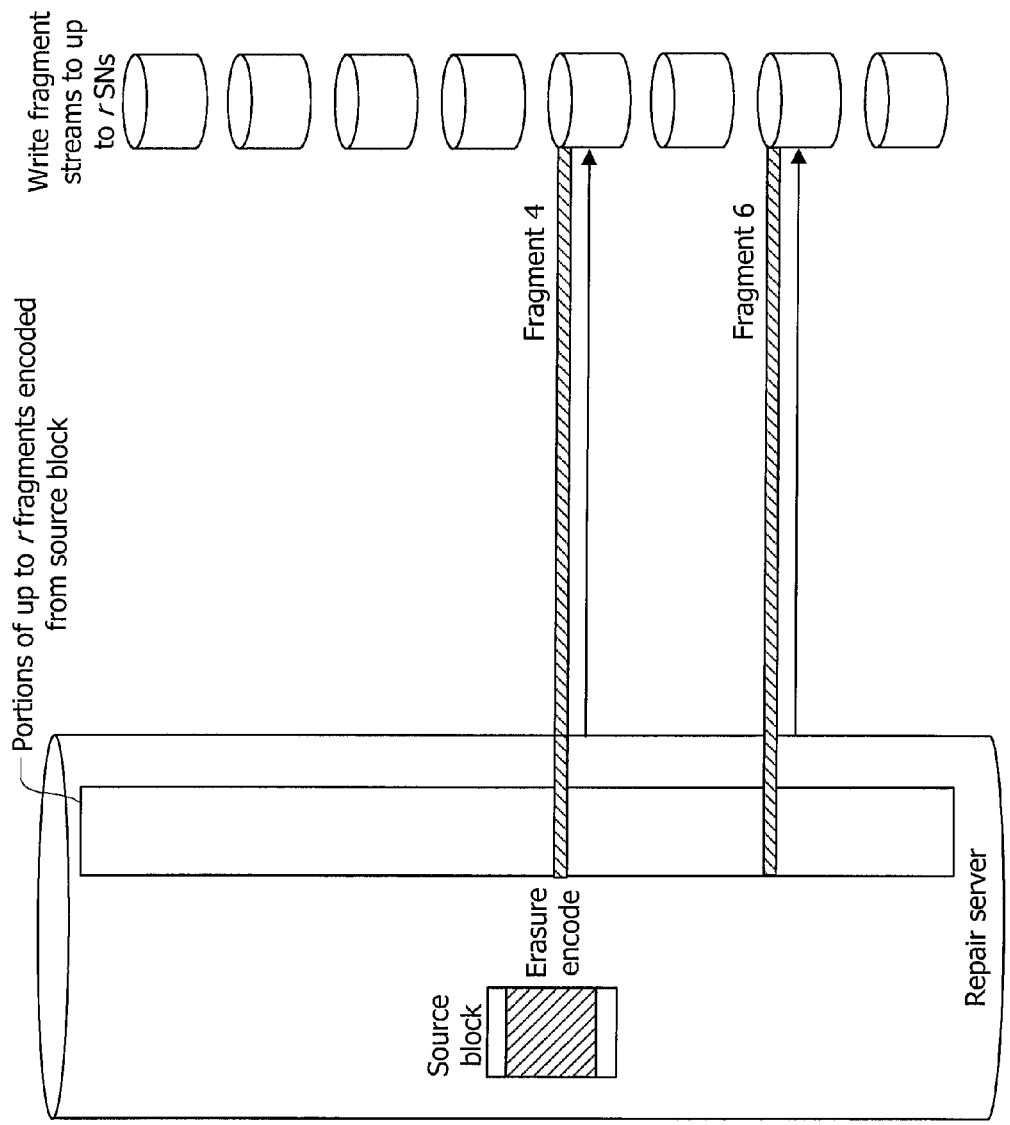
Figure 40:
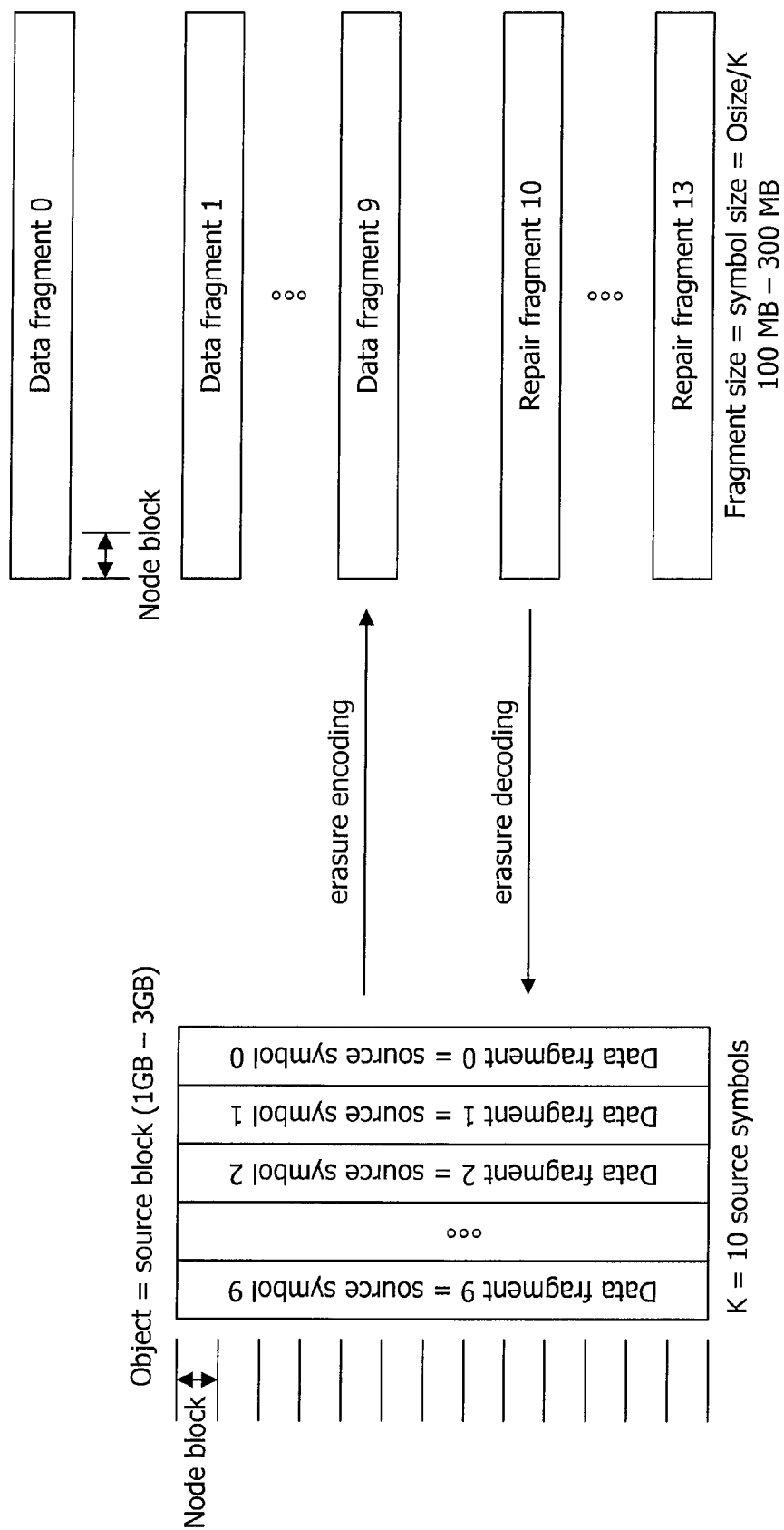

FIG. 4L illustrates the stream generation of repair data facilitated by a weaver data structure of embodiments. As can be seen from the graphical representation of FIG. 4L, as the fragment streams are arriving to the repair process (strands 401), the streams are erasure decoded to produce a source block portion of the source data stream (source block 402) and then erasure encoded to produce additional portions of fragments (strands 403) that can then be stored as fragment streams to the storage nodes. To generate the repair data according to the illustrated embodiment, at least k fragment streams are read from the storage nodes in order to repair that portion of the source object. The data of the k fragments may be erasure decoded to generate a source block and then immediately erasure encoded to generate the source and/or repair fragments (e.g., up to r additional fragments) to be written to other storage nodes (e.g., newly added storage nodes). Such reading and decoding of fragments to recover a source block is illustrated with respect to the context of an exemplary storage system is shown in FIG. 4M. Correspondingly, an example of the encoding to generate source and/or repair fragments and their storage by the storage nodes in the context of an exemplary storage system is shown in FIG. 4N (e.g., in this illustration source Fragment 4 and repair Fragment 6 are generated and written to storage nodes).

FIG. 4O illustrates traditional erasure encoding/decoding of source objects, wherein the source objects are divided into blocks of contiguous data. As can be appreciated from the graphical representation of FIG. 4O, relatively large chunks of data, as well as data in excess of the amount of data desired, must be accessed when a portion of the source data is not available (e.g., due to an intermittent storage node failure or due to a permanent storage node failure that has not yet been repaired). For example, where a 1 Megabyte portion of source data from data fragment 0 is to be accessed, and data fragment 0 is not available (e.g., because the storage node where it is stored has failed), but data fragments 1-9 and 13 are available. Then, corresponding 1 Megabyte portions of data from each of data fragments 1-9 and 13 can be read from the storage nodes and erasure decoding applied to produce the 1 Megabyte portion of source data from data fragment 0. However, this requires reading 10 Megabytes of data from the storage nodes to access the 1 Megabyte portion of source data from data fragment 0. This results in a high cost of accessing source data that is not currently available. This is in contrast to the data access facilitated by the erasure encoding/decoding using a weaver data structure as depicted in FIGS. 4A, 4B, and 4D-4N.

As can be appreciated from the foregoing, the weaver data organization technique of embodiments both provides excellent access efficiency for any erasure code solution, including large erasure code solutions, as well as enables streaming erasure encoding of source data rather than the block encoding of typical data organization techniques. Using a large erasure code solution with the weaver data organization maintains all of the advantages of large erasure code solutions over small erasure code solutions in terms of reliability, storage overhead, and repair bandwidth, while at the same time providing excellent access efficiency.

Although operation of liquid distributed storage control of embodiments has been described above with reference to providing repair of data loss within the storage system, operation in accordance with the concepts herein may be applied to a number of different situations. For example, the cooperation between the repair policy logic and repair bandwidth control logic facilitates dynamically changing various storage system parameters without experiencing disruptive results. As one example, the number of storage nodes may be significantly changed in the storage system (e.g., expanding the number of storage nodes, M, from 1,200 to 2,000) whereby the lazy repair policy implementing a large erasure code (e.g., $n=M$, $n \geq \frac{3}{4} M$, etc.) constrained by a provisioned repair bandwidth will operate to regenerate the fragments for each source object, storing a fragment on each of the storage nodes, over time at a steady repair rate, R, corresponding to the provisioned repair bandwidth. Changes with respect to any of the erasure code parameters (n; k; r) may similarly be accommodated without disruptive results according to embodiments herein.

Figure 4P:
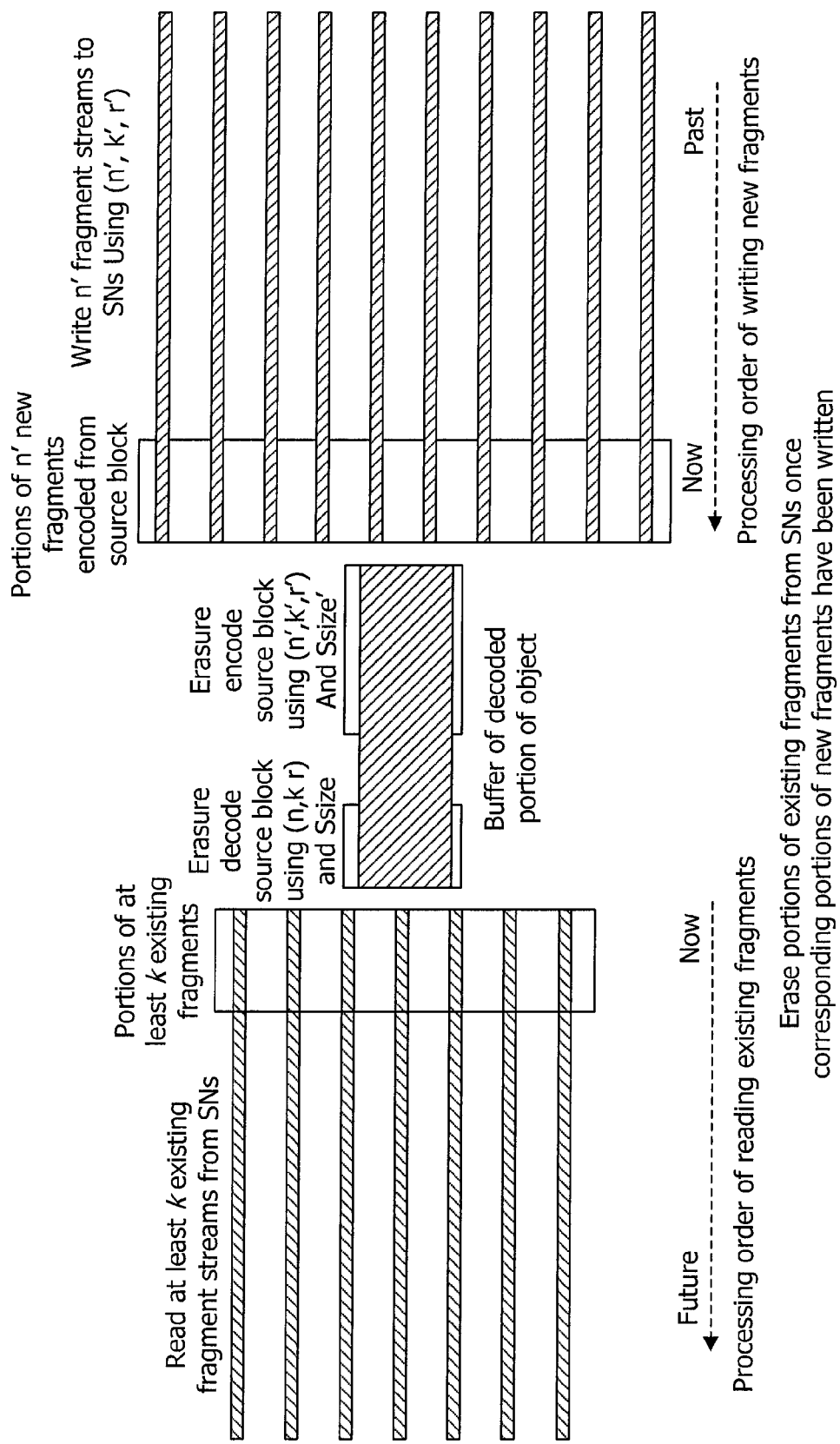
FIGS. 4P-4R show operation utilizing a weaver data structure to accommodate changes with respect to the erasure code parameters according to aspects of the present disclosure.
Figure 4Q:
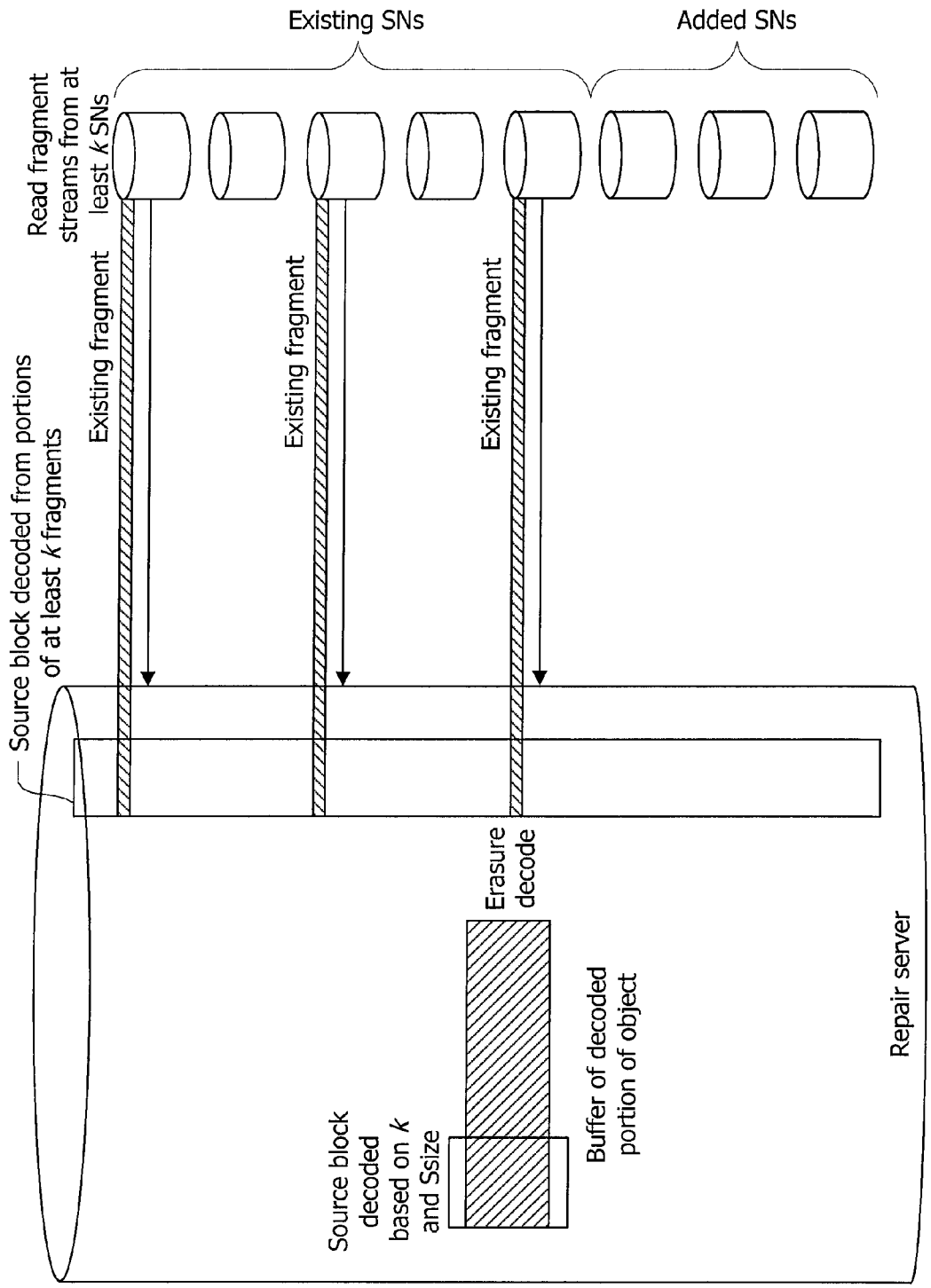
Figure 4R:
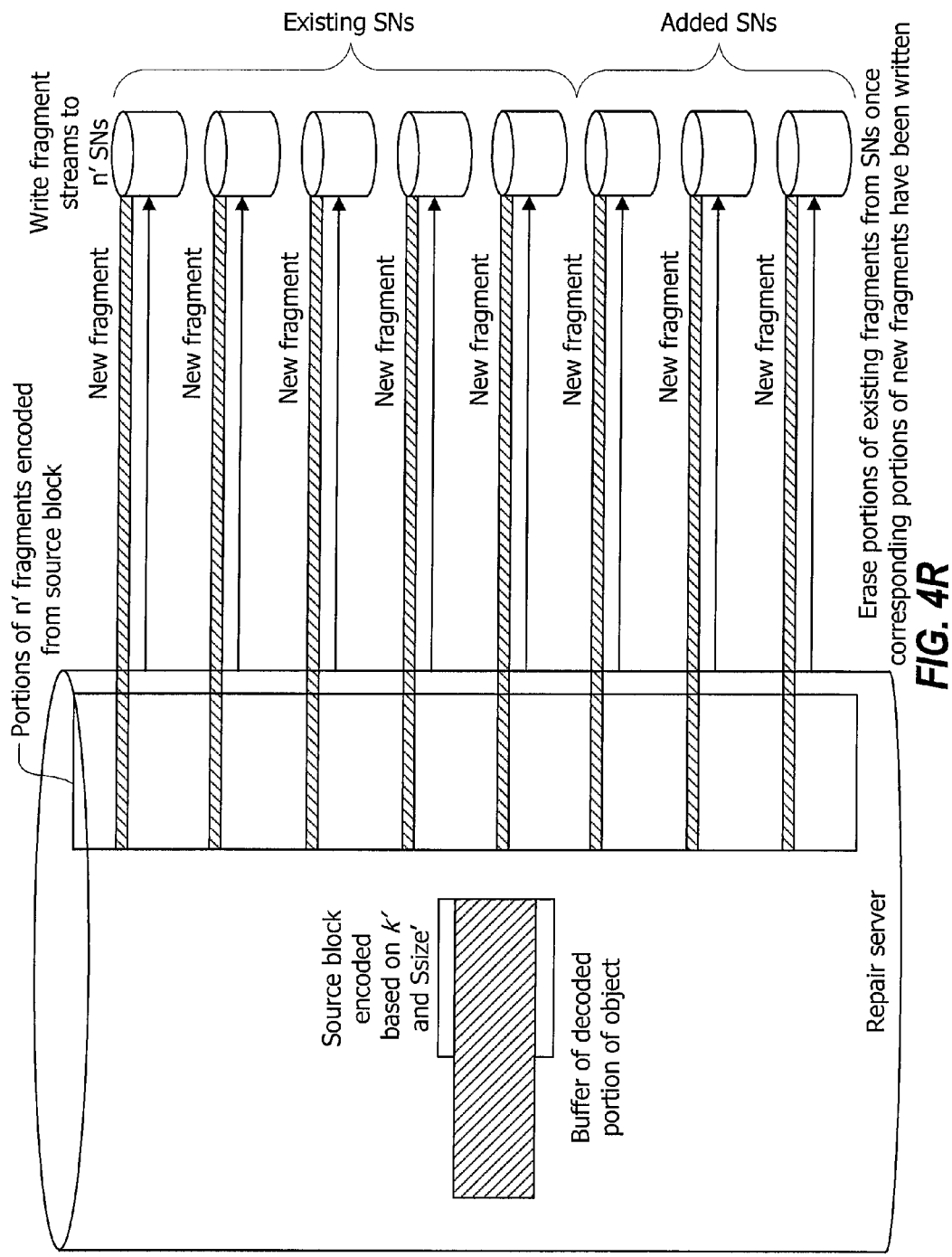

FIG. 4P shows operation according to embodiments utilizing a weaver data structure to accommodate changes with respect to the erasure code parameters. For example, operation as illustrated in the example of FIG. 4P may be utilized to redistribute data within the storage system using the stream decoding and encoding of a weaver data structure according to the concepts herein. As an example of the repair process accommodating changes with respect to the erasure code parameters, assume that the storage system initially includes 1000 storage nodes (i.e., $M=1000$) and that a large erasure code is utilized with respect to the repair process (e.g., $n=M=1000$). Thus, in an initial state source objects may be divided into k source fragments (e.g., $k=750$) and erasure encoded to provide r repair fragments (e.g., $r=250$), such that a fragment of the 1000 total fragments (where $n=k+r$) is stored on each one of the 1000 storage nodes with respect to any particular source object. Thereafter, the number of storage nodes may be increased, such as to include 2000 storage nodes (i.e., $M'=2000$). Operation of a repair process according to embodiments herein may be utilized to redistribute the source data over the added storage nodes through changing one or more of the erasure code parameters and applying the repair process to the data stored in the storage system. For example, the data may be read and decoded by the repair process using the initial erasure code parameters (n; k; r) and encoded and written by the repair process using new erasure code parameters (n'; k'; r'). In the foregoing example, the total number of fragments, n, for the source objects may be increased to 2000 (i.e., $n'=2000=M'$), and k and r correspondingly changed (e.g. $k'=1500$, $r'=500$, and $n'=2000=k'+r'$). Thereafter, n' new fragments may be generated from the source data using erasure encoding using the new erasure code parameters (n'; k'; r'). The generated new fragments may be stored on each storage node (i.e., in this example $n'=M'$). The reading and decoding of fragments using the initial erasure code parameters is illustrated with respect to the context of an exemplary storage system is shown in FIG. 4Q. Correspondingly, the encoding to generate encoded fragments using the new erasure code parameters and the storage of the generated fragments by the storage nodes in the context of an exemplary storage system is shown in FIG. 4R. Having stored the new fragments generated using the changed erasure code parameters, the storage space on the storage nodes that was used to store the initial fragments the source object may be released (e.g., marked for deletion). In operation of embodiments utilizing a weaver data organization structure, the foregoing accessing data using initial erasure code parameters, writing data using new erasure code parameters, and releasing the initial fragments of the source object may be performed on an object by object basis, or even incrementally within a source object (e.g., on a fragment by fragment basis, or by a corresponding portion of each fragment basis), thereby minimizing the impact upon available storage space while the redistribution of data is in process. It should be appreciated that the foregoing operation in the example given results in ½ as much data from each source object being stored on each storage node, although the same relative level of redundancy is provided. Moreover, the data is spread over the new storage nodes without disruption of the storage system operations, but rather as a background repair process operation. As an alternative, a process different than the repair process may be used to execute this redistribution and re-encoding of the of the source data in the storage system.

FIGS. 5A-5E illustrate operation of a lazy repair policy implementing a large erasure code where $n=M$ according to embodiments. In the example storage system of FIGS. 5A-5E, the number of storage nodes, M, is 20, the total number of fragments stored for a source object, n, is 20, the number of source symbols, k, is 10, and the number of repair symbols, r, is 10 in order to provide a simplified configuration to aid in the understanding of the concepts herein. It should be appreciated that the forgoing parameters may be significantly different (e.g., the number of storage nodes, M, and correspondingly the total number of fragments stored for a source object, n, the number of source symbols, k, and the number of repair symbols, r, may be significantly larger, such as M being on the order of 30, 50, 100, 1,000, or 10,000) in actual implementations.

Figure 5A:
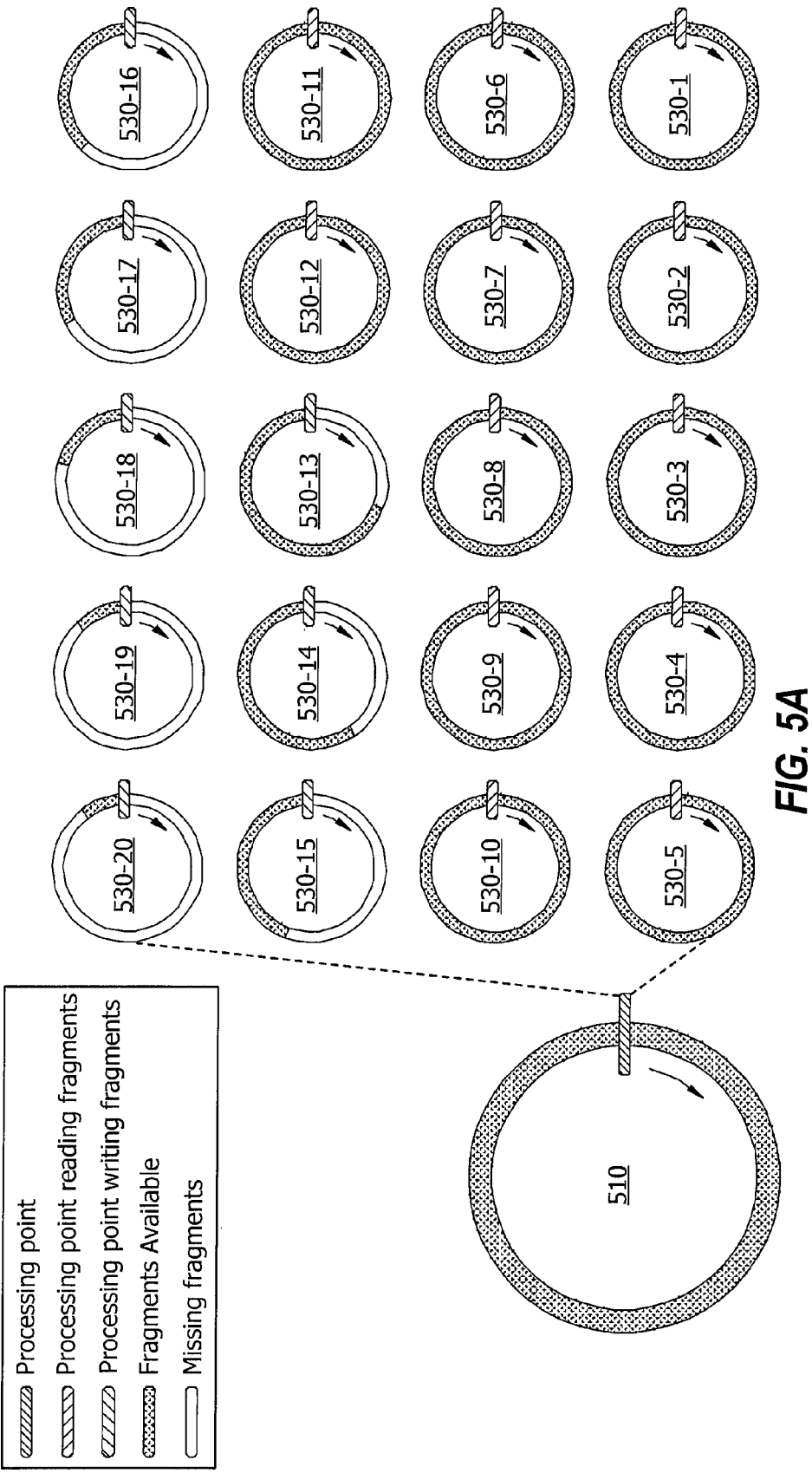

Process state graph 510 of FIG. 5A illustrates the state of lazy repair policy operation by an access server (e.g., access server 210 of FIG. 2) providing a repair service, such as may be provided by one or more repair servers, implementing the lazy repair policy. Process state graphs 530-1 through 530-20 illustrate the state of lazy repair operation by storage nodes (e.g., storage nodes 210-1 through 210-M of FIG. 2) in accordance with the repair service implementing the lazy repair policy. The current processing point for each of process state graphs 510 and 530-1 through 530-20 is represented by the horizontal bar shown, wherein processing proceeds clockwise around the circle of each processing state graph. The circle of process state graph 510 represents the source objects stored by the storage system (e.g., individual source objects represented by a corresponding portion of the circle, wherein the source objects in the aggregate provide the complete circle). The circle of process state graphs 530-1 through 530-20 represent the fragments, of the source objects represented by process state graph 510, stored by each respective storage node (e.g., each individual fragment represented by a corresponding portion of the circle). It should be appreciated, however, that not all storage nodes are shown as including a full complement of fragments for all objects (i.e., the unshaded portions of the circles represents missing fragments for source objects corresponding to that portion of the circle). The storage nodes associated with the process state graphs of FIG. 5A having higher designation numbers (e.g., process state graphs 530-12 through 530-20) may have been added to the storage system more recently and thus fragments for all source objects may not yet have been stored to these storage nodes.

In this embodiment, in operation of the repair policy, the repair service of the illustrated embodiment linearly cycles through each of the source objects, as represented by the processing point of process state graph 510 proceeding clockwise through the source objects, to implement repairs with respect to missing fragments. Correspondingly, the storage nodes (or some portion thereof) having fragments for the source object may be accessed (e.g., the storage nodes represented by process state graphs 530-1 through 530-12, wherein the processing point is indicated as reading fragments) to generate missing fragments (e.g., source and/or repair fragments) for storage by the storage nodes missing fragments of the source object (e.g., the storage nodes represented by process state graphs 530-13 through 530-20, wherein the processing point is indicated as writing fragments). That is, in this example, the oldest 12 storage nodes (represented by process state graphs 530-1 through 530-12) have fragments for all of the source data, and thus if k is at most 12 then all of the source objects can be recovered from the fragments stored on these 12 storage nodes. The remaining 8 storage nodes of this example (represented by process state graphs 530-13 through 530-20) have not been operable in the storage system for a full cycle of repair of the source data, and thus have fragments for some but not all of the source objects. For example, the storage node represented by process state graph 530-13 has some source object fragments, and as the repair process continues for another short while (assuming this storage node does not permanently fail) this storage node will soon also have fragments for all of the source objects (e.g., another approximately ¼ of a turn around the circle will cause this). The storage node represented by process state graph 530-20 has been added to the storage system recently. Thus, this storage node only has fragments for very recently repaired source objects, and it will be sometime before this storage node has fragments for all of the source objects.

It should be appreciated that in the foregoing example that 12 storage nodes (storage nodes represented by process state graphs 530-1 through 530-12) are illustrated as capable of access to (reading) fragments from which a source object the repair process is currently processing in order to generate fragments for the repair. However, the example above provided the number of source symbols, k, as 10 and thus any 10 of the storage nodes may be accessed for their respective fragments to generate the fragments needed to complete the total number of fragments stored for a source object, n, (i.e., 20 in the foregoing example) by the repair process.

Figure 5B:
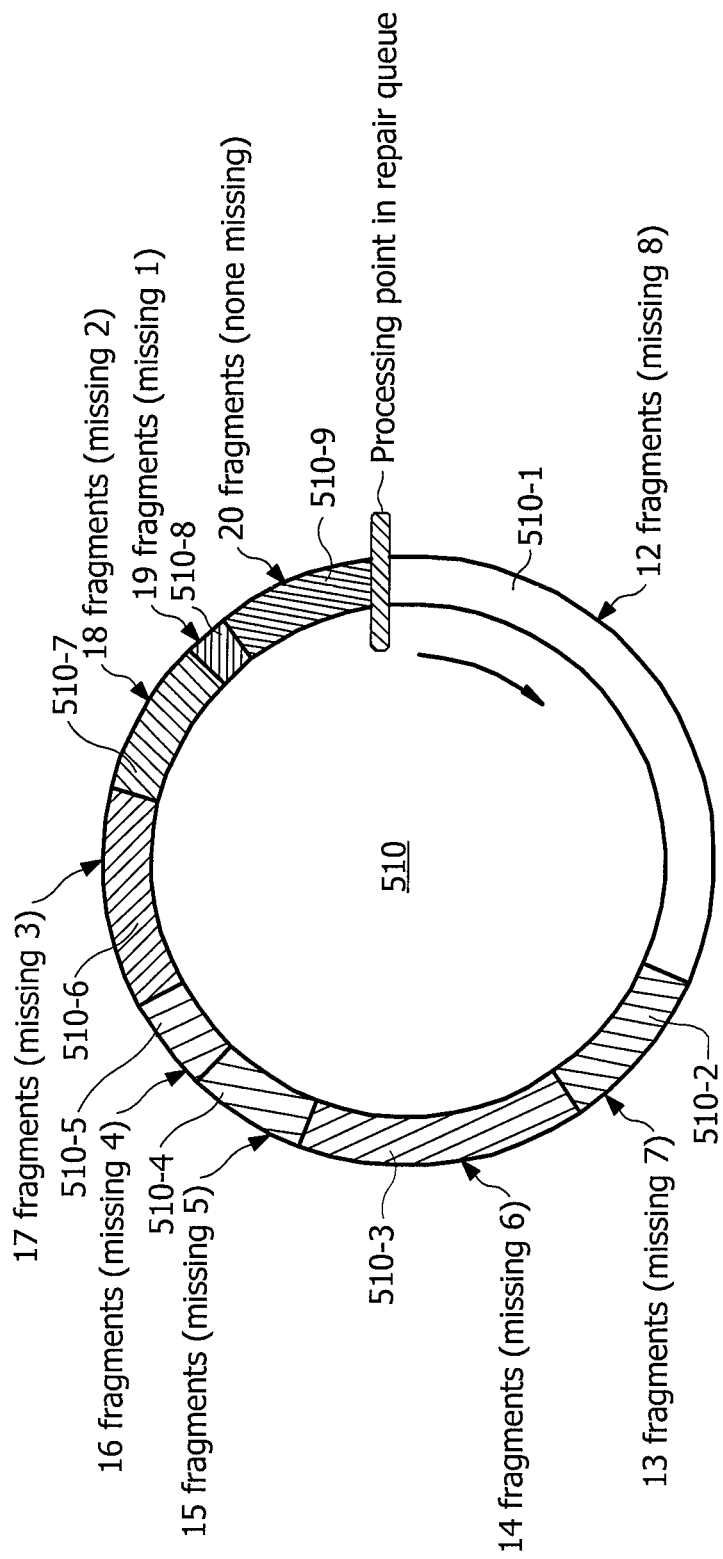
Figure 5D:
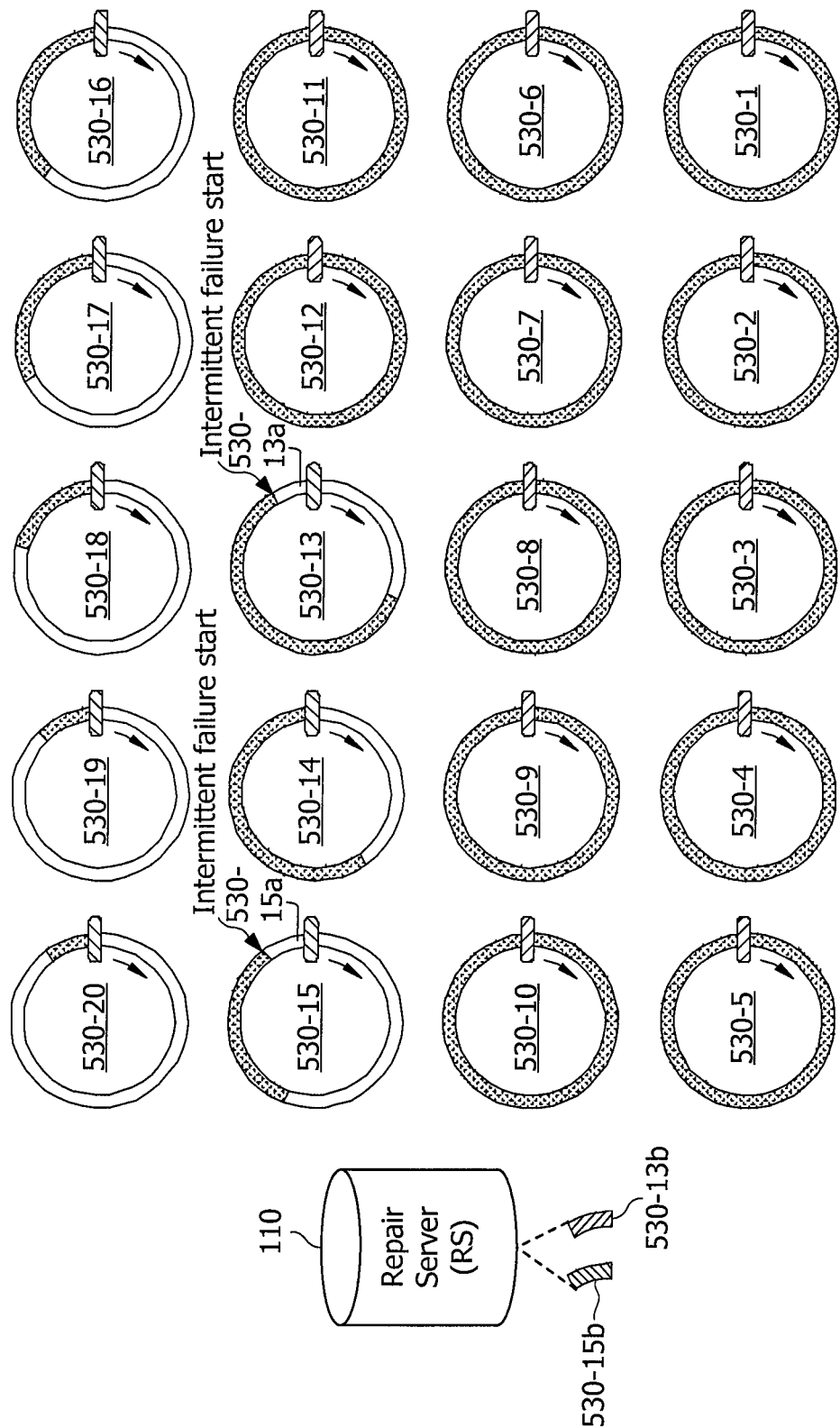
Figure 5E:
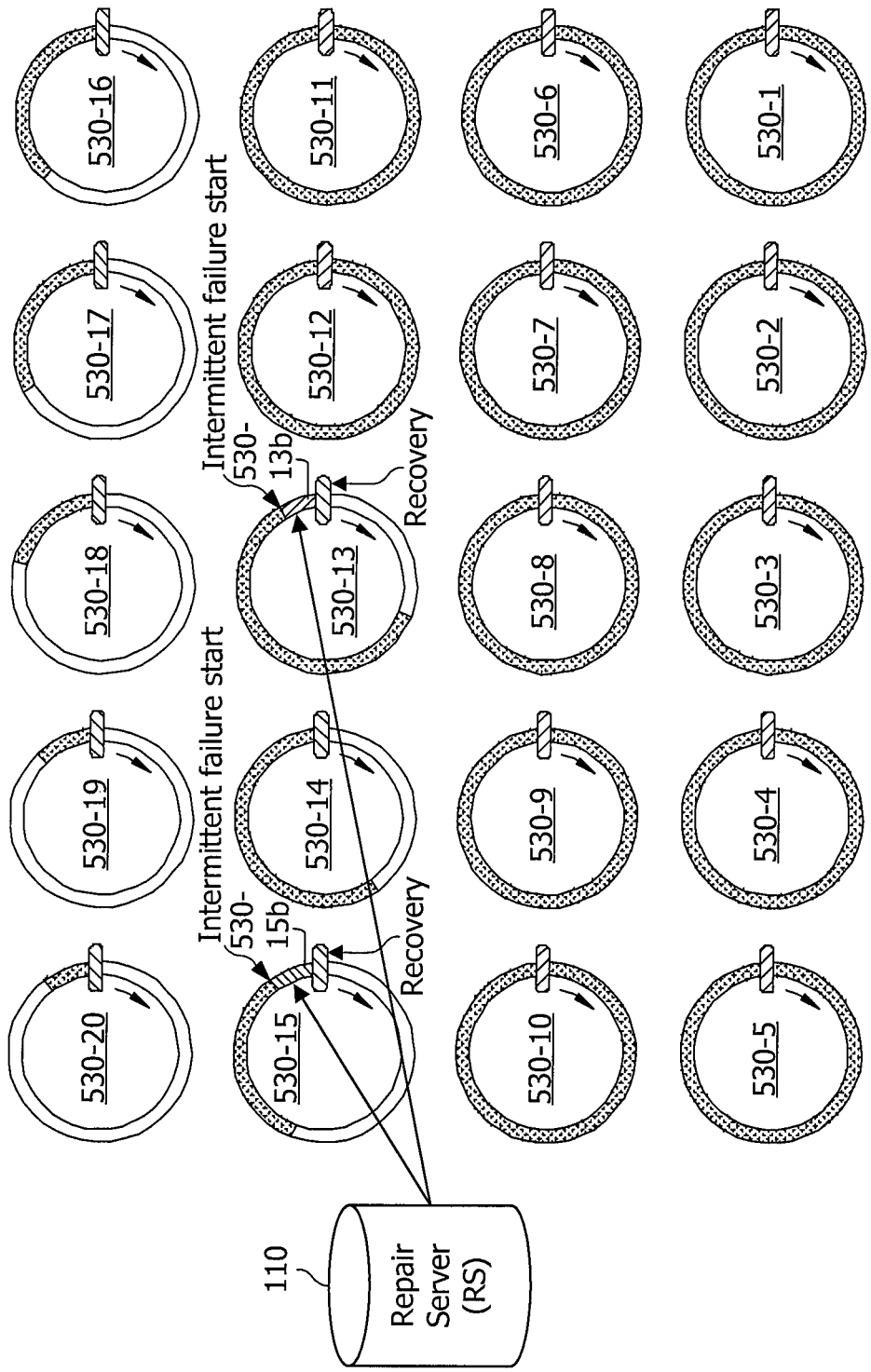

In operation of a lazy repair policy according to embodiments herein, source objects having missing fragments are allowed to accumulate whereby they are repaired at a steady repair rate, R, through operation of a repair service, as represented by the clockwise cycling through the source objects of process state graph 510. FIG. 5B illustrates this in further detail. As previously mentioned, the circle of process state graph 510 represents the source objects stored by the storage system. As also mentioned previously, source objects are processed by the repair process in order of those source objects having the least number of fragments available, and among source objects with the same number of fragments available those objects that were repaired further in the past have priority over objects repaired more recently. When n=M (i.e., when there is a fragment for each source object on each storage node) it turns out that the order of processing of source objects is the same order each time the source objects are processed. Thus, the lazy repair policy operation of embodiments can be viewed as processing the source objects always in the same order, as if though the source objects were arranged around a circle and the lazy repair policy operation proceeds around the circle processing the source objects in the corresponding order of their arrangement around the circle, implementing a lazy repair policy in accordance with the concepts herein. Accordingly, individual source objects are represented by a corresponding portion of the circle. For example, those source objects having the most missing fragments (e.g., having a higher priority for generating repair fragments) are those in the circle nearest to the processing point measured with respect to the clockwise direction of processing, and those source objects having the fewest missing fragments (e.g., having a lower priority for generating repair fragments) are those in the circle furthest from the processing point measured with respect to the clockwise direction of processing (i.e., these are the objects that are closest to the processing point in the counter clockwise direction that will be processed furthest in the future). In the particular example illustrated in FIG. 5B, the source objects represented by portion 510-1 have 8 missing fragments, the source objects represented by portion 510-2 have 7 missing fragments, the source objects represented by portion 510-3 have 6 missing fragments, the source objects represented by portion 510-4 have 5 missing fragments, the source objects represented by portion 510-5 have 4 missing fragments, the source objects represented by portion 510-6 have 3 missing fragments, the source objects represented by portion 510-7 have 2 missing fragments, and the source objects represented by portion 510-8 have 1 missing fragment. The source objects represented by portion 510-9, however, have all 20 fragments available (i.e., no missing fragments), as may be the result of repair processing having recently been performed with respect thereto (as indicated by the processing point being immediately adjacent thereto in the clockwise direction) and no further storage nodes have failed since these source object were repaired. In contrast, the source objects represented by portion 510-2 have only 12 available fragments, wherein 10 fragments are needed for recovery of the data in the foregoing example, and thus present the most urgency with respect to repair processing. Accordingly, these source objects are the next for repair processing (as indicated by the processing point being immediately adjacent thereto in the counterclockwise direction). Provided the cycling through each of the source objects, as represented by the clockwise progression of the processing point around the circle of process state graph 501, is at a repair rate, R, sufficient to process the queued source objects before the loss rate of fragments results in fewer than 10 fragments being available in the storage system, no data will be lost. Knowing the data loss rate statics for the storage system, the rate for implementing such repair processing (perhaps with some buffer for a variation in loss rate) may be determined and implemented by a lazy repair policy of embodiments.

FIG. 5C illustrates operation of a lazy repair policy with respect to intermittent storage node failures. In the example illustrated in FIG. 5C, the storage nodes associated with process state graphs 530-13 and 530-15 have experienced an intermittent failure (i.e., a temporary failure), whereby the storage node is unavailable for access (e.g., for reading and writing fragment data) for some period of time (although, as this is a temporary failure, they will each become available within a sufficiently short time so as not to be declared permanently failed). That is, processing by the repair policy at the immediate past processing points was unable to write fragments for the source object then being processed to these storage nodes. Thus, the intermittent failure is represented by the portion of the respective circles immediately adjacent the processing point in the counterclockwise direction (i.e., portion 530-13a for process state graph 530-13 and portion 530-15a for process state graph 530-15) having no fragments associated therewith.

A repair service may implement an intermittent failure policy to accommodate intermittent storage node failures, such as those illustrated in FIG. 5C. In operation according to such an intermittent failure policy according to embodiments, the repair policy may read in at least k fragments for the source object, erasure decode the source object from the fragments as they arrive, and generate additional fragments for the source object as it is decoded. The additional fragments may be written to the storage nodes as they are generated. However, continuing with the intermittent storage node failures of the example above, some storage nodes (e.g., the storage nodes associated with process state graphs 530-13 and 530-15) are temporarily not available. Accordingly, the repair service may operate to track which fragments (or portions thereof) were successfully written and keep local copies of fragments (or portions thereof) which were not written (e.g., the repair service stores the fragments, as illustrated by fragments 530-13b and 530-15b stored by repair server functionality of access server 110 of FIG. 5D). When a storage node which has experienced an intermittent failure is detected as having recovered from the failure, the repair service may schedule a write of the unwritten fragment (or portion thereof) meant for that now recovered storage node (e.g., the repair service causes the fragments to be written to the storage nodes, as illustrated by fragments 530-13b and 530-15b written to a respective one of the storage nodes represented by process state graphs 530-13 and 530-15 of FIG. 5E).

The amount of storage utilized by a repair service to locally store fragments to accommodate storage node intermittent failures as described above may readily be accommodated by a repair server of embodiments herein. As an example, the storage system may include 1000 storage nodes (i.e., M=1000), the intermittent storage node failure rate maybe ¼ per month (i.e., $\lambda'$=¼ per month), and the time for intermittent storage nodes to recover may be 30 minutes (i.e., T=30 minutes). In this example, approximately 0.2 intermittent storage node failures may be expected within 30 minutes (i.e., 1000·3/365/48=0.2), reasoned as 1000·3 is the number of intermittent failures per year, divide by 365 provides number of intermittent failures per day, divide by 48 provides the number of intermittent failures per 30 minutes). An embodiment implementing a 10 gigabit per second repair rate (i.e., R=10 Gbps) experiencing 100 intermittent failures within 30 minutes (a level which is 500 times the foregoing expected level of failures) would store at most 10% of the fragments to be written (i.e., 100/1000 stored over 30 minutes, wherein the repair service discards fragments after time T, 30 minutes, due to the storage node being determined to be permanently failed). Accordingly, the repair server of this example would utilize temporary storage capacity of at most 225 GB (10 Gbps·30 minutes·10%=225 GB).

Having generally described systems and apparatus adapted to provide liquid distributed storage control according to embodiments herein, reference is now made to FIGS. 6-9 showing flow diagrams of operation according to some embodiments. It should be appreciated that the operations set forth in the flows of FIGS. 6-9 may be performed by logic of liquid distributed storage control 212 as executed by processor 211 of access server 210.

Figure 6:
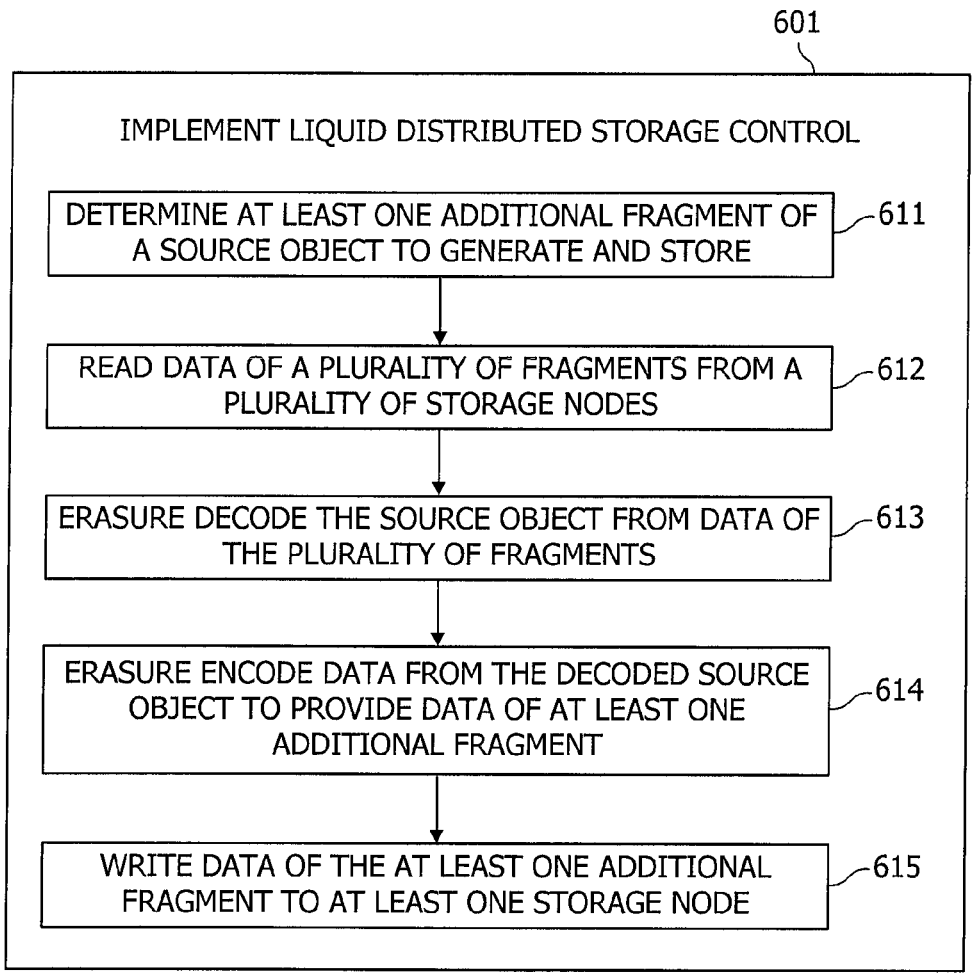
FIGS. 6 and 7 show functional blocks adapted for implementing liquid distributed storage control to facilitate repair of source data of a source object stored as multiple fragments distributed across multiple storage nodes of a storage system according to aspects of the present disclosure.

FIG. 6 shows functional block 601 adapted for implementing liquid distributed storage control to facilitate repair of source data comprising one or more source object stored as multiple fragments distributed across multiple storage nodes of a storage system according to embodiments. As discussed above, the multiple fragments include redundant data (also referred to herein as repair data) for the source data. Operation according to the illustrated embodiment determines at least one additional fragment of the multiple fragments of a source object of the one or more source objects to generate and store at block 611. Operation at block 612 of the illustrated embodiment reads data of a plurality of fragments of the multiple fragments from a plurality of storage nodes of the multiple storage nodes. The source object is erasure decoded from data of the plurality of fragments in operation at block 613 as illustrated. Data of the source object is then erasure encoded to provide data of at least one additional fragment for the multiple fragments at block 614 of the illustrated embodiment. Data of the at least one additional fragment is written to at least one storage node of the multiple storage nodes in operation of block 615 as illustrated. As one skilled in the art will recognize, the above embodiment can be modified to apply to portions of source objects instead of apply to entire source objects.

In alternative embodiments, the operation of various ones of the foregoing blocks may be combined. For example, a full RAPTORQ decoder implementation can be operated in two steps, where the first step is to generate an intermediate block of data from received encoding symbols, and the second step is to generate the (missing symbols of the)

source block from the intermediate block, and this is one way to operate the RaptorQ decoder in block 613. Similarly, a full RAPTORQ encoder implementation can be operated in two steps, where the first step is to generate an intermediate block from a source block, and the second step is to generate repair symbols from the intermediate block, and this is one way to operate the RAPTORQ encoder in block 614. However, the operation of blocks 613 and 614 can be combined according to embodiments where the combination of the operation of block 613 and block 614 can be more efficiently achieved using the following method. In block 613, invoke the first step of the RAPTORQ decoder to generate an intermediate block from received encoding symbols. In block 614, invoke the second step of the RAPTORQ encoder applied directly to the intermediate block generated in block 613 to generate the encoding symbols (source and or repair symbols) corresponding to the at least one additional fragment. Thus, this alternative method operates only the first step of the full RAPTORQ decoder and the second step of the full RAPTORQ encoder, thus avoiding operating the second step of the full RAPTORQ decoder and the first step of the full RAPTORQ encoder.

In implementing features of liquid distributed storage control by functional block 601 of embodiments, liquid distributed storage control may be provided with respect to the reading data of the plurality of fragments (block 612) and writing the data of the at least one additional fragment (block 615) to control an average aggregate reading and writing bandwidth (R) such that $R \cdot \beta \approx \mu$, wherein R comprises an average aggregate reading and writing bandwidth for repair of source data within the storage system, $\beta$ comprises a fraction of data redundancy of the storage system provided by the one or more fragments including redundant data, and $\mu$ comprises a rate at which data is being lost from the multiple storage nodes of the storage system. Additionally or alternatively, liquid distributed storage control may be provided with respect to the reading data of the plurality of fragments (block 612) and writing the data of the at least one additional fragment (block 615) to constrain a reading and writing bandwidth below a value R that is a function of $\beta$ and $\mu$, wherein R comprises an average aggregate reading and writing bandwidth for repair of source data within the storage system, $\beta$ comprises a fraction of data redundancy of the storage system provided by the one or more fragments including redundant data, and $\mu$ comprises a rate at which data is being lost from the multiple storage nodes of the storage system. Likewise, implementing liquid distributed storage control may be provided with respect to the reading data of the plurality of fragments (block 612) and writing the data of the at least one additional fragment (block 615) to provide a repair time ($t^{REP}$) constrained such that $t^{REP}$ is at most a time for $\beta \cdot M$ nodes to permanently fail, wherein $t^{REP}$ is the time to repair process each of the source objects of the storage system once (i.e., $t^{REP}$ is at most $D_{ALL}/R$), wherein $\beta$ comprises a fraction of data redundancy of the storage system provided by the one or more fragments including redundant data and M is a number of the multiple storage nodes of the storage system.

Stated another way, the repair bandwidth R may be configured so that $t^{REP}$ is at most the time for $\beta \cdot M$ nodes to permanently fail, wherein $\beta$ comprises a fraction of data redundancy of the storage system provided by the one or more fragments including redundant data and M is the number of storage nodes of the storage system. Where R is so configured then source data will not be lost from the storage system (i.e., there will always be sufficient data stored in the storage nodes to ensure that each portion of source data stored in the storage system can be erasure decoded). That is, since $t^{REP}$ is at most $D_{ALL}/R$, if $D_{ALL}/R$ is at most the time for $\beta \cdot M$ nodes out of M nodes to permanently fail then source data will not be lost from the storage system. Restating this, if R times $T_{FAIL}$ is at least $D_{ALL}$ then source data will not be lost from the storage system, where $T_{FAIL}$ is the minimum amount of time in which $\beta \cdot M$ nodes permanently fail. For example, if storage nodes permanently fail independently at rate $\lambda$ then the expected time till $\beta \cdot M$ nodes permanently fail is $\beta/\lambda$ (e.g., if $1/\lambda=3$ years and $\beta=0.33$ then the expected time till $\beta \cdot M$ nodes permanently fail is one year, and $T_{FAIL}$ is less than one year). Since there may be permanent node failures that are not replaced by new nodes for a period of time, it may be impractical to ensure that all portions of source data are restored to M fragments during the repair process, $\beta \cdot M$ can be more generally be replaced with X in this paragraph, where X is the minimum over all portions of source data of the difference between the number of fragments the portion of source data has available just after repair and the number of source fragments for that portion of source data. There may also be intermittent node failures, in which case X may be further reduced by the maximum number (with high probability) of concurrent intermittent node failures. This methodology also applies when n<M if $T_{FAIL}$ is redefined to be the minimum amount of time in which X nodes out of any n nodes permanently fail. Furthermore, $T_{FAIL}$ may be defined as an amount of time for which it is improbable (instead of impossible) for X nodes out of any n nodes to permanently fail in less than this amount of time. Thus if R times $T_{FAIL}$ is at least $D_{ALL}$ then source data loss is unlikely from the storage system, where $T_{FAIL}$ is an amount of time for which it is unlikely that more than $\beta \cdot M$ nodes permanently fail when nodes are replaced on a regular basis, or more generally $T_{FAIL}$ is an amount of time for which it is unlikely that more than X nodes permanently fail, where X is as described above.

The provisioned value of R may be an average repair bandwidth needed by the repair process over a long window of time, whereas the actual repair bandwidth used by the repair process can be controlled to average to the provisioned value of R over windows W of time, whereas over intervals of time shorter than W the repair bandwidth can vary dramatically, independent of when data is lost (but source objects are not necessarily lost, and preferably source objects are not lost) from the storage system (e.g., due to storage node failures). For example, a target MTTDL may be achieved if the provisioned bandwidth is R=1 Gbps when averaged over windows W of one month, and thus the actual pattern of repair bandwidth usage by the lazy repair process operation may be to use 48 Gbps for a three and a half hour period of time each Sunday, i.e., from 1 AM to 4:30 AM. Accordingly, the average aggregate reading and writing bandwidth (R) provided by liquid distributed storage control of embodiments may be dynamically adjusted. For example, implementing liquid distributed storage control may be provided with respect to the reading data of the plurality of fragments (block 612) and writing the data of the at least one additional fragment (block 615) to provide a dynamically adjusted repair bandwidth, R, wherein R is dynamically adjusted based on an amount of repair instances in a repair queue and a predicted data loss rate for the multiple storage nodes. In general, the adjustment of the provisioned repair bandwidth R can be such that $R \cdot W$ changes gradually, where W is a window of time over which the repair policy should use an average of R bandwidth (if there are objects in the repair queue) to achieve a provisioned MTTDL.

In the foregoing discussion of FIG. 6, the repair bandwidth is represented as R, whereas in the discussion of FIGS. 3A and 3B the repair rate is represented as R. It should be appreciated that, the repair rate is the actual rate at which the repair process is using bandwidth, and the repair bandwidth is generally the repair rate, although the repair bandwidth may be used to indicate an upper bound on the repair rate. However, for the lazy repair policy of embodiments herein most of the time the repair rate and the upper bound on the repair rate are the same (i.e., most of the time the repair policy uses all of the repair bandwidth made available to the repair policy). Accordingly, the aforementioned examples have used R to represent both the repair rate and the repair bandwidth.

Figure 7:
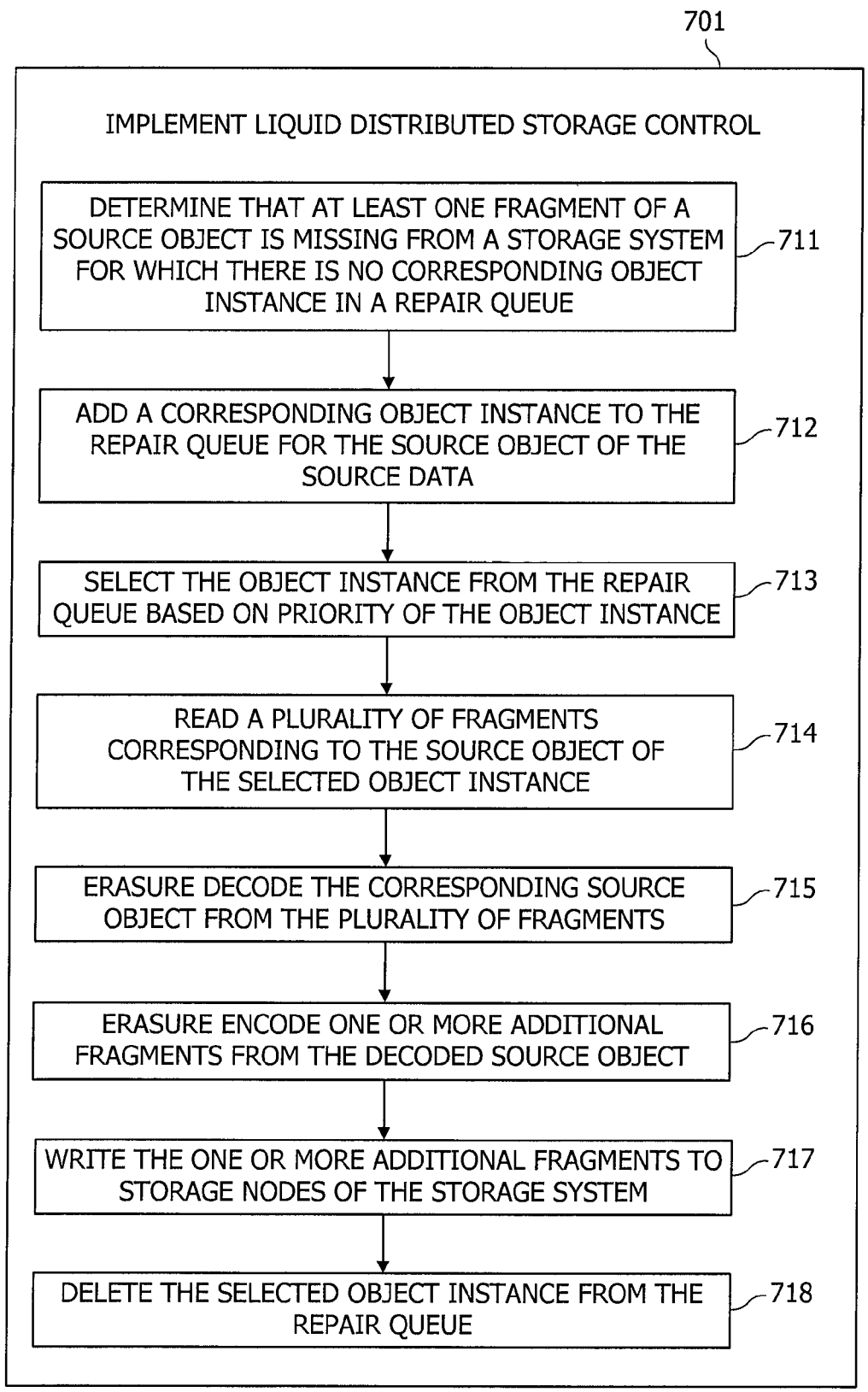

FIG. 7 shows functional block 701 adapted for implementing liquid distributed storage control to facilitate repair of source data comprising one or more source objects stored as multiple fragments distributed across multiple storage nodes of a storage system according to embodiments. Operation according to the illustrated embodiment determines that at least one fragment of the multiple fragments is missing from the storage system for a source object for which there is no corresponding object instance in a repair queue at block 711. A corresponding object instance is added to the repair queue for the source object at block 712. It should be appreciated that the repair queue may contain corresponding object instances for a large fraction of objects stored in the storage system. For example, such a large fraction according to embodiments may comprise a number of object instances greater than or equal to $1-c/r$, wherein r is the number of the multiple repair fragments of source objects of the one or more source objects, c is a positive, non-zero constant value (e.g., $1 \leq c \leq 10$ according to embodiments). Additionally or alternatively, such a large fraction according to embodiments may comprise 50% or greater of the source objects, 70% or greater of the source objects, or 90% or greater of the source objects. At block 713 of the illustrated embodiment the object instance is selected from the repair queue based on a priority of the object instance relative to other object instances in the repair queue. Operation in accordance with the illustrated embodiment at block 714 reads a plurality of fragments of the multiple fragments corresponding to the selected object instance from a plurality of storage nodes of the multiple storage nodes. Thereafter, a corresponding source object is erasure decoded from the plurality of fragments (block 715) and one or more additional fragments is erasure encoded from the decoded source object (block 716) according to the illustrated embodiment. The one or more additional fragments are written to storage nodes of the storage system (block 717) and the selected object instance is deleted from the repair queue (block 718) as illustrated.

In alternative embodiments, the operation of various ones of the foregoing blocks may be combined. For example, block 715 and block 716 can be combined, operating only the first step of a full RAPTORQ decoder and the second step of a full RAPTOrQ encoder, thus avoiding operating the second step of the full RAPTORQ decoder and the first step of the full RAPTORQ encoder, similar to the alternative embodiment of block 613 and 614 of FIG. 6 described herein.

As can be appreciated from the forgoing, embodiments implemented in accordance with functional block 701 employ a repair queue. As can readily be appreciated from the disclosure herein, this repair queue may be utilized in implementing a lazy repair policy, a priority based hierarchy of source object instances for repair processing, etc.

Figure 8:
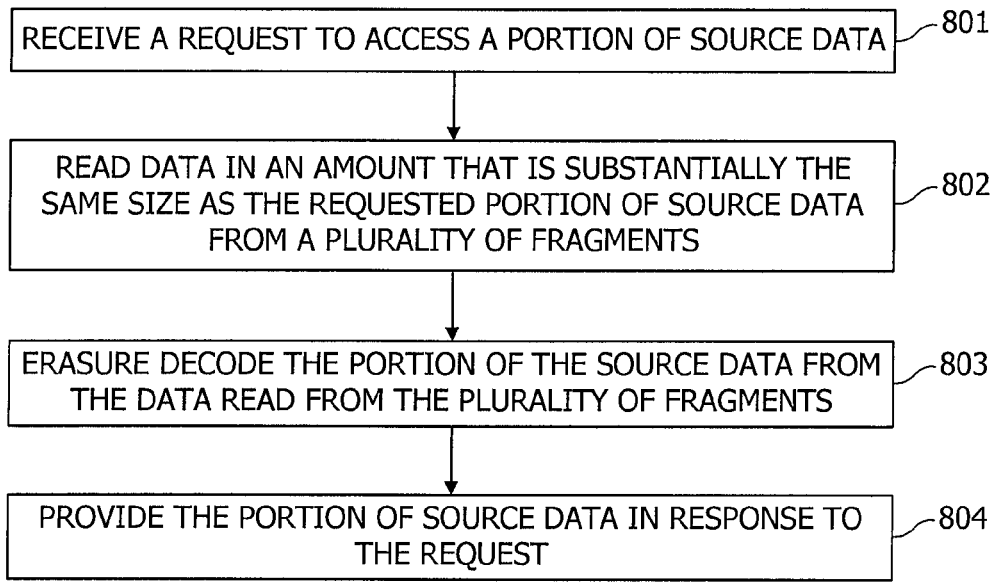
FIGS. 8 and 9 show operation employing the features of a data organization technique allowing a repair policy to avoid handling large objects and instead stream data into the storage nodes at a very fine granularity according to aspects of the present disclosure.
Figure 9:
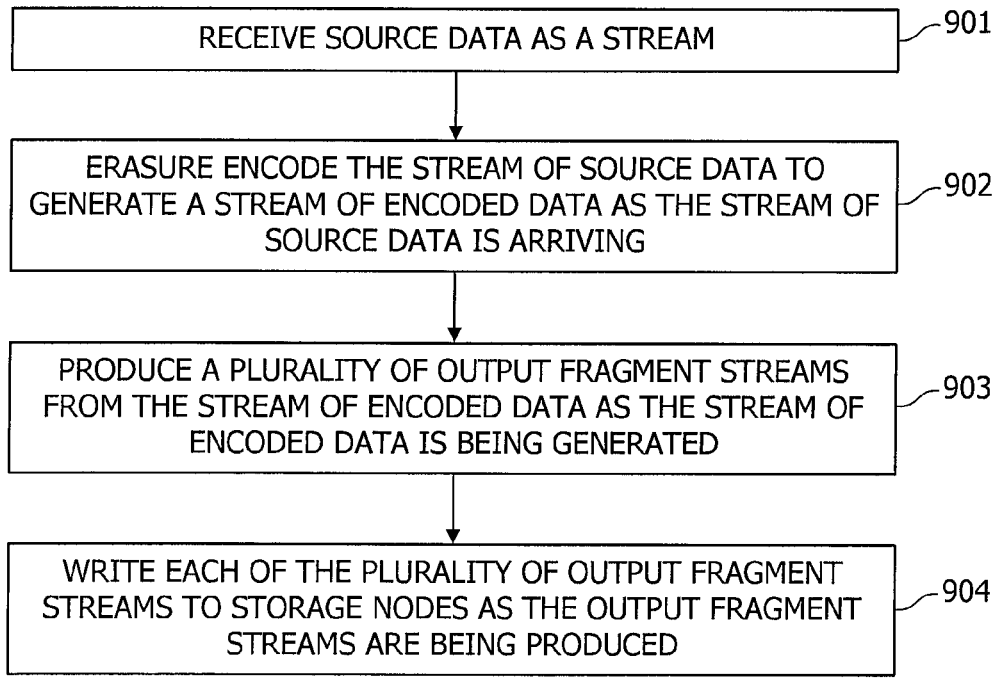

FIGS. 8 and 9 illustrate operation employing the features of a data organization technique, such as the aforementioned weaver data organization, allowing a repair policy to avoid handling large objects and instead stream data into the storage nodes at a very fine granularity. It should be appreciated that, although not illustrated as part of a functional block for implementing liquid distributed storage control, the embodiments of FIGS. 8 and 9 may be utilized as part of liquid distributed storage control to facilitate repair of source data comprising one or more source object stored as multiple fragments distributed across multiple storage nodes of a storage system, if desired.

In operation according to the embodiment of FIG. 8 a request to access a portion of source data is received at block 801 that is stored using an (n; k; r) erasure code. Data of a plurality of fragments of the multiple fragments is read from a plurality of storage nodes of the multiple storage nodes to access the portion of data at block 802 of the illustrated embodiment. It should be appreciated that, due to the data organization utilized, an amount of the data of the plurality of fragments read at block 802 of embodiments is substantially equal to a size of the requested portion of the source data independent of the pattern of which fragments are available and missing for all patterns that include at least k available fragments. Operation at block 803 of the illustrated embodiments provides erasure decoding of the portion of source data from the data of the plurality of fragments read from the plurality of storage nodes. Thereafter, at block 804, the portion of the source data may be provided in response to the request.

FIG. 9 shows a flow adapted for generating repair data for source data of a source object to be stored as multiple fragments distributed across multiple storage nodes of a storage system according to concepts herein. The repair data may, for example, be generated from the source data using an (n; k; r) erasure code. Operation at block 901 of the illustrated embodiment provides for receiving the source data as a stream of data. Through use of the features of the data organization utilized according to embodiments, the stream of source data is erasure encoded to generate a stream of encoded data as the stream of source data is arriving (block 902) and a plurality of output fragment streams are produced from the stream of encoded data as the stream of encoded data is being generated (block 903). Thereafter, using the data organization, each of the plurality of output fragment streams are written to storage nodes as the output fragment streams are being produced (block 904), wherein a first portion of each of the output fragment streams corresponds to a first portion of the source object and are written to the storage nodes before a second portion of the source object has been received.

Figure 10:
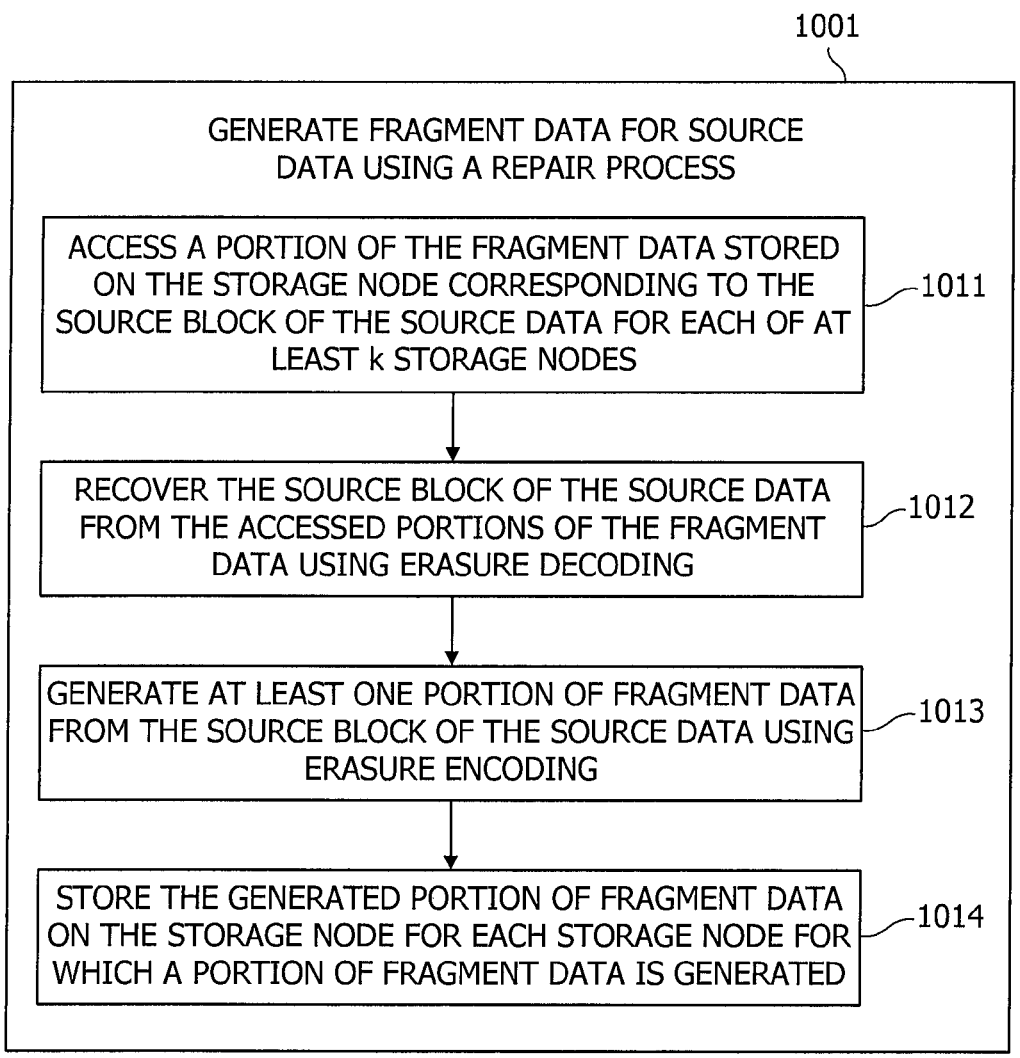
FIG. 10 shows operation for providing repair data for source data stored in a storage system as fragment data distributed across multiple storage nodes according to aspects of the present disclosure.

FIG. 10 shows operation for providing repair data for source data stored in a storage system as fragment data distributed across multiple storage nodes according to embodiments. The illustrated embodiment comprises functional block 1001 adapted for generating the fragment data for the source data using a repair process (e.g., a repair process running on one or more servers) at block 1001. The erasure code from which the repair data may, for example, comprise an (n; k; r) erasure code. The source data from for which the repair data is generated is organized as consecutive source blocks of source data, wherein a size of the source data is much greater than a size of the source blocks, according to embodiments. In operation according to embodiments, the repair process processes each of the source blocks of source data in order. The repair process flow of the illustrated embodiment includes for each of at least k storage nodes, accessing a portion of the fragment data stored on the storage node corresponding to the source block of the source data (block 1011). The source block of the source data is recovered from the accessed portions of the fragment data using erasure decoding at block 1012 of the illustrated embodiment. At least one portion of fragment data is generated from the source block of the source data using erasure encoding at block 1013 of the illustrated embodiment. Thereafter, for each storage node for which a portion of fragment data is generated, the generated portion of fragment data may be stored on the storage node (block 1014). In operation according to embodiments, data of the source data stored on each node of the multiple storage nodes is organized as consecutive portions of fragment data, wherein the consecutive portions of fragment data are generated from the consecutive source blocks of the source data.

In alternative embodiments, the operation of various ones of the foregoing blocks, may be combined. For example, block 1012 and block 1013 can be combined, operating only the first step of a full RAPTORQ decoder and the second step of a full RAPTORQ encoder, thus avoiding operating the second step of the full RAPTORQ decoder and the first step of the full RAPTORQ encoder, similar to the alternative embodiment of block 613 and 614 of FIG. 6 described herein.

Figure 11:
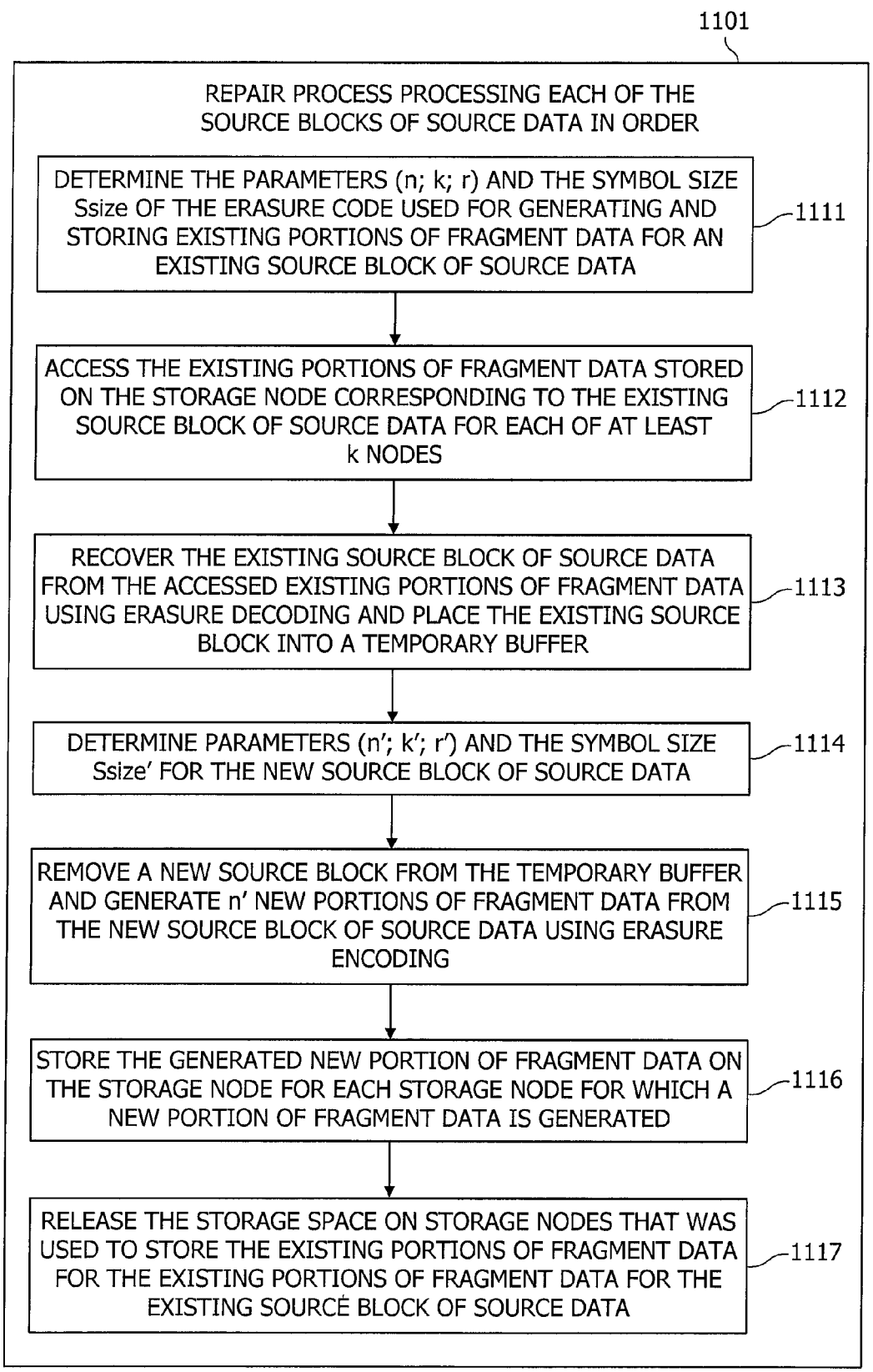
FIG. 11 shows operation for redistributing repair data for source data redundantly stored in a storage system as fragment data distributed across multiple storage nodes according to aspects of the present disclosure.

FIG. 11 shows operation for redistributing repair data for source data redundantly stored in a storage system as fragment data distributed across multiple storage nodes. The repair data is generated from the source data using an (n; k; r) erasure code using a repair process (e.g., a repair process running on one or more servers). The source data from which the repair data is generated is organized as consecutive existing source blocks of source data, wherein a size of the source data is much greater than a size of the existing source blocks, according to embodiments. The source data stored on each storage node of the multiple storage nodes is organized as consecutive portions of fragment data, wherein the consecutive portions of fragment data are generated from the consecutive portions of source data, according to embodiments. The illustrated embodiment comprises functional block 1101 adapted for redistributing repair data by a repair process processing each of the existing source blocks of source data in order. The processing by the repair process of the illustrated embodiment includes determining, for an existing source block of source data, the parameters (n; k; r) and the symbol size Ssize of the erasure code used for generating and storing existing portions of the fragment data from the existing source block (block 1111). The existing portions of fragment data stored on the storage node corresponding to the existing source block of source data is accessed for each of at least k nodes at block 1112 of the illustrated embodiment. The existing source block of source data is recovered from the accessed existing portions of fragment data using erasure decoding at block 1113 of the illustrated embodiment, and the existing source block of size k·Ssize is placed into a FIFO (first-in first-out) temporary buffer. Parameters (n'; k'; r') and the symbol size Ssize' for a new source block of source data are determined for new portions of fragment data to be generated for the new source block of source data at block 1114 of the illustrated embodiment. At block 1115 of the illustrated embodiment, as long as there are at least k'·Ssize' bytes in the FIFO temporary buffer, k'·Ssize' bytes of data are removed from the FIFO temporary buffer to form a new source block, and n' new portions of fragment data are generated from the new source block of source data using erasure encoding. In operation according to embodiments, k' of the new portions of the fragment data comprise data from the new source block of source data. The generated new portion of fragment data is stored on the storage node for each storage node for which a new portion of fragment data is generated at block 1116 of the illustrated embodiment. Thereafter, the storage space on storage nodes that was used to store the existing portions of fragment data for the existing source block of source data may be released (block 1117).

The foregoing discussion has provided description of operation of liquid distributed storage control, and functional blocks thereof, according to embodiments herein. The following discussion provides additional detail and analysis with respect to various aspects of liquid distributed storage control and corresponding use of large erasure codes, lazy repair policies, repair bandwidth control, and weaver data organization.

The analysis below shows that there are tradeoffs for large erasure code solutions between storage efficiency and repair bandwidth. In particular, using more data redundancy allows using less repair bandwidth, and vice-versa. Moreover, a large erasure code solution can use less repair bandwidth than a small erasure code solution for the same storage efficiency, or alternatively, a large erasure code solution can be more storage efficient than a small erasure code solution using the same or less repair bandwidth. The analysis of the repair policy, analyzes the lower bounds on the repair bandwidth required by the repair policy for both small erasure code solutions and large erasure code solutions to be able to provide good reliability. For large erasure code solutions the analysis shows the amount of repair bandwidth sufficient to provide good reliability for a given storage overhead is relatively close to the lower bound. It should be appreciated that the analysis applies when the repair bandwidth is compressed to the point that the repair queue is seldom empty (e.g., there are nearly always multiple object instances flowing through the repair queue in a coordinated way), and are thus the object instances act as a liquid. The analysis is thus referred to herein a liquid analysis of the repair policy.

The liquid analysis herein models the overall system behavior of the repair policy, and in particular models how the size of the repair queue, populated with object instances for objects that require repair, grows relative to how much the repair bandwidth used by the repair policy is compressed. In contrast, a Markov chain analysis generally assumes that object instances are treated independently and do not collect in a repair queue (e.g., the object instances act like gas molecules that are repaired independently), and thus such an analysis is referred to herein as a gas analysis. The liquid analysis of repair policies provided here identify generally when the behavior of the repair policy transitions from a gas regime to a liquid regime as the repair bandwidth is compressed, which roughly identifies the range of repair bandwidths for which a gas analysis is applicable. One of the findings provided by the liquid analysis for small erasure code solutions is that, the repair policy behavior undergoes phase transitions as the assumed repair bandwidth, R, allocated to the repair policy is lowered.

For simplicity in the following, there are M storage nodes in the system (i.e., a new storage node is added to the system within a reasonable amount of time, such as almost immediately, within one day or one week or one year, when a storage node permanently fails). For small erasure code solutions the liquid analysis shows that there are a sequence of decreasing repair bandwidth thresholds $R_1^{Sm}$, $R_2^{Sm}$, $R_3^{Sm}$, . . . , $R_r^{Sm}$ at which the following phase transitions occur: If R is sufficiently above the threshold $R_1^{Sm}$ then the repair queue is generally close to empty and objects are repaired relatively quickly (i.e., the repair policy is in the gas regime); As R is lowered below the threshold $R_1^{Sm}$ a phase transition to the liquid regime occurs where the repair queue is filled with an increasing fraction of objects with one fragment missing, and these objects remain in the repair queue increasing durations in time until they are repaired or until they have two missing fragments and are then repaired relatively quickly; As R is lowered below the threshold $R_2^{Sm}$ a second phase transition occurs where the repair queue is filled with so many objects with one fragment missing that they are never repaired until they have two fragments missing, and the objects with two fragments missing either remain in the repair queue for increasing periods of time until they are repaired or until they have three missing fragments and are then repaired relatively quickly; and As R is lowered below the threshold $R_i^{Sm}$ an $i^{th}$ phase transition occurs where the repair queue is filled with so many objects with at most i−1 fragments missing that they are never repaired until they have i fragments missing, and the objects with i fragments missing either remain in the repair queue for increasing periods of time until repaired or until they have i+1 missing fragments and are then repaired relatively quickly.

For large erasure codes the repair policy operates in the regime where the liquid analysis is applicable for any reasonable amount of repair bandwidth, and the liquid analysis provides a relatively tight analysis of the repair bandwidth that is sufficient for a given storage overhead and reliability. The following expresses when repair bandwidth R provides reliability with respect to the total size $D_{ALL}=D_{SRC}/(1-\beta)$ of the aggregate size of source and repair data stored in the system if all M fragments are available for every stored object, wherein $D_{SRC}$ is the aggregate size of all source objects stored in the storage system, as a function of the number r of repair fragments per object: Source data is never lost if the number of failed storage nodes over periods of duration $$\frac{D_{ALL}}{R}$$

is at most $r=\beta \cdot M$. The duration $$\frac{D_{ALL}}{R}$$

is an upper bound on the amount of time to repair all the objects in the storage system at the average repair bandwidth rate R, and $r=\beta \cdot M$ is the maximum number of storage nodes that can fail before an object needs repair since the last time it was repaired. This expression can be used to describe a relationship between the repair bandwidth R, the storage overhead $$\beta = \frac{r}{n},$$

an upper bound on the amount of overall data $D_{ALL}$ in the storage system, and the storage node failure rate $\lambda$. Since the expected number of node failures in time $$\frac{D_{ALL}}{R}$$

is $$\frac{\lambda \cdot M \cdot D_{ALL}}{R},$$

the expression implies that:

$$R \cdot \beta \geq \lambda \cdot D_{ALL} \qquad (1)$$

One way to interpret Equation (1) is that the product of the repair bandwidth R and storage overhead $\beta$ should be at least as large as the rate $\mu = \lambda \cdot D_{ALL}$ at which the storage system loses data.

Turning now to liquid analysis of (n; k; r) small erasure codes, the analysis demonstrates a relationship between the repair bandwidth constraint R and the fullness of the repair queue. For i=0 to r, let $f_i$ be the fraction of objects for which n−i fragments are available. Suppose that $f_0=1$ (i.e., all fragments for all objects are available) and thus the repair queue is empty. Then the rate at which repair traffic is being added to the repair queue is at least $$R_1^{Sm} = \frac{(k+1) \cdot n \cdot \lambda \cdot D_{ALL}}{n} = (k+1) \cdot \lambda \cdot D_{ALL},$$

since at least k+1 of n fragments are to be either read or written to repair an object, and each object with n fragments available is being added to the repair queue at rate $n \cdot \lambda$, and $D_{ALL}$ is the total size of all fragments for objects for which all n fragments are available.

The first phase transition occurs at the threshold value $R_1^{Sm}$. When $R > R_1^{Sm}$ the repair queue is filled slower than it is emptied and thus it can be empty most of the time, when $R = R_1^{Sm}$ the repair queue is filled at the same rate it is emptied and thus it is in an unstable state where it can sometimes be empty but other times quite full due to random fluctuations, and when $R < R_1^{Sm}$ the repair queue is filled faster than it is emptied and thus it starts filling up.

In general, for i=1 to r, an $i^{th}$ phase transition occurs at $$R_i^{Sm} = \frac{(k+1) \cdot n \cdot \lambda \cdot D_{ALL}}{n \cdot \sum_{j=0}^{i-1} \frac{1}{n-j}}.$$

To appreciate this, suppose the rate R is such that for j=1 to i−1, objects are added to and removed from $f_j$ at a balanced rate so that $f_j$ is not changing, and the rate repair traffic is being added to $f_i$ is R. Then, the relative ratio of the transition rate of objects from $f_j$−1 to $f_j$ to the transition rate of objects from $f_j$ to $f_{j+1}$ is $$\frac{(n-(j-1)) \cdot f_{j-1}}{(n-j) \cdot f_j};$$

which implies $n \cdot f_0 = (n-1) \cdot f_1 = \ldots = (n-(i-1)) \cdot f_{i-1}$, $$R = \frac{(k+i) \cdot (n-(i-1)) \cdot \lambda \cdot D_{ALL}}{n} \cdot f_{i-1},$$

and $f_i = f_{i+1} = \ldots = f_r = 0$. These constraints imply that the phase transition is at $R = R_i^{Sm}$. Note that $$\frac{(k+i) \cdot \lambda \cdot D_{ALL}}{i} \cdot \frac{n-(i-1)}{n} \leq R_i^{Sm} \leq \frac{(k+i) \cdot \lambda \cdot D_{ALL}}{i}.$$

The foregoing liquid analysis illustrates some consequences of implementing liquid distributed storage control, especially for small erasure code solutions, according to embodiments. For example, when $R < R_1^{Sm}$ the mean time to repair for even a single fragment loss for an object will generally be much larger than T, where T is the time between when a storage node fails and when the storage node failure is determined to be either permanent or intermittent, and even much larger than $$\frac{(k+1) \cdot S}{R}$$

for processing all the objects affected by the loss of a single node, where S is the amount of data stored on the failed storage node. This is because there will be a large number of object instances for other objects in the repair queue that will be competing for the R network bandwidth that the repair policy can use for repair. For example, if $$R = \frac{R_1^{Sm}}{1.5}$$

then at least 33% of the objects will be in the repair queue. Since the object instance for an object has lowest priority when it is first placed in the repair queue, according to embodiments, unless there is another fragment loss for that object that raises the priority of the object instance, the average amount of time the repair policy takes to generate one or more repair fragments for the object is at least $$\frac{2 \cdot (k+1) \cdot M \cdot S}{3 \cdot R \cdot n},$$

which is approximately 67% of the time it takes to read all source data in the storage system at rate R. This is because object instances for objects with one fragment missing are moving at a rate of R/2 to missing two fragments, and object instances for objects missing two fragments are higher priority than object instances for objects missing one fragment, and thus object instances for objects with one fragment missing are being repaired and removed from the repair queue at a rate of only R/2.

The foregoing amount of time is significantly longer than the repair time assumed in the usual Markov chain analysis used to determine MTTDL. Furthermore, when a storage node fails it is likely that a large fraction of the fragments it stores are objects that already had one fragment missing before the node failed. Thus, it will take some significant amount of time to repair these objects with two fragments missing on the failed storage node. This analysis indicates that generally such a Markov chain analysis is not directly applicable when $R<R_1^{Sm}$, and the actual MTTDL is much larger when R is restricted as described.

For small erasure code solutions, where each of the r=n−k repair symbols is a relatively significant portion of the protection provided for an object, when $R<R_1^{Sm}$ the resulting high average repair time of objects significantly degrades the reliability protection provided by the storage system solution. Even when R is less than the threshold $R_1^{Sm}$ but close to $R_1^{Sm}$, the repair queue will intermittently grow to a significant level for extended periods of time, due to random variation in the rate of storage node failures, putting at risk the protection provided by small erasure code solutions. Thus, for small erasure code solutions the repair bandwidth R is generally significantly greater than the threshold $R_1^{Sm}$.

Turning now to liquid analysis of (n; k; r)=(M;(1−β)·M; β·M) large erasure codes, where $$\beta = \frac{r}{n} < 1$$

is the storage overhead, me analysis shows that a large erasure code solution can provide high reliability and use significantly less repair bandwidth R than a small erasure code solution. In the case of such a large erasure code, each of the r=β·M repair symbols is a relatively small $$\frac{1}{r}$$

portion of the overall protection. In providing the large erasure code liquid analysis it should be observed that the time between when an object instance is added to the repair queue for an object and when the repair policy restores all M fragments for the object (i.e., the repair time) is at most $$\frac{D_{ALL}}{R}.$$

This observation may be justified as follows: Assume that an object instance O-instance for object O is added to the repair queue at time $t^{start}$ and processing of O-instance by the repair policy concludes at time $t^{end}$. The analysis shows that O-instance is processed before any object instances added to the repair queue after time $t^{start}$ are processed.

Now consider an object instance O'-prior for object O' that is in the repair queue at time $t^{start}$. Assume processing of O'-prior concludes at time t', where $t^{start}<t'<t^{end}$, and thus all fragments of O' are available on all storage nodes that have not failed at time t'. It can be seen that from time t' to time $t^{end}$ there will be a fragment stored for O' on each storage node for which there is a fragment stored for O (and O' possibly also has fragments stored on storage nodes for which no fragments are stored for O), and thus during this interval of time the number of available fragments for O' is at least the number of available fragments for O.

Assume an object instance O'-after for object O' is added to the repair queue at time t'', where $t^{start}<t'<t''<t^{end}$. Because O' between time t' and time $t^{end}$ has as many available fragments as O, and because O'-after is added to the repair queue after O-instance, the priority of O-instance in the repair queue should always be higher than that of O'-after, and thus O-instance will be processed before O'-after. Similarly, consider any object instance O'-after for O' that is not in the repair queue at time $t^{start}$, but is added to the repair queue after time $t^{start}$ and before $t^{end}$. By similar arguments to those above, O-instance will be processed before O'-after.

From the foregoing, the time to complete processing of O-instance is in the worst case the amount of time it takes to repair the object instances in the repair queue at time $t^{start}$. In the worst case there is an object instance for every object in the repair queue at time $t^{start}$ and O-instance is the lowest priority amongst these. The total traffic used to repair every object once is bounded by $D_{ALL}$. Thus, $$t^{end} - t^{start} \le \frac{D_{ALL}}{R}.$$

An upper bound on the probability that source data is lost by the storage system can be determined from the probability of the following failure event, since the aforementioned observation shows that source data loss can occur only if the failure event occurs. Assume a failure event in which there are more than r=β·M storage node failures in a time interval of duration $$\frac{D_{ALL}}{R}.$$

To evaluate the failure event probability, let X be a Poisson random variable with $$E[X] = \lambda' = \frac{\lambda \cdot M \cdot D_{ALL}}{R}.$$

That is, $\lambda'$ is the expected number of node failures over a time interval of duration $$\frac{D_{ALL}}{R}.$$

Let $$\text{Poisson}(a, b) = e^{-a} \cdot \sum_{i=b+1}^{\infty} \frac{a^i}{i!}$$

be the probability that a Poisson random variable with mean a is at least b. Then $\Pr[X \geq r] = \text{Poisson}(\lambda', r)$.

Permanent node failure events occur at a rate $\lambda \cdot M$. A permanent node failure at time t can cause data loss only if in the window of duration $$\frac{D_{ALL}}{R}$$

prior to t there are at least r permanent node failures. Thus, using a union bound, the frequency of data loss is at most $\lambda \cdot M \cdot \text{Poisson}(\lambda', r)$, and thus the MTTDL is at least $$\frac{1}{\lambda \cdot M \cdot \text{Poisson}(\lambda', r)}.$$

Let m be a target MTTDL. If $$\text{Poisson}(\lambda', r) \leq \frac{1}{\lambda \cdot M \cdot m}$$

then the MTTDL will be at least m. The smallest $\delta \geq 1$ may be found so that $$\text{Poisson}\left(\frac{r}{\delta}, r\right) \leq \frac{1}{\lambda \cdot M \cdot m}.$$

If R were set to $$R^{Lg} = \frac{\lambda \cdot D_{ALL}}{\beta}$$

then $\lambda' = \beta \cdot M = r$ (i.e., $E[X] = r$) for this value of R. Thus, $R = \delta \cdot R^{Lg}$ implies $$\lambda' = \frac{r}{\delta}$$

and guarantees that the MTTDL is at least m. This value of R is conservative, as it assumes that all n fragments of an object are either accessed or stored during the repair, when generally less than n fragments are accessed or stored during the repair. From this it can be seen that if the amount of data either read or written by the repair process is at least $D_{ALL}$ over every window of duration at least $$\frac{\beta}{\delta \cdot \lambda}$$

then the MTTDL is at least m. Stated differently, if the average repair bandwidth is at least R over every window of duration at least $$\frac{\beta}{\delta \cdot \lambda}$$

then the MTTDL is at least m. For a fixed MTTDL target m, a fixed value $\beta$ and a fixed rate of individual storage node failures $\lambda$, the value of $\delta$ approaches one as a function of an increasing number M of storage nodes in the system. Thus, the average amount of repair bandwidth R that is sufficient approaches $$\frac{\lambda \cdot D_{ALL}}{\beta}$$

and the window duration approaches $$\frac{\beta}{\lambda}$$

as a function of an increasing number M of storage nodes in the system.

A slightly optimistic value of R can be imputed as follows: When the repair happens on objects missing $$\frac{r}{\delta}$$

fragments, the network traffic overall to repair all objects once is proportional to $$D_{ALL} \cdot \frac{k + \frac{r}{\delta}}{n},$$

since k fragments are read and $$\frac{r}{\delta}$$

fragments are written to repair an object with n fragments. If $$R = \frac{\delta \cdot k + r}{n} \cdot R^{Lg}$$

then the expected number of storage node failures over a time interval of duration $$\frac{D_{ALL}}{R} \cdot \frac{k + \frac{r}{\delta}}{n} \text{ is } \frac{r}{\delta},$$

in which case the upper bounds on the probability of the failure event apply. It should be appreciated that the actual value of R that guarantees the MTTDL is at least m is somewhere between the conservative and the slightly optimistic value of R.

The usage of repair bandwidth can be considered as two separate components: the amount of bandwidth used to read data from storage nodes to access servers, hereafter referred to as the read repair bandwidth, and the amount of bandwidth used to write data from access servers to storage nodes, hereafter referred to as the write repair bandwidth. Depending on the network architecture, it is often the case that the read repair bandwidth used by a repair process and the bandwidth used by an access process to access source objects or portions of source objects for EU devices use shared network resources. Similarly, it is often the case that the write repair bandwidth used by a repair process and the bandwidth used by a storage process to store source objects or portions of source objects for EU device use shared network resources. Thus, it can be useful to bound separately the amount of read repair bandwidth and the amount write repair bandwidth needed by a repair process to achieve a given MTTDL for a storage system.

For a small code solution using a reactive repair policy, the amount of write repair bandwidth used averaged over long periods of time is $\lambda \cdot D_{ALL}$, since generally for a small code solution all n fragments are available for storage objects most of the time, and thus amount of data stored on the storage nodes is typically close to $D_{ALL}$, and data on average is being written at the rate $\lambda \cdot D_{ALL}$ that it is being lost. On the other hand, as described herein, over short periods at unpredictable times the write repair bandwidth for a small code solution can be much higher. For a liquid distributed storage system using a large code and a lazy repair policy, the amount of write repair bandwidth used is at most $\lambda \cdot D_{ALL}$ and at least $\lambda \cdot D_{SRC}$, since the amount of data stored in the storage system is between $D_{ALL}$ and $D_{SRC}$ when using a lazy repair policy. Thus, the average write repair bandwidth for a liquid distributed storage solution is at most that of a small code solution. Furthermore, similar to the overall repair bandwidth, the usage of the write repair bandwidth can be flexibly scheduled independent of the storage node failure events.

For a small code solution using a reactive repair policy, the amount of read repair bandwidth used averaged over long periods of time is $\lambda \cdot k_{Sm} \cdot D_{ALL} = \lambda \cdot n_{Sm} \cdot D_{SRC}$, since generally for a small code solution at least $k_{Sm}$ fragments are read for each fragment written, where $(n_{Sm}; k_{Sm}; r_{Sm})$ are the small code parameters. On the other hand, as described herein, over short periods at unpredictable times the read repair bandwidth for a small code solution can be much higher. For a liquid distributed storage system using a large code and a lazy repair policy, the amount of read repair bandwidth used is at most $$R_{READ} = \delta \cdot \frac{\lambda \cdot D_{SRC}}{\beta}.$$

This is because, using similar reasoning to that used to bound the overall repair bandwidth, if the amount of data that is read by the repair process is at least $D_{SRC}$ over every window of duration at least $$\frac{\beta}{\delta \cdot \lambda}$$

then the MTTDL is at least m. Stated differently, if the average repair bandwidth is at least $R_{READ}$ over every window of duration at least $$\frac{\beta}{\delta \cdot \lambda}$$

then the MTTDL is at least m. For a fixed MTTDL target m, a fixed value β and a fixed rate of individual storage node failures λ, the value of δ approaches one as a function of an increasing number M of storage nodes in the system. Thus, the average amount of read repair bandwidth $R_{READ}$ that is sufficient approaches $$\frac{\lambda \cdot D_{SRC}}{\beta}$$

and the window duration approaches $$\frac{\beta}{\lambda}$$

as a function of an increasing number M of storage nodes in the system. Furthermore, similar to the overall repair bandwidth, the usage of the read repair bandwidth can be flexibly scheduled independent of the storage node failure events. Note that the read repair bandwidth is $$R_{READ} = \delta \cdot \frac{\lambda \cdot n_{Lg} \cdot D_{SRC}}{r_{Lg}}$$

for the liquid distributed storage solution, where $(n_{Lg}; k_{Lg}; r_{Lg})$ are the code parameters for the large code, and if the two solutions use the same relative storage overhead $$\beta = \frac{r_{Lg}}{n_{Lg}} = \frac{r_{Sm}}{n_{Sm}}$$

then the read repair bandwidth for the liquid distributed storage solution can be expressed as $$R_{READ} = \delta \cdot \frac{\lambda \cdot n_{Sm} \cdot D_{SRC}}{r_{Sm}},$$

which is smaller by a factor of $$\frac{r_{Sm}}{\delta}$$

than the read repair bandwidth used by a small code solution using a reactive repair policy, and is smaller by a factor approaching $r_{Sm}$ as δ approaches one as a function of an increasing number of M of storage nodes in the system. The analysis immediately above when R is the read repair bandwidth is a small modification of the analysis provided above when R is the aggregate read and write bandwidth. Similar modifications of other portions of the analysis provided above when R is the aggregate read and write bandwidth can also provide an analysis when R is the read repair bandwidth. For example, when R is the read repair bandwidth then the modified analysis shows that if R times $T_{FAIL}$, is at least $D_{SRC}$ then source data loss is unlikely from the storage system, where $T_{FAIL}$ is an amount of time for which it is unlikely that more than β·M nodes permanently fail when nodes are replaced on a regular basis, or more generally $T_{FAIL}$ is an amount of time for which it is unlikely that more than X nodes permanently fail, where X is as described previously. As another example, when R is the read repair bandwidth then the modified analysis shows that the product of R and the storage overhead β should be at least as large as the rate μ=λ·$D_{SRC}$ at which the storage system loses source data.

In considering large erasure code solutions, for i=0 to r let $O_{k+i}$ be the set of objects with k+i fragments available at time t. It can be seen that all objects in $O_{k+i}$ have exactly the same fragments available on the same set of k+i storage nodes $M_{k+i}$ associated with a set of k+i ESIs $ESI_{k+i}$. Furthermore, it can be seen that $M_k \subset M_{k+1} \subset \ldots \subset M_{k+r}$, and thus $ESI_k \subset ESI_{k+1} \subset \ldots \subset ESI_{k+r}$. It should be appreciated that the following are consequences independent of whether or not the large erasure code is MDS: For all i=0 to r, the set of k+i ESIs $ESI_{k+i}$ determine the recoverability of all objects in $O_{k+i}$, thus either all objects or none of the objects in $O_{k+i}$ are recoverable, and the terminology "$O_{k+i}$ is recoverable" is used herein if all objects in $O_{k+i}$ are recoverable. For all i=1 to r, if $O_{k+i-1}$ is recoverable then $O_{k+i}$ is recoverable, thus all objects are recoverable if $O_{k+i_{MIN}}$ is recoverable where $i_{MIN}=\min\{i: O_{k+i} \neq \emptyset\}$ (i.e., $i_{MIN}$ is the minimum index of i such that the set of objects $O_{k+i}$ contains at least one object, or equivalently is not the empty set). Thus, at each point in time there is one set of $k+i_{MIN}$ ESIs $ESI_{k+i_{MIN}}$ that determines decodability of all objects.

The repair policy interaction with storage node failures has a relatively simple pattern. The repair policy is repairing objects in $O_{k+i_{MIN}}$, and after repair the objects moves to $O_{k+r}=O_n$. Thus, the repair policy can be viewed as moving objects at rate R from $O_{k+i_{MIN}}$ to $O_{k+r}=O_n$.

Assume that there is a storage node failure at time t. Then, $O_{k+r}$ is empty, (i.e., contains no objects) just after t and for all i=r−1 to 0, $O_{k+i}$ just after t is equal to $O_{k+i+1}$ just before t. Note that if $O_k$ is not empty (i.e., contains at least one object) just before t then all objects in $O_k$ just before t are lost at time t.

From the foregoing it can be appreciated that, at time t, $O_{k+r}$ is the set of objects that were repaired since the first node failure prior to t, $O_{k+r-1}$ is the set of objects that were repaired between the first and second storage node failures prior to t, and in general $O_{k+r-i}$ is the set of objects that were repaired between node failures i and i+1 prior to t.

Assume that $i_{MIN}$ does not change. Let $D_{k+i}=(n-i_{MIN})$·Fsize·$|O_{k+i}|$, where $|O_{k+i}|$ is the number of objects in $O_{k+i}$. Then $$\frac{D_{k+i}}{R}$$

reflects the amount of time between storage node failures i and i+1 prior to t, because the network traffic when object O was added to $O_{k+i}$ was $(n-i_{MIN})$·Fsize. For example, if the time between consecutive storage node failures is equal, then $D_{k+i}$ will be the same for all i=r−1 to $i_{MIN}+1$, while the repair policy is concurrently emptying $O_{k+i_{MIN}}$ and filling $O_{k+r}$ at rate R. If the repair rate R is doubled and the failure rate λ, remains unchanged then generally r−$i_{MIN}$ is halved and $D_{k+i}$ is doubled for all i=r−1 to $i_{MIN}+1$. If instead the repair rate R remains unchanged and the failure rate λ doubles then generally r−$i_{MIN}$ is doubled and $D_{k+i}$ is halved for all i=r−1 to $i_{MIN}+1$.

The above analysis of the repair policy provides information useful in providing dynamic adjustment of the repair rate, R, based on ongoing measurements of relevant parameters. It should be appreciated that the repair bandwidth that is appropriate for the repair policy can depend on many parameters that can be difficult to determine a priori, including the storage node failure and replacement rates and the amount of source data stored in the storage system. Accordingly, one approach is to estimate the relevant parameters conservatively. However, this can cause the repair bandwidth to be set too high and needlessly consume network bandwidth. Alternatively, if the relevant parameters are estimated too aggressively then the repair bandwidth can be set too low and compromise reliability. Thus, embodiments are operable to dynamically and continuously adjust the repair bandwidth by small increments based on continual measurements of the relevant parameters.

In providing dynamic adjustment of the repair bandwidth, consider the situation at time t. Let $$\lambda'_{k+i_{MIN}} = \frac{\lambda \cdot M \cdot D_{k+i_{MIN}}}{R}$$

be the expected number of storage node failures during the repair of the objects in $O_{k+i_{MIN}}$ using repair bandwidth R. Similarly, for i=$i_{MIN}+1$ to r, let $$\lambda'_{k+i} = \frac{\lambda \cdot M \cdot \sum_{j=i_{MIN}}^{i} D_{k+j}}{R}$$

be the expected number of storage node failures during the repair of the objects in $O_{k+i_{MIN}}$ to $O_{k+i}$ using repair bandwidth R.

For i=$i_{MIN}$ to r, let $X_{k+i}$ be a Poisson random variable with mean $\lambda'_{k+i}$, and let $p_{k+i}=\Pr[X_{k+i}>i]$. If $X_{k+i} \leq i$ for i=$i_{MIN}$ to r then no objects will be lost before all objects are repaired once subsequent to time t. Thus, the probability that at least one object is lost before all objects are repaired once subsequent to time t is at most $$p_{sum} = \sum_{i=i_{MIN}}^{r} p_{k+i}.$$

Similarly to how the target value f can be set as described previously, a target value for the MTTDL can be used to deduce a target value for $p_{sum}$, which in turn can be used to determine a value of R that achieves this value for $p_{sum}$, and thus achieves the target MTTDL.

The repair bandwidth R can be adjusted periodically according to embodiments to a minimal value that ensures $p_{sum}$ is at most a target failure probability.

From the foregoing liquid analysis, the following observations can readily be appreciated: For a small erasure code solution and a large erasure code solution using the same relative storage overhead, the large erasure code solution uses significantly less repair bandwidth; and For a small erasure code solution and a large erasure code solution using the same repair bandwidth, the large erasure code solution uses significantly less storage overhead.

For example, consider a small (16; 12; 4) erasure code solution and a large (1600; 1200; 400) erasure code solution. These two solutions have the same storage overhead $$\frac{r}{n} = \frac{1}{4}.$$

The ratio of the bounds for repair bandwidth satisfy $$\frac{R_1^{Sm}}{R^{Lg}} = \frac{r \cdot (k+1) \cdot \lambda \cdot D_{ALL}}{n \cdot \lambda \cdot D_{ALL}} = \frac{r \cdot (k+1)}{n} = 3.25.$$

If R were set to the threshold $R^{Lg}$ for the large erasure code solution then $\lambda'=r=400$, and thus $\delta$ may be set as $\delta=1.5$ so that $R=\delta \cdot R^{Lg}$ and so that $$E[X] = \frac{r}{\delta} = 266.7.$$

Then, using a standard Poisson calculation, $Pr[X>r=400] \approx 10^{-14}$, which leads to a MTTDL of over 200 billion years for an average failure rate $\lambda \cdot M$ of one storage node per day. Thus, a repair bandwidth R that is only 50% higher than the threshold $R^{Lg}$ achieves a MTTDL that is many times the lifetime of the universe in this example. In contrast, the repair bandwidth for the small erasure code solution is likely much larger than the threshold $R_1^{Sm}$ (e.g., more than three times larger than the threshold $R^{Lg}$) in order to achieve the same level of reliability as the large erasure code solution.

FIGS. 12 and 13 show the results of simulations with respect to particular storage system configurations to provide comparisons of operation of reactive repair policies using small erasure codes and lazy repair policies using large erasure codes according to embodiments herein. In particular, FIG. 12 provides a cloud based storage system configuration, such as may be implemented by the AZURE cloud platform available from Microsoft Corporation, while FIG. 13 provides an application service provider storage system configuration, such as may be implemented by the FACEBOOK social networking application available from Facebook, Inc.

In the storage system configuration of the simulations of FIG. 12, the storage system includes 400 storage nodes with each storage node having 16 terabytes of storage. The mean time between loss of a storage node for these simulations is assumed to be 3 years, and thus $\lambda=\frac{1}{3}$ ($\frac{1}{3}$ storage node failure per year). The time between storage node failure and determining that the storage node has permanently failed is 30 minutes (i.e., T=30 minutes). The simulations of FIG. 12 were for 10 million years of operation of the storage system.

As can be seen in the table of results provided in FIG. 12, for the simulation of the reactive repair policy with small erasure code where the repair bandwidth was limited to 40 Gbps, the repair policy is performing repairs slightly less than 10% of the time (i.e., in bursts up to 40 Gbps of repair bandwidth), with a mean time to loss of any source data (MTTDL) of 2,200 years for 100 MB source objects or 9,800 years for 2 GB source objects (i.e., Osize=100 MB or Osize=2 GB). For the simulation of the reactive repair policy with small erasure code where the repair bandwidth was limited to 80 Gbps, the repair policy is performing repairs slightly less than 5% of the time (i.e., in bursts up to 80 Gbps of repair bandwidth), with a mean time to loss of any source data (MTTDL) of 4,800 years for 100 MB source objects or 22,000 years for 2 GB source objects. For the simulation of the reactive repair policy with small erasure code where the repair bandwidth was limited to 100 Gbps, the repair policy is performing repairs slightly less than 4% of the time (i.e., in bursts up to 100 Gbps of repair bandwidth), with a mean time to loss of any source data (MTTDL) of 6,000 years for 100 MB source objects or 27,000 years for 2 GB source objects. For the reactive repair policy with small erasure code, the bursts of repair traffic immediately follow a storage node failure, and thus the bursts are dictated by the arbitrary timing of failure events that are unpredictable, and which may coincide with times when access to or storage of source data at high speed, using the share bandwidth resource, is crucial.

In contrast, for the simulation of the lazy repair policy with large erasure code, providing for 267 source fragments and 133 repair fragments (a configuration providing a repair overhead matching that of the reactive repair policies simulated), where the repair bandwidth was limited to 2.44 Gbps, the repair policy is performing repairs continuously (i.e., at a steady rate of 2.44 Gbps of repair bandwidth), with a mean time to loss of any source data (MTTDL) of 10/000,000 years for both 100 MB and 2 GB source objects (i.e., the MTTDL exceeded the duration of the simulation). For the simulation of the lazy repair policy with large erasure code, providing 336 source fragments and 64 repair fragments (i.e., utilizing a significantly smaller repair overhead than the reactive repair policies simulated), where the repair bandwidth was limited to 7.61 Gbps, the repair policy is performing repairs continuously (i.e., at a steady rate of 7.61 Gbps of repair bandwidth), with a mean time to loss of any source data (MTTDL) 10,000,000 years for both 100 MB and 2 GB source objects (i.e., the MTTDL again exceeded the duration of the simulation). For the lazy repair policy with large erasure codes, the scheduling of the repair traffic is much more flexible (e.g., it can be scheduled independently of the timing of failure events, and can be spread evenly or unevenly over larger periods of time, such as to be scheduled to occur one hour each day when access and storage activities are largely quiescent, or the repair processing can be temporarily suspended when high levels of access or storage or other activities that consume the shared bandwidth occur and then repair processing can resume when the other activities subside). Furthermore, the amount of provisioned repair bandwidth sufficient to achieve a given MTTDL is largely insensitive to how much time T there is between when a node fails and when the failure is determined to be a permanent failure, and to how much time there is between when a node permanently fails and when a new storage node is added to the storage system to replace the lost storage capacity from the failed node, wherein this is not the case for the immediate repair policy with the small erasure code. For example, when T is increased from 30 minutes to 24 hours, for the simulation of the reactive repair policy with small erasure code where the repair bandwidth was limited to 40 Gbps, mean time to loss of any source data (MTTDL) decreases to around 8.5 months for 100 MB source objects and just under 2 years for 2 GB source objects, whereas for the simulation of the lazy repair policy with large erasure code, providing for 267 source fragments and 133 repair fragments (a configuration providing a repair overhead matching that of the reactive repair policies simulated), where the repair bandwidth was limited to 2.44 Gbps, the mean time to loss of any source data (MTTDL) remains at 10,000,000 years for both 100 MB and 2 GB source objects (i.e., the MTTDL exceeded the duration of the simulation).

In the storage system configuration of the simulations of FIG. 13, the storage system includes 3000 storage nodes with each storage node having 10 TB (terabytes) of storage. The mean time between loss of a storage node for these simulations is assumed to be 4 years, and thus $\lambda=\frac{1}{4}$ ($\frac{1}{4}$ storage node failure per year). The time between storage node failure and determining that the storage node has permanently failed is 30 minutes (i.e., T=30 minutes). The simulations of FIG. 13 were again for 10 million years of operation of the storage system. As can be seen in the table of results provided in FIG. 13, for the simulation of the reactive repair policy with small erasure code where the repair bandwidth was limited to 8.42 Gbps, the repair policy is performing repairs 100% of the time (i.e., the repair bandwidth is below $R_1^{Sm}$), and thus the mean time to loss of any source data (MTTDL) is 0.037 year for 100 MB source objects or 0.077 year for 2 GB source objects (i.e., Osize=100 MB or Osize=2 GB). For the simulation of the reactive repair policy with small erasure code where the repair bandwidth was limited to 28.5 Gbps, the repair policy is performing repairs slightly less than 75% of the time (i.e., in bursts up to 28.5 Gbps of repair bandwidth), with a mean time to loss of any source data (MTTDL) of 160,000 years for 100 MB source objects or 1,600,000 years for 2 GB source objects. In contrast, for the simulation of the lazy repair policy with large erasure code, providing for 2143 source fragments and 857 repair fragments (a configuration providing a repair overhead matching that of the reactive repair policies simulated), where the repair bandwidth was limited to 7.96 Gbps, the repair policy is performing repairs continuously (i.e., at a steady rate of 7.96 Gbps of repair bandwidth), with a mean time to loss of any source data (MTTDL) of 10/000,000 years for both 100 MB and 2 GB source objects (i.e., the MTTDL exceeded the duration of the simulation). For the simulation of the lazy repair policy with large erasure code, providing 2625 source fragments and 375 repair fragments (i.e., utilizing a significantly smaller repair overhead than the reactive repair policies simulated), where the repair bandwidth was limited to 20.8 Gbps, the repair policy is performing repairs continuously (i.e., at a steady rate of 20.8 Gbps of repair bandwidth), with a mean time to loss of any source data (MTTDL) 10,000,000 years for both 100 MB and 2 GB source objects (i.e., the MTTDL again exceeded the duration of the simulation).

From the foregoing simulations it can be readily seen that, even allowing for a large amount of burst bandwidth to facilitate reactive repair of the source objects, none of the reactive repair policies simulated provide a solution which meets the reliability provided by the lazy repair policies simulated. In operation, a lazy repair policy using a large erasure code consumes a fixed amount of bandwidth from the available bandwidth for the repairs, or an amount of repair bandwidth that averages over a window of time to at most the fixed amount of bandwidth, wherein this smooth consumption, or flexible consumption, of bandwidth has little impact on data access within the storage system, since the average amount is a small portion of the available bandwidth, or the bandwidth is used at times when it does not have a negative impact on other processes sharing the bandwidth such as access or storage processes. Moreover, there are no variations in the impact from repair bandwidth utilization from different storage node failure patterns or timing of node failures. In contrast, the reactive repair policy using a small erasure code consumes large bursts of bandwidth at unpredictable times (e.g., dictated by the timing of failure events). This bandwidth is a shared resource (e.g., shared by storage and access operations within the storage system), and thus the bursts can have a negative impact on data access, wherein the impact on such data access varies depending on the storage node failure pattern. Moreover, it can be seen from the above simulations that, although the reliability of the reactive repair policies is appreciably affected by the size of the source object, the reliability provided by the lazy repair policies simulated is not affected by the size of the source object.

The table below describes some of the qualitative differences between a small erasure code solution with a reactive repair policy and a large erasure code solution with a lazy repair policy. A small erasure code solution is sensitive to increases in the value of the intermittent failure threshold T. If T is increased by a factor of x then typically the MTTDL decreases by a factor of $x^{r-1}$. Thus, for example, if T is increased from 30 minutes to 24 hours for a small erasure code solution with r=4, then the corresponding decrease in the MTTDL is by a factor of over 100,000. In contrast, for a large erasure code solution using a lazy repair policy in accordance with concepts herein, the impact of increasing T from 30 minutes to 24 hours is minimal.

Further, a small erasure code solution is sensitive to the number of objects in the storage system. This is because the fragments for each object are stored on a randomly selected small set of nodes independently of other objects. Thus, for the same total amount of source data stored, using smaller and more numerous objects scatters the fragments more amongst the nodes than using larger and less numerous objects. Accordingly, when there are more objects there is a larger chance that there is an object with fragments on each of a particular small set of nodes that fail, causing permanent loss of that object. For small erasure code solutions, there is therefore a trade-off between the object size and the MTTDL, whereby more numerous small objects lead to smaller MTTDL but allows more granular repair and access to source data. Large erasure code solutions, however, are not sensitive to the number or size of objects in the storage system.

Additionally, a small erasure code solution is sensitive to future failures of storage nodes, since the failure of just a few storage nodes can cause permanent source data loss. Thus, the reactive repair policy may operate to abruptly raise the amount of repair bandwidth used for short periods of time to recover data and protect against future source data loss. For example, the number of source objects needing repair is often zero or quite low for a majority of the time until there is a node failure detected, at which point the repair bandwidth is quite high for a period of time. The repair bandwidth for large erasure code solutions can be adjust much more smoothly (e.g., adjusting the repair bandwidth in accordance with the concepts and techniques described herein).

| Metric | Small Erasure Code Solution | Large Erasure Code Solution |
| --- | --- | --- |
| Changes in T | Sensitive | Not Sensitive |
| Number of Source Objects | Sensitive | Not Sensitive |
| Intermittent Failures | Sensitive | Not Sensitive |
| Repair bandwidth usage | Abrupt large bursts triggered by failure events | Slow changes in a moderate average, flexibility of scheduling independent of failure events |

As previously discussed, embodiments providing liquid distributed storage control implement a data organization, referred to as the weaver data organization, that allows efficient access to all source data even when using a large erasure code. To aid in understanding the weaver data organization of embodiments, it is described in further detail below with respect to an (n; k; r) erasure code. The exemplary erasure code uses a small symbol size (e.g., Ssize=64 bytes) wherein the size of a source block is Bsize=k·Ssize. A source object of size Osize may be partitioned into $$N = \frac{Osize}{Bsize}$$

source blocks, and each such source block is independently erasure encoded into n source symbols according to embodiments. Each of the n fragments generated from the object may be associated with an ESI, and for simplicity suppose that the ESIs are 0 to k−1 corresponding to the k source fragments and k to n−1 corresponding to the r=n−k repair fragments. For each i=0 to n−1, fragment i of embodiments comprises the concatenation of the N symbols with ESI i generated from each of the N consecutive source blocks of the object.

The weaver data organization utilized according to embodiments herein has several relevant properties. For example, fragments for an object can be generated on-the-fly, as the object arrives. In particular, when the next Bsize bytes of the object arrive to form the next source block, the erasure encoding can be applied to this source block to generate n symbols, and the symbol with ESI i is appended to fragment i in operation according to embodiments.

Similarly, a source block sized chunk of an object can be accessed efficiently by reading the appropriate symbols from at least k of the n fragments associated with the object. Thus, the amount of data to be read to access a chunk of an object is the size of the chunk, at least when the chunk size is at least Bsize.

It should be appreciated that chunks can be accessed efficiently, both in terms of time and amount of data read, as long as k fragments for the object of which the chunk is part are available. Furthermore, the access speed can be increased by reading from more than k fragments and recovering as soon as the first k arrive.

Suppose, for example, a chunk of bytes [s; s+1 to e] of an object is requested by an application, where C=e−s+1 is the size of the chunk in bytes. To fulfill this request, the source blocks [$i_s$ to $i_e$] of the object can be recovered from the storages system, where $$i_s = \left\lfloor \frac{s}{Bsize} \right\rfloor \text{ and } i_e = \left\lfloor \frac{e}{Bsize} \right\rfloor.$$

To recover source blocks [$i_s$ to $i_e$.] of the object, the bytes [$i_s$·Ssize to ($i_e$+1)·Ssize−1] can be read from each of at least k fragments for the object.

From the foregoing, it can be appreciated that the weaver data organization is useful for implementation of storage systems, such as storage systems 100 and 200 described herein. Moreover, the weaver data organization is useful in a number of other applications, such as peer-to-peer file sharing and streaming applications, etc.

It should be appreciated that there are many variants which may be employed with respect to the exemplary embodiments described herein. For example, more than one ESI may be used per fragment (e.g., a fragment may have more than one symbol from each source block, such as where the same number G of symbols with different ESIs may be associated with each fragment per source block or an object or data stream). Such an embodiment may be advantageous to reduce relative code overhead, to improve resiliency of the erasure code to particular node loss patterns, etc.

As an example of another variant, the fragments associated with an object or data stream may be of variable size (i.e., different fragments carry different numbers of symbols from each of the source blocks). Such an embodiment may be useful to load balance data across storage nodes. For example, large capacity storage nodes can be assigned fragments with more symbols per source block than smaller capacity storage nodes (e.g., the number of symbols per source block assigned to the fragment may be proportional to the storage capacity of the storage node upon which the fragment is to be stored). Additionally or alternatively, all fragments associated with an object or data stream may be assigned the same number of symbols per source block, and then a varying number of fragments are stored on storage nodes depending on the relative capacity of the storage node. For example, a storage node with capacity 4 terabytes may store two fragments per object or data stream, a storage node with capacity 8 terabytes may store four fragments, and a storage node with capacity 14 terabytes may store seven fragments.

In still another variant, an (n; k; r) erasure code can be used where n is not equal to M. For example, a cluster of M storage nodes may be partitioned into sub-clusters of fewer nodes, such as where sub-clusters of s=100 nodes out of a cluster of M=3000 storage nodes are formed, wherein the sub-clusters are treated independently of other sub-clusters. In the foregoing example, M=3000 storage nodes may be partitioned into 30 sub-clusters of s=100 nodes each, and each object may be assigned to a sub-cluster and uses 100 fragments distributed to the 100 storage nodes of the sub-cluster. Alternatively, the sub-clusters may use overlapping sets of storage nodes (e.g., each sub-cluster of the foregoing example may be assigned to 100 storage nodes, but the assigned storage nodes may overlap with the storage nodes assigned to other sub-clusters). For example, the storage system may be designed so that each storage node participates in d sub-clusters, and each sub-cluster uses s of the M storage nodes. If d=3 and s=100 and M=3000 then there are 90 sub-clusters and each storage node is in d=3 sub-clusters. The number of sub-clusters that a storage node participates in may depend on the storage capacity of the storage node (e.g., more capacity implies participating in more sub-clusters) according to embodiments.

In yet another variant, each source object may define its own sub-cluster (e.g., n=100 fragments for each source object which are randomly distributed amongst M=3000 storage nodes independent of other source objects). Such an implementation may, however, experience higher book-keeping costs and may be harder to design a good repair policy using a given amount of repair bandwidth that guarantees a target MTTDL.

When using a design with sub-clusters according to some embodiments, the repair bandwidth may be assigned per sub-cluster. Alternatively, the repair bandwidth may be assigned globally and shared by repair processes for each of the sub-clusters. Whether using sub-clusters or not, there may be many repair processes that are working concurrently in a distributed fashion to provide the overall repair policy for the cluster.

As an example of another variant, chunks of source data that are accessed frequently, or generally at the same time, by applications, may be organized so that they are consecutive with an object or a data stream. This allows larger amounts of consecutive fragments to be read from the storage nodes when accessing multiple consecutive chunks of such data. Thus, chunks of data that are frequently accessed may remain in cache and avoid subsequent reading of fragments from storage nodes when they are accessed again.

In another variant, an EU device may utilize multiple connections with respect to one or more access server for data access and/or storage. In accordance with some embodiments, functionality for encoding and/or decoding the data may be disposed in the EU device. In such embodiments, the erasure encoding and/or erasure decoding of data may thus be shifted to the EU device from the access server of exemplary embodiments described above. Such a configuration may be utilized to facilitate the use of the aforementioned multiple connections between the EU device and one or more access servers of the storage network. The access servers of such configurations may provide a multiplex/demultiplex role with respect to the communication of data between the EU device and the storage nodes. For example, an access server may support communication with hundreds or even thousands of storage nodes, whereas an EU device may support communication with an access server via on the order of 10 connections. In operation, an EU device may use multiple connections (e.g., multiple TCP connections) to a single access server to make byte range requests (e.g., HTTP 1.1 byte range requests) for data to reconstruct an object, such as to provide increased download speed using parallel connections. Likewise, an EU device may use connections to multiple access servers, such as using connections providing different data speeds and/or requesting different amounts of data with respect to the various access servers, to provide a higher aggregate bandwidth and reduce access times. Such an EU device may, for example, have multiple interfaces (e.g., WiFi, LTE, etc.), whereby the EU device connects to different access servers over a different one of each such interface.

In operation according to an embodiment wherein an EU device utilizes multiple connections to one or more access server, the EU device may make requests to the access server(s), similar to embodiments described above. However, the EU device may request different fragments over different connections, multiple fragments over the same connection, chunks of fragments over different connections, etc. The EU device may thus include multiplex functionality operable to combine the responses for providing data to the erasure decoder. The access server in such an embodiment may accept the requests from the EU device, form and make requests for portions of fragments from the storage nodes, multiplex the responses from the storage nodes to form responses to the EU device requests, and provide the responses to the EU device. Rather than the source data coming to the EU device as a stream in response to a request, multiple responses may be provided to the EU device over multiple connections according to this exemplary embodiment.

FIGS. 14A-14D show accessing a portion of data by an EU device through multiple connections according to embodiments. In the illustrated example, the desired source data may be a portion of an overall object (e.g., the object may comprise the data of symbols 0-59 whereas the desired data comprises the data of symbols 10-44, wherein each symbol is of size Ssize). In accordance with an implementation of the weaver data structure of embodiments, each column of symbols in the example illustrated in FIG. 14A comprises a source block (i.e., in the illustrated example a source block comprises 5 source symbols (k=5), wherein the 3 additional symbols of the columns comprise repair symbols generated from the source block of source symbols in the corresponding column). In the illustrated example, because the EU device is only interested in the portion of data from symbols 10-44, only the data that was generated from that portion of the source object is requested, which includes the data of symbols 10-44 as well as repair symbols corresponding to each of the requested source blocks (i.e., repair symbols (5,2), (6,2), (7,2), (5,3), (6,3), (7,3), (5,4), (6,4), (7,4), (5,5), (6,5), (7,5) (5,6), (6,6), (7,6), (5,7), (6,7), (7,7), (5,8), (6,8), and (7,8)). In operation, the EU device may request all the source data for that portion of the object that goes from symbol 10 to symbol 44 (i.e., the portions of the B2 through B8 columns associated with ESIs 0, 1, 2, 3, and 4 in the illustration of FIG. 14) and all the repair data that is available in this example (i.e., the portions of the B2 through B8 columns associated with ESIs 5, 6, and 7). Assuming in this example that the EU device is utilizing 2 connections, the EU device may break up the requests into 2 requests (e.g., requesting portions of the fragments associated with ESIs 0, 1, 2, and 3 through a first connection, and requesting portions of the fragments associated with ESIs 4, 5, 6, and 7 through a second connection).

Figure 14A:
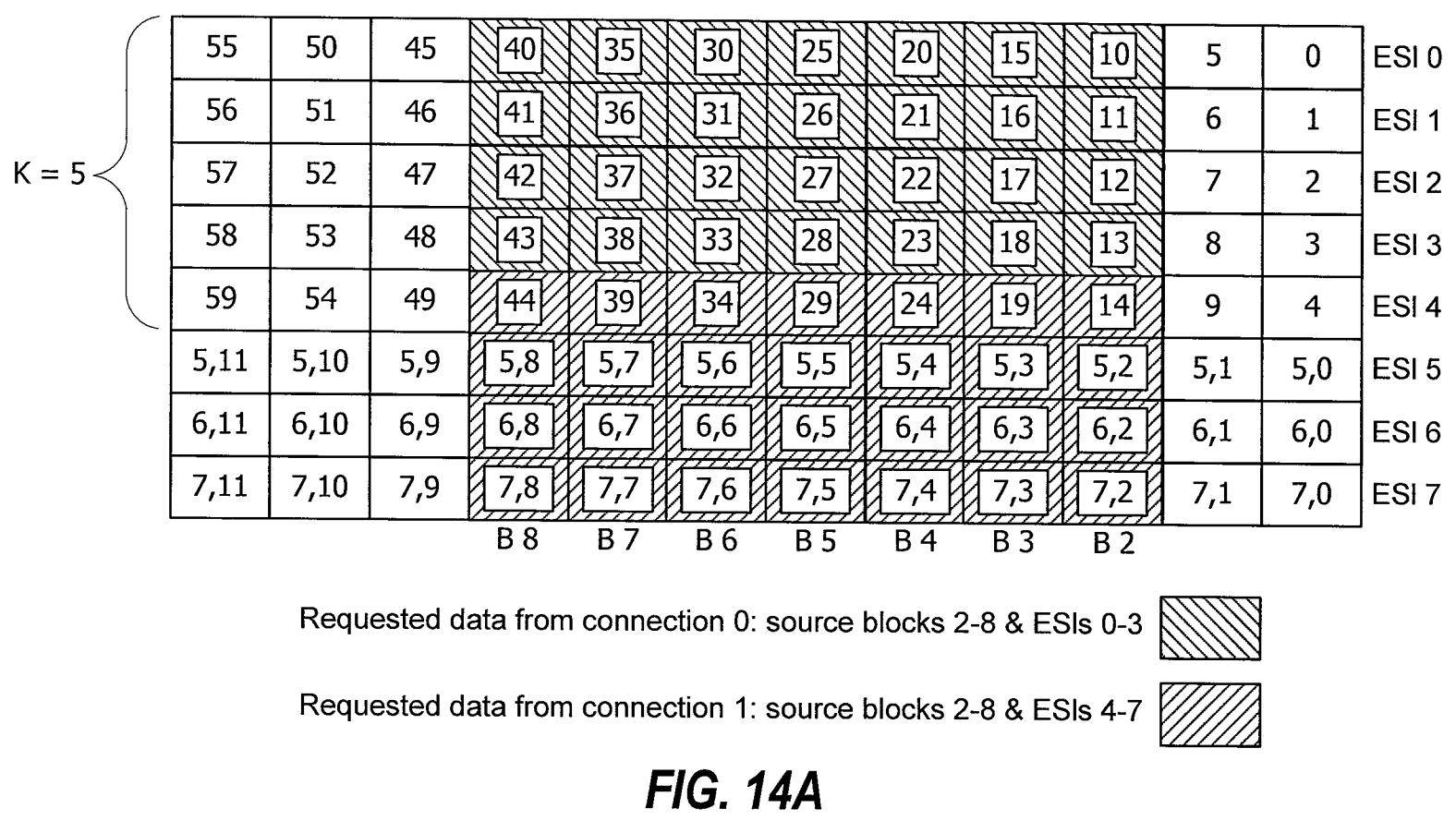
Figure 14B:
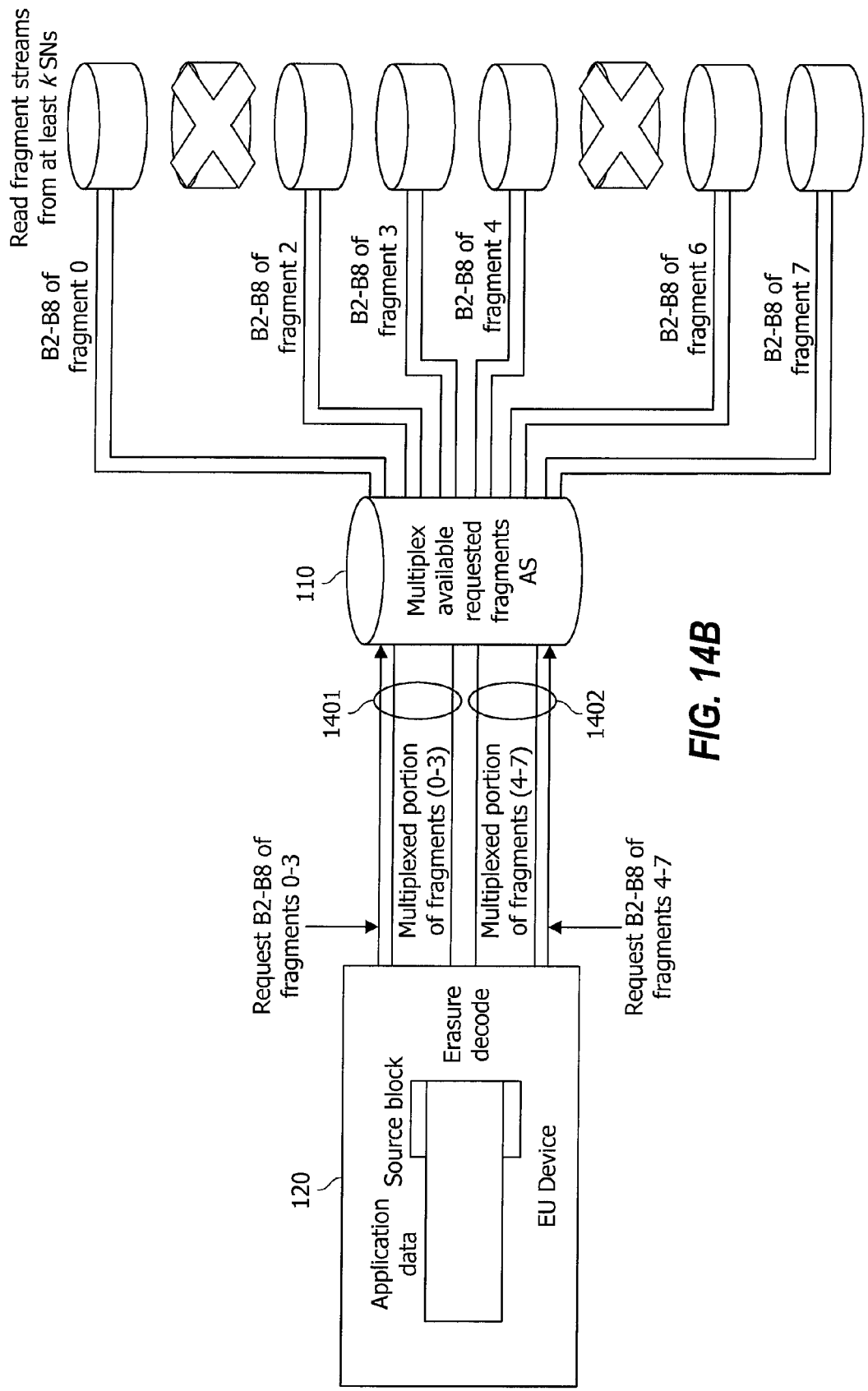

FIG. 14B illustrates downloading and decoding of the requested data by the EU device using multiple connections (i.e., 2 connections in the illustrated example, shown as connections 1401 and 1402) to a same access server. As can be seen in the example illustrated in FIG. 14B, the EU device requests the portion of the fragments with encoding symbol IDs 0-3 through connection 1401 and the portion of the fragments with encoding symbol IDs 4-7 through connection 1402. The access server in turn makes requests of the particular storage nodes for the appropriate portions of the fragments. However, in this example the storage node storing Fragment 1 and the storage node storing Fragment 5 have failed. Thus, the access server receives the data for Fragments 0, 2-4, 6, and 7 from the storage nodes and aggregates that data to provide responses to the requests from the EU device (e.g., the appropriate portions of data from Fragments 0, 2, and 3 is aggregated and provided through connection 1401 and the appropriate portions of data from Fragments 4, 6, and 7 is aggregated and provided through connection 1402).

Figure 14C:
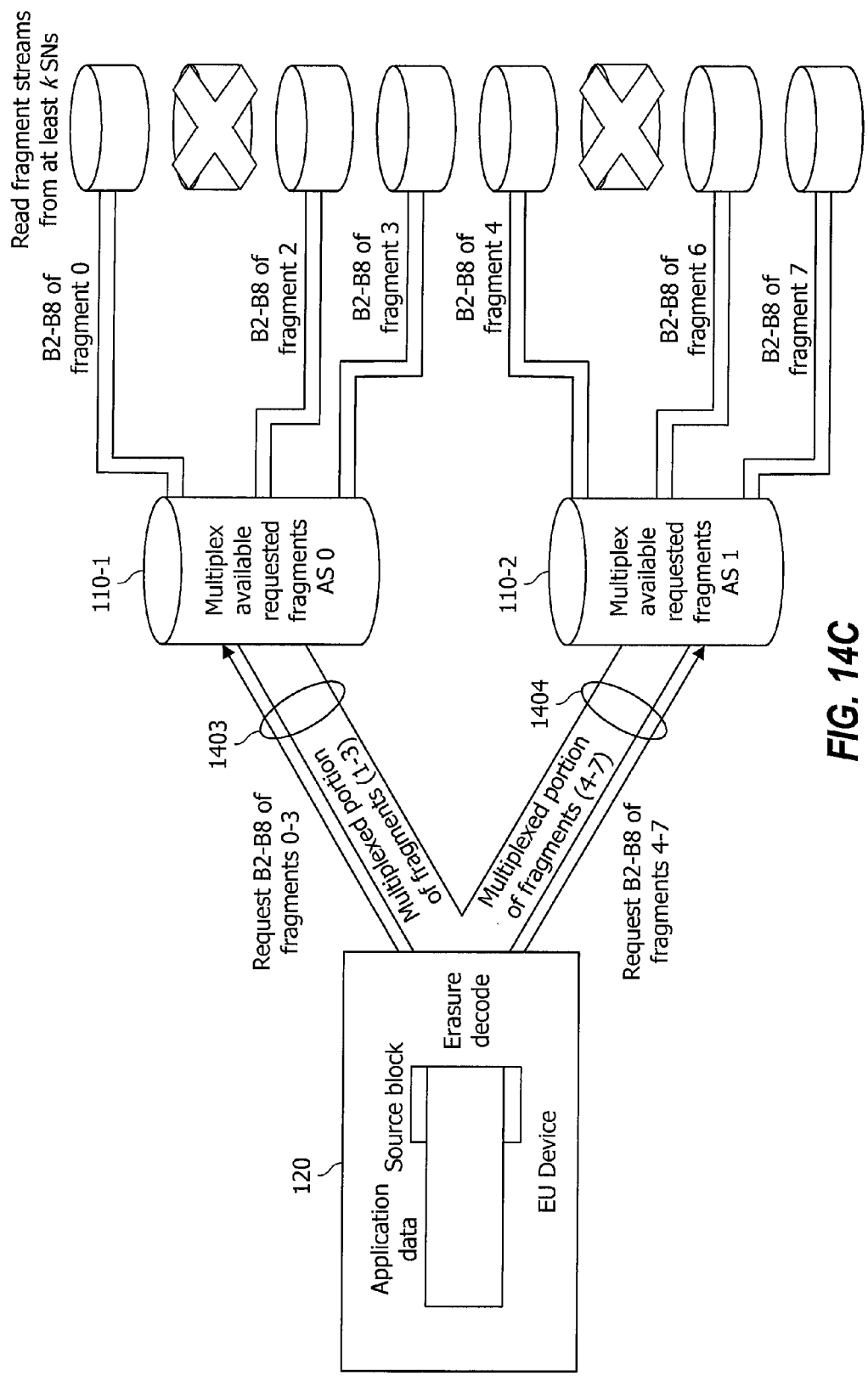

FIG. 14C illustrates downloading and decoding of the requested data by the EU device using multiple connections (i.e., 2 connections in the illustrated example, shown as connections 1403 and 1404) to different access servers. As can be seen in the example illustrated in FIG. 14C, the EU device requests the portion of the fragments with encoding symbol IDs 0-3 through connection 1403 and the portion of the fragments with encoding symbol IDs 4-7 through connection 1404. The access servers in turn make requests of the particular storage nodes for the appropriate portions of the fragments. In this example the storage node storing Fragment 1 and the storage node storing Fragment 5 have failed. Thus, access server 110-1 receives the data for Fragments 0, 2, 3 from the storage nodes and aggregates that data to provide a response to the request from the EU device (e.g., the appropriate portions of data from Fragments 0, 2, and 3 is aggregated and provided through connection 1403). Likewise, access server 110-2 receives the data for Fragments 4, 6, and 7 from the storage nodes and aggregates that data to provide a response to the request from the EU device (e.g., the appropriate portions of data from Fragments 4, 6, and 7 is aggregated and provided through connection 1404).

Figure 14D:
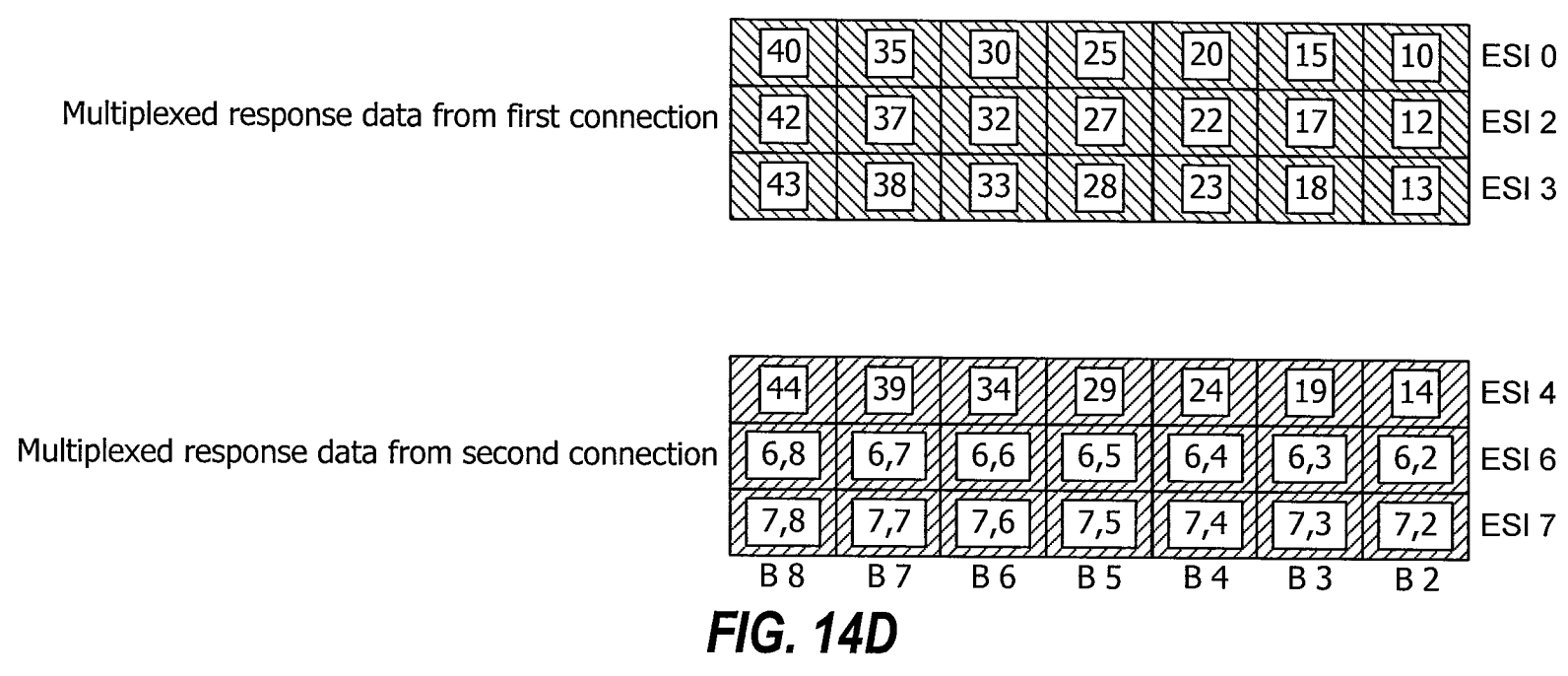

FIG. 14D shows an example of the responses provided by the access server(s) over the 2 connections of the above examples. Continuing with the aforementioned example, the source data to be reconstructed comprises the data of symbols 10-44, wherein each symbol is of size Ssize. As can be seen in the illustrated example, because the source node storing Fragment 1 failed, the response provided through the first connection (e.g., connection 1401 of FIG. 14B or connection 1403 of FIG. 14C) includes only symbols with the encoding symbol IDs 0, 2, and 3. Similarly, because the source node storing Fragment 5 failed, the response provided through the second connection (e.g., connection 1402 of FIG. 14B or connection 1404 of FIG. 14C) includes only symbols with the encoding symbol IDs 4, 6, and 7. Nevertheless, the repair data provided in these responses facilitates recovery of the desired source data from the respective responses.

Operation of an EU device storing data to the storage system through multiple connections is analogous to the foregoing multiple connection data access examples according to embodiments. An EU device may, for example, use multiple connections to a single access server for storing data to the storage network, such as to provide increased speed of data upload. For example, an EU device may utilize multiple TCP connections to an access server to make HTTP 1.1 byte range posts of data for a source object. Additionally or alternatively, an EU device may use multiple connections to different access servers for storing data to the storage network, such as to provide a higher aggregate bandwidth to reduce storage time. In accordance with embodiments, the speed of a connection to any such different access server may be different than other access servers, and thus the amount of data posted to each such access servers may differ. In providing the aforementioned multiple connections, the EU device may utilize multiple interfaces (e.g., WiFi, LTE, etc.), whereby the EU device may connect to different access servers using a different one of such interfaces.

As with embodiments of an EU device accessing data from the storage system using multiple connections, embodiments of an EU device storing data to the storage system using multiple connections functionality for encoding and/or decoding the data may be disposed in the EU device. Accordingly, the EU device may operate to erasure encode the source data and form multiple posts to upload the encoded data over multiple connections (e.g., one or more fragment streams may be uploaded over each connection). In operation according to embodiments, the EU device partitions the data from the erasure encoder according to the connections being used. The EU device may, for example, post different fragments over different connections, post multiple fragments over a same connection, include chunks of a fragment in different posts, etc. Correspondingly, the application server(s) may operate to accept posts from the EU device and form and make posts for portions of fragments to the various storage nodes.

In another variant of the foregoing, there may be a hierarchy of access servers. For example, there may be two levels of access servers, wherein an EU device makes a request for a portion of a source object to a first level access server, and wherein the first level access server makes requests to multiple second level access servers, wherein each request from the first level access server to a second level access server includes a request for a plurality of portions of fragments corresponding to the requested portion of the source object, and wherein the second level access server makes a request to each storage node that stores the portion of a fragment amongst the plurality of portions of fragments. Thus, when each storage node provides the portion of fragment in response to a request from a second level access server, the second level access server combines the responses it receives and provides them as a response to the first level access server. The first level access server receives the responses from the second level access servers, erasure decodes if necessary to recover the portion of the requested source object, and provides the requested portion of the source object to the EU device in response to the original request from the EU device. As an example, consider a storage system a first level access server and with 30 racks of servers, and within each rack there are 40 storage nodes and at least one second level access server (which may coincide with a storage node). The first level access server can establish 30 connections, one connection for each of the second level access servers within each of the 30 racks of servers, and can make the requests to a second level access server for (portions of) fragments that are stored at storage nodes within the same rack as the second level access server. In turn, each second level access server can establish 40 connections, one connection for each of the 40 storage nodes within the same rack as the second level access server, and can make request to a storage node for portions of fragments stored on the storage node that were requested by the first level access server to the second level access server. With this embodiment, the first level access server communicates over only 30 connections, and the second level access servers each communicate over 40 connections, as opposed to a flat hierarchy embodiment described herein wherein an access server establishes 1200 connections, one for each of the storage nodes of the storage system. As one skilled in the art will recognize, there are many variants of this embodiment, including more than two levels of hierarchy, including first level access server establishing connections with more than one second level access server within each rack, including other possible topologies of connections, etc.

Figure 14E:
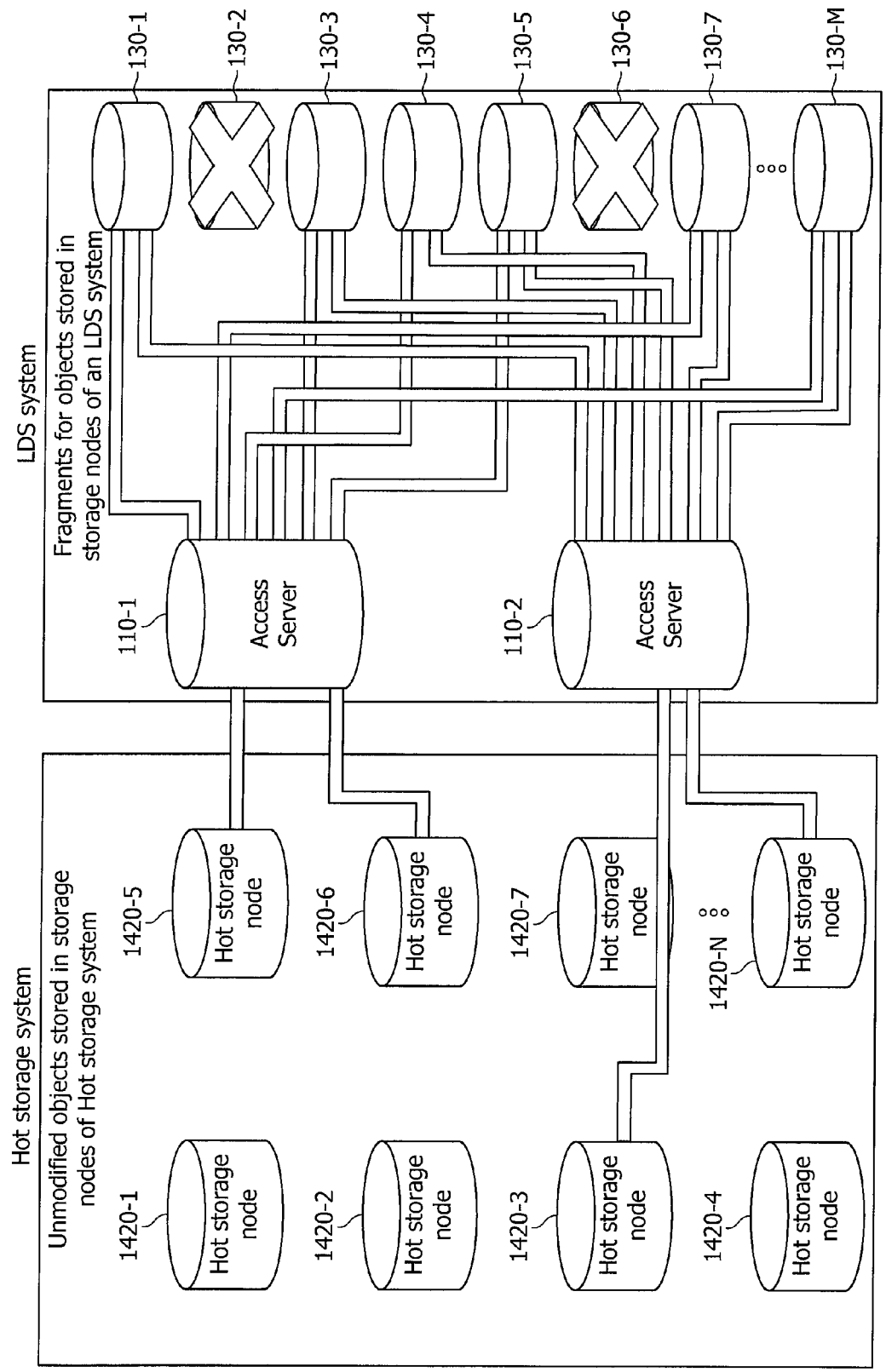

In another variant, a liquid distributed storage solution can be used in conjunction with a complementary storage system, referred to herein as a hot storage system. For example, as illustrated in FIG. 14E, the liquid distributed storage solution, comprising storage nodes 130-1 through 130-M and access servers 110-1, has network connectivity with a hot storage system, comprising hot storage nodes 1420-1 through 1420-N. In this embodiment, the hot storage nodes 1420-1 through 1420-N of the hot storage system store source objects in their original unmodified form, (e.g., each source object is stored contiguously on one of the hot storage nodes 1420-1 through 1420-N). EU devices (not shown) can store and access source objects stored on hot storage nodes of the hot storage system. The hot storage system may have high bandwidth connectivity to EU devices, and thus EU devices can quickly access or store data within the hot storage system. In addition, individual jobs can be executed in a distributed fashion across the hot storage nodes 1420-1 through 1420-N operating on the data of the original source objects. For example, the individual jobs might be part of a distributed MAP REDUCE process running across the entire hot storage system, for example as exemplified by such processes in a Hadoop distributed storage system. In this case, running a distributed MAP REDUCE process is straightforward since the hot storage nodes 1420-1 through 1420-N store the unmodified versions of the source objects that the MAP REDUCE jobs can process directly.

The hot storage system can store reliable backup copies of source objects in the liquid distributed storage system, (e.g., a hot storage node can provide a copy of a source object it stores to an access server to create a reliable backup copy of the source object within the liquid distributed storage system, in which case the liquid distributed storage system creates and stores fragments for the source object that are stored in the storage nodes 130-1 through 130-M). Similarly, a hot storage node of the hot storage system can access a backup copy of a source object previously stored in the liquid distributed storage system, (e.g., by requesting a copy of the source object from an access server, wherein the access server retrieves enough fragments from the storage nodes 130-1 through 130-M to recover the source object and provide it to the requesting hot storage node). The hot storage system can delete a source object from the hot storage system after a backup copy of the source object has been reliably stored in the liquid distributed storage system, thereby freeing up storage space in the hot storage system for storage of other source objects. If a hot storage node fails, either temporarily or permanently, then previously backed up source objects lost from the failed hot storage node can be recovered from the liquid distributed storage system. For example, a hot storage node failure might trigger a hot storage node recovery process to determine which source objects are lost, and then to contact one or more access servers to provide copies of those lost source objects to hot storage nodes designated by the recovery process. The recovered copies of the lost source objects may be spread evenly across the hot storage nodes, (e.g., each recovered source object may be stored on a single hot storage node, but the different recovered source objects may be stored on different hot storage nodes). A depiction of such an example is shown in FIG. 14E, wherein as shown Access Server 110-1 is reading in fragments from storage nodes 130-1 through 130-M of the liquid distributed storage system to recover and send restored objects to hot storage nodes 1420-5 and 1420-6, while concurrently Access Server 110-2 is reading in fragments from storage nodes 130-1 through 130-M of the liquid distributed storage system to recover and send restored objects to hot storage nodes 1420-3 and 1420-N.

The advantages of such a combination of a liquid distributed storage system and a hot storage system are many. For example, the liquid distributed storage system provides highly reliable backup of source objects, and thus the hot storage system does not need to provide completely reliable storage for the objects it stores. The liquid distributed storage system also provides long term storage of source objects that are never needed or are no longer needed for immediate processing within the hot storage systems, such as MAP REDUCE processing, and thus these objects are never or no longer stored in the hot storage system. On the other hand, the hot storage system provides immediate distributed access to the unmodified source objects, including access for distributed processing such as MAP REDUCE processing, without requiring reliable storage of source objects, since the liquid distributed storage system offers reliable storage of and access to source objects as a service to the hot storage system.

Although embodiments implementing a complementary storage system have been discussed above with reference to a combination of a liquid distributed storage system and the complementary storage system, it should be appreciated that the concepts of such a combined storage system are not limited to application with respect to liquid distributed storage systems. Such combined storage systems may be provided utilizing various configurations providing storage of portions of redundant data for the one or more source objects, such as may implement different kinds of erasure codes, for example small erasure codes, large erasure codes, tornado codes, low-density parity-check codes, Reed-Solomon coding, MDS codes, etc., and such as may implement different kinds of repair policies, for example reactive repair policies, lazy repair policies, etc.

Figure 15:
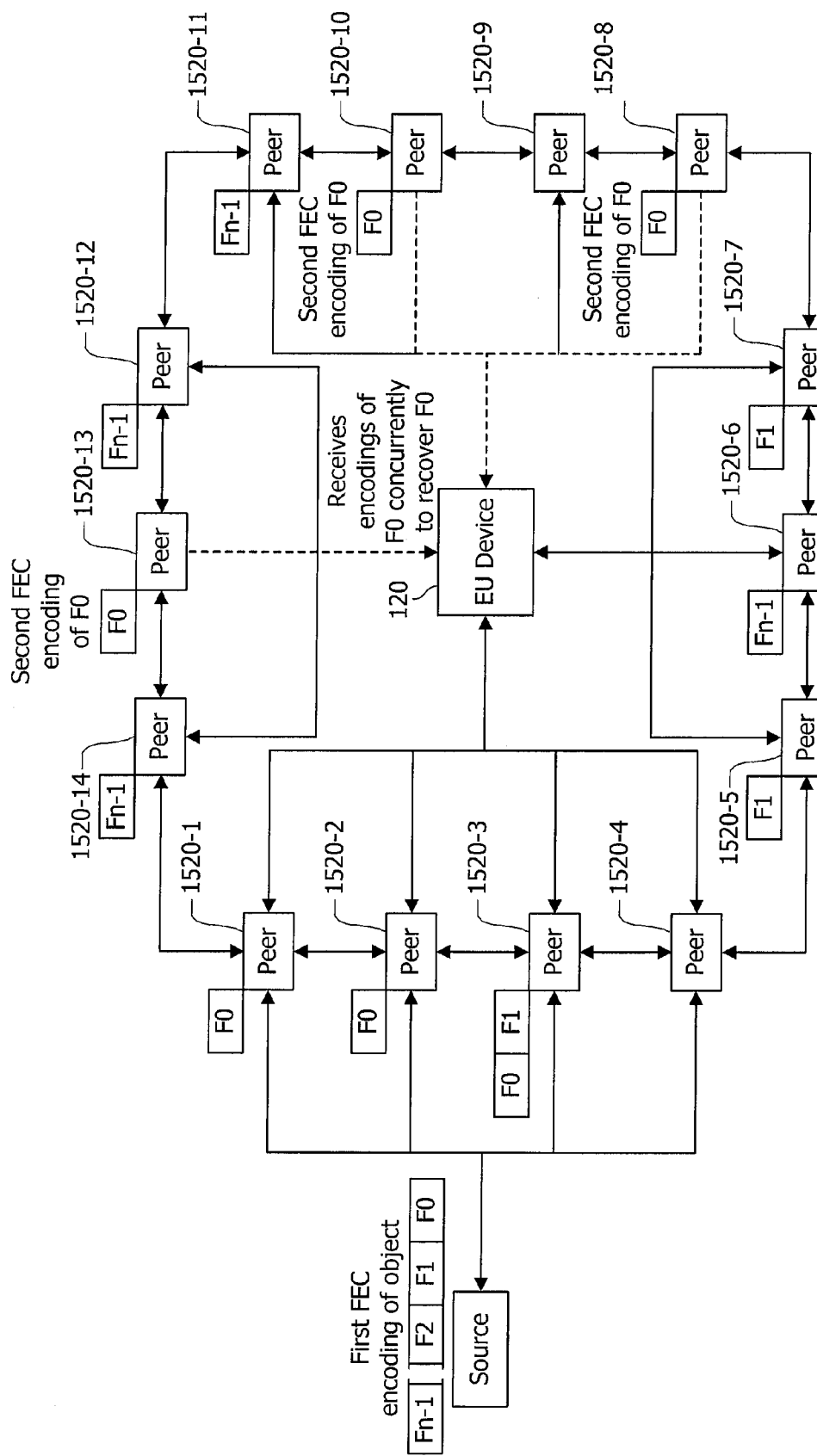
FIG. 15 shows an embodiment of a peer-to-peer storage system implementing a weaver data organization according to aspects of the present disclosure.

In still another variant, a weaver data organization in accordance with the concepts discussed above may be utilized with respect to a peer-to-peer storage network configuration. For example, a weaver data organization may be utilized with a peer-to-peer storage system as illustrated in FIG. 15, wherein EU device 120 is in communication with peer devices (e.g., also EU devices) 1520-1 through 1520-14. Such a peer-to-peer storage system may be configured to deliver source objects to the peer devices, for example, by using a first erasure coding process (e.g., a first forward error correction (FEC) coding process), applied to the source object to generate fragments, and then distributing the fragments among the peers using a second erasure coding process. Correspondingly, the peer-to-peer storage system may be configured so that a first peer device can concurrently download data generated from a fragment from multiple other peer devices. For example, each of the other peer devices applies a second erasure encoding to the fragment to generate and deliver data to the first peer device in such a way that all data delivered to the first peer device from all the other peer devices is additive in the recovery of the fragment. For example, each of the other peer devices can choose and use an ESI range to generate erasure encoded symbols from the fragment such that the ESI ranges of all of the other peer devices are disjoint. (Using a fountain erasure code, such as the RaptorQ code, makes it easy for each peer device to choose and use an ESI range that doesn't intersect with ESI ranges chosen by other peer devices.) An example of such a peer-to-peer data distribution technique is described in "RaptorQP2P: Maximize the Performance of P2P File Distribution with RaptorQ Coding", submitted to ICC 2015 (herein referred to as "Daigle").

In the example illustrated in FIG. 15, EU device 120, currently operating as a data receiver device in the peer-to-peer storage network, is attempting to recover Fragment 0 (Fragment 0 having already been distributed to the peer devices for storage in this example). In the illustrated operation, EU device 120 establishes connections with peer devices 1520-8, 1520-10, and 1520-13 to retrieve the desired fragment. However, instead of providing the fragments (or portions thereof) as stored, the peer devices erasure encode the data for providing it to the EU device 120, as described above, for example using a fountain code such as RaptorQ. Thus, using a fountain property of the encoded data, it does not matter to the EU device 120 where the symbols are coming from and as soon as the received device receives enough symbols from any combination of the peer devices Fragment 0 can be recovered.

In Daigle, the first erasure coding process utilizes a traditional data organization scheme. Operation of the foregoing data access may be made efficient using a weaver data organization with respect to the first erasure coding process in such a peer-to-peer storage system. Suppose the first erasure coding process uses a weaver data organization scheme and an erasure code with parameters (n; k; r), and suppose EU device 120 has recovered and stored in local storage at least k fragments for the source object. EU device 120 may then be instructed to recover all or portions of the source object from the locally stored fragments. For example, EU device 120 may be instructed to sequentially access the source object from the beginning to the end of the object (e.g., because an the source object comprises a video file and the end user wants to view the playback of the video file on the screen of EU device 120). EU device 120 can read sequential portions of at least k recovered fragments and erasure decode corresponding sequential portions of the source object using a small amount of memory in the decoding (e.g., an amount of memory that is proportional to the source block size used in the weaver data organization scheme) and reading a total amount of fragment data that is proportional to the size of the portion of source object recovered, independent of which k of the n fragments are used for decoding. In this case, the EU device 120 may not write the recovered portions of the source object to local storage, because the recovered portions of the source object can be fed directly into the video player for playback. If it is desired to store the recovered source object in local storage, the EU device 120 may additionally or alternatively write the recovered source object sequentially as it is recovered to the local storage device.

The usage of the weaver data organization with the first erasure coding process also allows EU device 120 to reconstruct arbitrary portions of the source object quickly and efficiently, thus enabling efficient play of video content at EU device 120 if the source object is comprised of video content. In contrast, if a traditional data organization scheme is used, EU device 120 would be required to read in portions of fragments that are k times the size of the portion of source object recovered if the portion of source object to be recovered is part of a source fragment that was not received and stored locally by the EU device 120. Thus, enabling EU device 120 to sequentially recover and playback a source object comprising a video file, or to sequentially recover and write to local storage a source object, or to recover arbitrary portions of a source object, is less efficient when using a traditional data organization scheme than when using a weaver data organization scheme. Accordingly, implementation of a weaver data organization with respect to a peer-to-peer storage network, such as that illustrated in FIG. 15, provides multiple advantages over traditional data organization schemes.

What is claimed is:

1. A method for accessing source data of a source object stored as multiple fragments distributed across multiple storage nodes of a storage system, wherein one or more fragments of the multiple fragments includes redundant data for the source object, the method comprising:

receiving the source data as a stream of data;

erasure encoding the stream of data to generate a stream of encoded data as the stream of data is arriving, wherein the redundant data is generated from the source data using an (n ;k; r) erasure code;

producing the multiple fragments as a plurality of output fragment streams from the stream of encoded data as the stream of encoded data is being generated;

writing, by an access server having a processor and memory, the multiple fragments to the storage nodes as each of the plurality of output fragment streams as the output fragment streams are being produced, wherein a first portion of each of the output fragment streams corresponds to a first portion of the source object and are written to the storage nodes before a second portion of the source object has been received, and wherein data of at least one fragment of the multiple fragments is stored by the multiple storage nodes using a data organization that concatenates symbols of multiple source blocks from the source object for inclusion of a symbol of each source block in each of two or more fragments of the multiple fragments of the source object;

reading, by the access server, data of a plurality of fragments of the multiple fragments from a plurality of storage nodes of the multiple storage nodes to access a requested portion of the source data, wherein the reading data of a plurality of fragments comprises reading each of at least k fragments of the plurality of output fragments written to storage nodes as an input fragment stream; and erasure decoding, by the access server, the portion of the source data from the data of the plurality of fragments read from the plurality of storage nodes, wherein the erasure decoding the portion of source data comprises erasure decoding the input fragment stream to generate a stream of source data for the source object as the input fragment stream is being read.

2. The method of claim 1, wherein only repair fragments are stored in the storage system.

3. The method of claim 1, wherein an amount of the data of the plurality of fragments read from the plurality of storage nodes is substantially equal to a size of the requested portion of the source data.

4. The method of claim 3, wherein at least one fragment of the multiple fragments which is not also of the plurality of fragments comprises at least a part of the requested portion of source data, whereby the reading data of the plurality of fragments does not read data from the at least one fragment.

5. The method of claim 1, wherein the erasure decoding provides a decoded part of the requested portion of the source data before at least some of the data for the requested portion of the source data is read.

6. The method of claim 1, wherein the requested portion of the source data is requested by an end user (EU) device, the method further comprising:

receiving a request to access a portion of the source data from the EU device; and providing the portion of the source data to the EU device in response to the request.

7. The method of claim 1, wherein a size of the source object is not known when a part of the plurality of fragment streams corresponding to the first portion of the source object has been written to storage nodes.

8. The method of claim 1, wherein the redundant data is generated from the source data using an (n; k; r) erasure code, wherein a number of fragment streams of the plurality of output fragment streams is n.

9. The method of claim 1, wherein the reading data of a plurality of fragments to access a requested portion of source data is in response to a request to generate repair data for the source object from the repair process, wherein a part of the output fragment streams corresponding to the first portion of the source object are written to storage nodes before a portion of the input fragment stream corresponding to the second portion of the object is read from the nodes.

10. The method of claim 1, wherein the source object further comprises a third portion, wherein the third portion of the source object is subsequent to the first portion of the object and previous to the second portion of the source object, wherein the third portion of the source object is erasure encoded after the first portion is written to the storage nodes and before the second portion of the source object has been received, and wherein a size of the third portion of the source object is substantially smaller than a size of the source object.

11. The method of claim 1, wherein the reading data of a plurality of fragments to access a requested portion of source data is by a repair process for generating repair data for the source object, the method further comprising:

generating the repair data from the source data using an (n; k; r) erasure code, wherein the source data is organized as consecutive source blocks of source data, wherein a size of the source data is much greater than a size of the source blocks, wherein a repair process processes each of the source blocks of source data in order, wherein the processing by the repair process includes:
    for each of at least k storage nodes, accessing a portion of the fragment data stored on the storage node corresponding to the source block of the source data;
    recovering the source block of the source data from the accessed portions of the fragment data using erasure decoding;
    generating at least one portion of fragment data from the source block of the source data using erasure encoding; and
    for each storage node for which a portion of fragment data is generated, storing the generated portion of fragment data on the storage node, wherein data of the source data stored on each node of the multiple storage nodes is organized as consecutive portions of fragment data, wherein the consecutive portions of fragment data are generated from the consecutive source blocks of the source data.

12. The method of claim 11, wherein when the repair process starts again at a first source block of the source data after the repair process has completed processing of a last source block of the source data.

13. The method of claim 11, where an aggregate rate at which the repair process accesses and stores data on the storage nodes is constrained below a value R that depends on a value β and a value μ, wherein β is a fraction of data redundancy of the storage system, and wherein μ is an average rate at which data is being lost from the storage nodes of the storage system.

14. The method of claim 13, wherein the aggregate rate is an aggregate read and write rate.

15. The method of claim 13, wherein the aggregate rate is an aggregate read rate.

16. The method of claim 11, wherein the processing by the repair process of a particular source block of the source data is skipped for the particular source block of the source data if there are more than a predetermined number of portions of fragment data corresponding to the particular source block of source data that are available on the storage nodes.

17. The method of claim 1, wherein the storage system comprises a peer-to-peer storage system configuration, and wherein the multiple storage nodes comprise peer devices to a device accessing the source data.

18. The method of claim 17, wherein the reading data of a plurality of fragments of the multiple fragments includes recovering and storing locally each of the plurality of fragments at a peer device, wherein the erasure decoding the portion of source data includes accessing portions of the plurality of fragments stored locally at the peer device, wherein an aggregate size of accessed portions of the plurality of fragments is substantially equal in size to the portion of source data, and wherein the erasure decoding the portion of source data includes erasure decoding at the peer device the portion of source data from the accessed portions of the plurality of fragments, wherein memory used by the peer device to erasure decode is substantially smaller than the size of the portion of source data.

19. The method of claim 1, wherein the storage system is a combined storage system configuration including a redundant data storage system storing the source object as multiple fragments distributed across the multiple storage nodes and a complementary storage system storing the source object in its original unmodified form.

20. The method of claim 19, wherein the reading data of the plurality of fragments and the erasure decoding the portion of source data from the data of the plurality of fragments read provides the complementary storage system access to a backup copy of data of the source object stored by the redundant data storage system.

21. The method of claim 20, wherein an end user (EU) device accesses data of the source object via the complementary storage system.

22. The method of claim 19, wherein the complementary storage system executes individual jobs with respect to the source object in a distributed fashion across storage nodes of the complementary storage system.

23. The method of claim 19, further comprising:
    deleting the source object from the complementary storage system after a backup copy of the source object has been reliably stored in the redundant data storage system.

24. An apparatus for accessing source data of a source object stored as multiple fragments distributed across multiple storage nodes of a storage system, wherein one or more fragments of the multiple fragments includes redundant data for the source object, the apparatus comprising:
    one or more data processors; and
    one or more non-transitory computer-readable storage media containing program code configured to cause the one or more data processors to perform operations including:
    receiving the source data as a stream of data;
    erasure encoding the stream of data to generate a stream of encoded data as the stream of data is arriving, wherein the redundant data is generated from the source data using an (n; k; r) erasure code;
    producing the multiple fragments as a plurality of output fragment streams from the stream of encoded data as the stream of encoded data is being generated;
    writing the multiple fragments to the storage nodes as each of the plurality of output fragment streams as the output fragment streams are being produced, wherein a first portion of each of the output fragment streams corresponds to a first portion of the source object and are written to the storage nodes before a second portion of the source object has been received, wherein data of at least one fragment of the multiple fragments is stored by the multiple storage nodes using a data organization that concatenates symbols of multiple source blocks from the source object for inclusion of a symbol of each source block in each of a plurality two or more fragments of the multiple fragments of the source object;
    reading data of a plurality of fragments of the multiple fragments from a plurality of storage nodes of the multiple storage nodes to access a requested portion of the source data, wherein the reading data of a plurality of fragments comprises reading each of at least k fragments of the plurality of output fragments written to storage nodes as an input fragment stream; and
    erasure decoding the portion of the source data from the data of the plurality of fragments read from the plurality of storage nodes, wherein the erasure decoding the portion of source data comprises erasure decoding the input fragment stream to generate a stream of source data for the source object as the input fragment stream is being read.

25. The apparatus of claim 24, wherein an amount of the data of the plurality of fragments read from the plurality of storage nodes is substantially equal to a size of the requested portion of the source data.

26. The apparatus of claim 25, wherein at least one fragment of the multiple fragments which is not also of the plurality of fragments comprises at least a part of the requested portion of source data, whereby the reading data of the plurality of fragments does not read data from the at least one fragment.

27. The apparatus of claim 24, wherein the erasure decoding provides a decoded part of the requested portion of the source data before at least some of the data for the requested portion of the source data is read.

28. The apparatus of claim 24, wherein the reading data of a plurality of fragments to access a requested portion of source data is by an end user (EU) device, wherein the program code is configured to cause the one or more data processors to further perform operations including:
  receiving a request to access a portion of the source data from the EU device; and
  providing the portion of the source data to the EU device in response to the request.

29. The apparatus of claim 24, wherein a size of the source object is not known when a part of the plurality of fragment streams corresponding to the first portion of the source object has been written to storage nodes.

30. The apparatus of claim 24, wherein the redundant data is generated from the source data using an (n; k; r) erasure code, wherein a number of fragment streams of the plurality of output fragment streams is n.

31. The apparatus of claim 24, wherein the reading data of a plurality of fragments to access a requested portion of source data is in response to a request to generate repair data for the source object from a repair process, wherein a part of the output fragment streams corresponding to the first portion of the source object are written to storage nodes before a portion of the input fragment stream corresponding to the second portion of the object is read from the nodes.

32. The apparatus of claim 24, wherein the source object further comprises a third portion, wherein the third portion of the source object is subsequent to the first portion of the object and previous to the second portion of the source object, wherein the third portion of the source object is erasure encoded after the first portion is written to the storage nodes and before the second portion of the source object has been received, and wherein a size of the third portion of the source object is substantially smaller than a size of the source object.

33. The apparatus of claim 24, wherein the reading data of a plurality of fragments to access a requested portion of source data is by a repair process for generating repair data for the source object, wherein the program code is configured to cause the one or more data processors to further perform operations including:
  generating the repair data from the source data using an (n; k; r) erasure code, wherein the source data is organized as consecutive source blocks of source data, wherein a size of the source data is much greater than a size of the source blocks, wherein the repair process processes each of the source blocks of source data in order, wherein the processing by a repair process includes:
    for each of at least k storage nodes, accessing a portion of the fragment data stored on the storage node corresponding to the source block of the source data;
    recovering the source block of the source data from the accessed portions of the fragment data using erasure decoding;
    generating at least one portion of fragment data from the source block of the source data using erasure encoding; and
    for each storage node for which a portion of fragment data is generated, storing the generated portion of fragment data on the storage node, wherein data of the source data stored on each node of the multiple storage nodes is organized as consecutive portions of fragment data, wherein the consecutive portions of fragment data are generated from the consecutive source blocks of the source data.

34. The apparatus of claim 33, where an aggregate rate at which the repair process accesses and stores data on the storage nodes is constrained below a value R that depends on a value $\beta$ and a value $\mu$, wherein $\beta$ is a fraction of data redundancy of the storage system, and wherein $\mu$ is an average rate at which data is being lost from the storage nodes of the storage system.

35. The apparatus of claim 34, wherein the aggregate rate is an aggregate read and write rate.

36. The apparatus of claim 34, wherein the aggregate rate is an aggregate read rate.

37. The apparatus of claim 33, wherein the processing by the repair process of a particular source block of the source data is skipped for the particular source block of the source data if there are more than a predetermined number of portions of fragment data corresponding to the particular source block of source data that are available on the storage nodes.

38. The apparatus of claim 24, wherein the storage system comprises a peer-to-peer storage system configuration, and wherein the multiple storage nodes comprise peer devices to a device accessing the source data.

39. The apparatus of claim 38, wherein the reading data of a plurality of fragments of the multiple fragments includes recovering and storing locally each of the plurality of fragments at a peer device, wherein the erasure decoding the portion of source data includes accessing portions of the plurality of fragments stored locally at the peer device, wherein an aggregate size of accessed portions of the plurality of fragments is substantially equal in size to the portion of source data, and wherein the erasure decoding the portion of source data includes erasure decoding at the peer device the portion of source data from the accessed portions of the plurality of fragments, wherein memory used by the peer device to erasure decode is substantially smaller than the size of the portion of source data.

40. The apparatus of claim 24, wherein the storage system is a combined storage system configuration including a redundant data storage system storing the source object as multiple fragments distributed across the multiple storage nodes and a complementary storage system storing the source object in its original unmodified form.

41. The apparatus of claim 40, wherein the reading data of the plurality of fragments and the erasure decoding the portion of source data from the data of the plurality of fragments read provides the complementary storage system access to a backup copy of data of the source object stored by the redundant data storage system.

42. The apparatus of claim 41, wherein an end user (EU) device accesses data of the source object via the complementary storage system.

43. The apparatus of claim 40, wherein the complementary storage system executes individual jobs with respect to the source object in a distributed fashion across storage nodes of the complementary storage system.

44. The apparatus of claim 40, wherein the program code is configured to cause the one or more data processors to further perform operations including:
deleting the source object from the complementary storage system after a backup copy of the source object has been reliably stored in the redundant data storage system.

45. An apparatus for accessing source data of a source object stored as multiple fragments distributed across multiple storage nodes of a storage system, wherein one or more fragments of the multiple fragments includes redundant data for the source object, the apparatus comprising:
means for receiving the source data as a stream of data;
means for erasure encoding the stream of data to generate a stream of encoded data as the stream of data is arriving, wherein the redundant data is generated from the source data using an (n; k; r) erasure code;
means for producing the multiple fragments as a plurality of output fragment streams from the stream of encoded data as the stream of encoded data is being generated;
means for writing the multiple fragments to the storage nodes as each of the plurality of output fragment streams as the output fragment streams are being produced, wherein a first portion of each of the output fragment streams corresponds to a first portion of the source object and are written to the storage nodes before a second portion of the source object has been received, wherein data of at least one fragment of the multiple fragments is stored by the multiple storage nodes using a data organization that concatenates symbols of multiple source blocks from the source object for inclusion of a symbol of each source block in each of two or more fragments of the multiple fragments of the source object;
means for reading, by an access server having a processor and memory, data of a plurality of fragments of the multiple fragments from a plurality of storage nodes of the multiple storage nodes to access a requested portion of the source data, wherein the reading data of a plurality of fragments comprises reading each of at least k fragments of the plurality of output fragments written to storage nodes as an input fragment stream; and
means for erasure decoding, by the access server, the portion of the source data from the data of the plurality of fragments read from the plurality of storage nodes, wherein the erasure decoding the portion of source data comprises erasure decoding the input fragment stream to generate a stream of source data for the source object as the input fragment stream is being read.

46. The apparatus of claim 45, wherein an amount of the data of the plurality of fragments read from the plurality of storage nodes is substantially equal to a size of the requested portion of the source data.

47. The apparatus of claim 45, wherein the erasure decoding provides a decoded part of the requested portion of the source data before at least some of the data for the requested portion of the source data is read.

48. The apparatus of claim 45, wherein the redundant data is generated from the source data using an (n; k; r) erasure code, wherein a number of fragment streams of the plurality of output fragment streams is n.

49. The apparatus of claim 45, wherein the means for reading data of a plurality of fragments to access a requested portion of source data accesses the requested portion of the source data in response to a request to generate repair data for the source object from the repair process, wherein a part of the output fragment streams corresponding to the first portion of the source object are written to storage nodes before a portion of the input fragment stream corresponding to the second portion of the object is read from the nodes.

50. The apparatus of claim 45, wherein the means for reading data of a plurality of fragments to access a requested portion of source data accesses the requested portion of the source data as part of a repair process for generating repair data for the source object, the apparatus further comprising:
means for generating the repair data from the source data using an (n; k; r) erasure code, wherein the source data is organized as consecutive source blocks of source data, wherein a size of the source data is much greater than a size of the source blocks, wherein a repair process processes each of the source blocks of source data in order, wherein the processing by the repair process includes:
means for accessing a portion of the fragment data stored on the storage node corresponding to the source block of the source data for each of at least k storage nodes;
means for recovering the source block of the source data from the accessed portions of the fragment data using erasure decoding;
means for generating at least one portion of fragment data from the source block of the source data using erasure encoding; and
means for storing the generated portion of fragment data on the storage node for each storage node for which a portion of fragment data is generated, wherein data of the source data stored on each node of the multiple storage nodes is organized as consecutive portions of fragment data, wherein the consecutive portions of fragment data are generated from the consecutive source blocks of the source data.

51. A non-transitory computer-readable medium comprising codes for accessing source data of a source object stored as multiple fragments distributed across multiple storage nodes of a storage system, wherein one or more fragments of the multiple fragments includes redundant data the source object, the codes causing a computer to:
receive the source data as a stream of data;
erasure encode the stream of data to generate a stream of encoded data as the stream of data is arriving, wherein the redundant data is generated from the source data using an (n; k; r) erasure code;
produce the multiple fragments as a plurality of output fragment streams from the stream of encoded data as the stream of encoded data is being generated;
write the multiple fragments to the storage nodes as each of the plurality of output fragment streams as the output fragment streams are being produced, wherein a first portion of each of the output fragment streams corresponds to a first portion of the source object and are written to the storage nodes before a second portion of the source object has been received, and wherein data of at least one fragment of the multiple fragments is stored by the multiple storage nodes using a data organization that concatenates symbols of multiple source blocks from the source object for inclusion of a symbol of each source block in each of two or more fragments of the multiple fragments of the source object;
read data of a plurality of fragments of the multiple fragments from a plurality of storage nodes of the multiple storage nodes to access a requested portion of the source data, wherein reading data of a plurality of fragments comprises reading each of at least k fragments of the plurality of output fragments written to storage nodes as an input fragment stream; and decode the portion of the source data from the data of the plurality of fragments read from the plurality of storage nodes, wherein erasure decoding the portion of source data comprises erasure decoding the input fragment stream to generate a stream of source data for the source object as the input fragment stream is being read.

52. The non-transitory computer-readable medium of claim 51, wherein an amount of the data of the plurality of fragments read from the plurality of storage nodes is substantially equal to a size of the requested portion of the source data.

53. The non-transitory computer-readable medium of claim 51, wherein the erasure decoding provides a decoded part of the requested portion of the source data before at least some of the data for the requested portion of the source data is read.

54. The non-transitory computer-readable medium of claim 51, wherein the redundant data is generated from the source data using an (n; k; r) erasure code, wherein a number of fragment streams of the plurality of output fragment streams is n.

55. The non-transitory computer-readable medium of claim 51, wherein accessing source data is in response to a request to generate repair data for the source object from the repair process, wherein a part of the output fragment streams corresponding to the first portion of the source object are written to storage nodes before a portion of the input fragment streams corresponding to the second portion of the object is read from the nodes.

56. The non-transitory computer-readable medium of claim 51, wherein accessing source data is by a repair process for generating repair data for the source object, wherein the codes further cause the computer to:

generate the repair data from the source data using an (n; k; r) erasure code, wherein the source data is organized as consecutive source blocks of source data, wherein a size of the source data is much greater than a size of the source blocks, wherein the repair process processes each of the source blocks of source data in order, wherein processing by the repair process utilizes codes causing the computer to:

access a portion of the fragment data stored on the storage node corresponding to the source block of the source data for each of at least k storage nodes;

recover the source block of the source data from the accessed portions of the fragment data using erasure decoding;

generate at least one portion of fragment data from the source block of the source data using erasure encoding; and store the generated portion of fragment data on the storage node for each storage node for which a portion of fragment data is generated, wherein data of the source data stored on each node of the multiple storage nodes is organized as consecutive portions of fragment data, wherein the consecutive portions of fragment data are generated from the consecutive source blocks of the source data.

\* \* \* \* \*